(12) United States Patent
Kawasaki

(10) Patent No.: US 6,888,073 B2
(45) Date of Patent: May 3, 2005

(54) VIBRATION ABSORBING SYSTEM OF MICRO GRAVITY ROTATING APPARATUS

(75) Inventor: Shuichi Kawasaki, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 290 days.

(21) Appl. No.: 10/168,054

(22) PCT Filed: Nov. 13, 2001

(86) PCT No.: PCT/JP01/09910

§ 371 (c)(1),
(2), (4) Date: Jun. 17, 2002

(87) PCT Pub. No.: WO02/42153

PCT Pub. Date: May 30, 2002

(65) Prior Publication Data

US 2002/0189360 A1 Dec. 19, 2002

(30) Foreign Application Priority Data

| Nov. 22, 2000 | (JP) | 2000-356517 |
| Nov. 28, 2000 | (JP) | 2000-361531 |
| Mar. 9, 2001 | (JP) | 2001-067345 |
| Sep. 11, 2001 | (JP) | 2001-275343 |

(51) Int. Cl.$^7$ .............. B04B 9/14; G01G 9/00
(52) U.S. Cl. ............ 177/1; 177/210 FP; 177/213; 73/1.87; 73/580; 73/865.3; 73/579; 494/16
(58) Field of Search .............. 494/16; 73/1.87, 73/865.3, 579–581; 177/1, 210 FP, 83, 210 EM, 212, 213

(56) References Cited

U.S. PATENT DOCUMENTS 3,519,095 A * 7/1970 Tomes .............. 177/210 R
3,522,853 A * 8/1970 Fluur et al. .............. 177/1
3,545,611 A * 12/1970 Husome .............. 209/593

(Continued)

FOREIGN PATENT DOCUMENTS

| DE | 38 44 563 | 11/1989 |
| JP | 60-98239 | 6/1985 |
| JP | 5-45204 | 2/1993 |
| JP | 06217663 | 8/1994 |
| JP | 6-217663 | 8/1994 |
| JP | 2000-88627 | 3/2000 |

*Primary Examiner*—Randy W. Gibson
(74) *Attorney, Agent, or Firm*—Wenderoth, Lind & Ponack, L.L.P.

(57) ABSTRACT

A substance mass measuring system is applied to a microgravitational rotating apparatus vibration control system to easily measure the mass of an object placed in an experimental box. Recess portions (10a, 10b) are provided in a casing (10). Both ends of a rotary shaft (30) are supported by bearings (11, 12) in the recess portions (10a, 10b). A lower end of the rotary shaft (30) is connected to a motor (13). Four arms (24 to 27) arranged horizontally in the direction of X and Y axes, are at their one ends fixed to the rotary shaft (30) and at the other ends fitted with experimental boxes (20 to 23). Experimental objects are placed in the boxes (20 to 23) and rotated for experiments in space. Vibration of the rotary shaft (30) and the boxes (20 to 23) is absorbed by the bearings (11, 12). Side plates (1a to 1d), acceleration sensors (2a to 2d) and distance sensors (3a to 3d) are arranged in the boxes (20 to 23). By collision of the object with the side plate, the mass of the object is computed based on signals from the sensors (2, 3).

44 Claims, 27 Drawing Sheets

U.S. PATENT DOCUMENTS

| | | | |
|---|---|---|---|
| 3,583,205 A | * | 6/1971 | Erie ............................ 73/1.87 |
| 3,693,739 A | * | 9/1972 | Kaloustian et al. .......... 177/214 |
| 3,805,904 A | * | 4/1974 | Zimmerer ..................... 177/54 |
| 4,106,580 A | * | 8/1978 | DeMasters et al. ......... 177/205 |
| 4,165,975 A | * | 8/1979 | Kwiatkowski et al. ..... 65/29.17 |
| 4,802,541 A | * | 2/1989 | Bator et al. ................. 177/212 |
| 4,841,184 A | | 6/1989 | Chen et al. ................. 310/90.5 |
| 5,126,610 A | | 6/1992 | Fremerey ................... 310/90.5 |
| 5,209,326 A | | 5/1993 | Harper ....................... 188/378 |
| 5,347,092 A | * | 9/1994 | Buchs et al. ................ 177/212 |
| 5,409,020 A | * | 4/1995 | Belvederi ................... 131/84.4 |
| 5,437,599 A | * | 8/1995 | Feldkamp et al. ............ 494/82 |
| 5,488,203 A | * | 1/1996 | Hassel et al. ................ 177/184 |
| 5,561,993 A | | 10/1996 | Elgersma et al. ............ 68/23.2 |
| 5,594,184 A | * | 1/1997 | Schroder et al. .............. 73/865 |
| 5,767,381 A | * | 6/1998 | Konno et al. ................. 73/1.87 |
| 5,798,487 A | * | 8/1998 | Goichman et al. ............ 177/83 |
| 5,900,590 A | * | 5/1999 | Solberg, et al. ................ 177/1 |
| 5,902,964 A | * | 5/1999 | Solberg, et al. ................ 177/1 |
| 6,042,382 A | | 3/2000 | Halfhill ....................... 434/59 |

\* cited by examiner

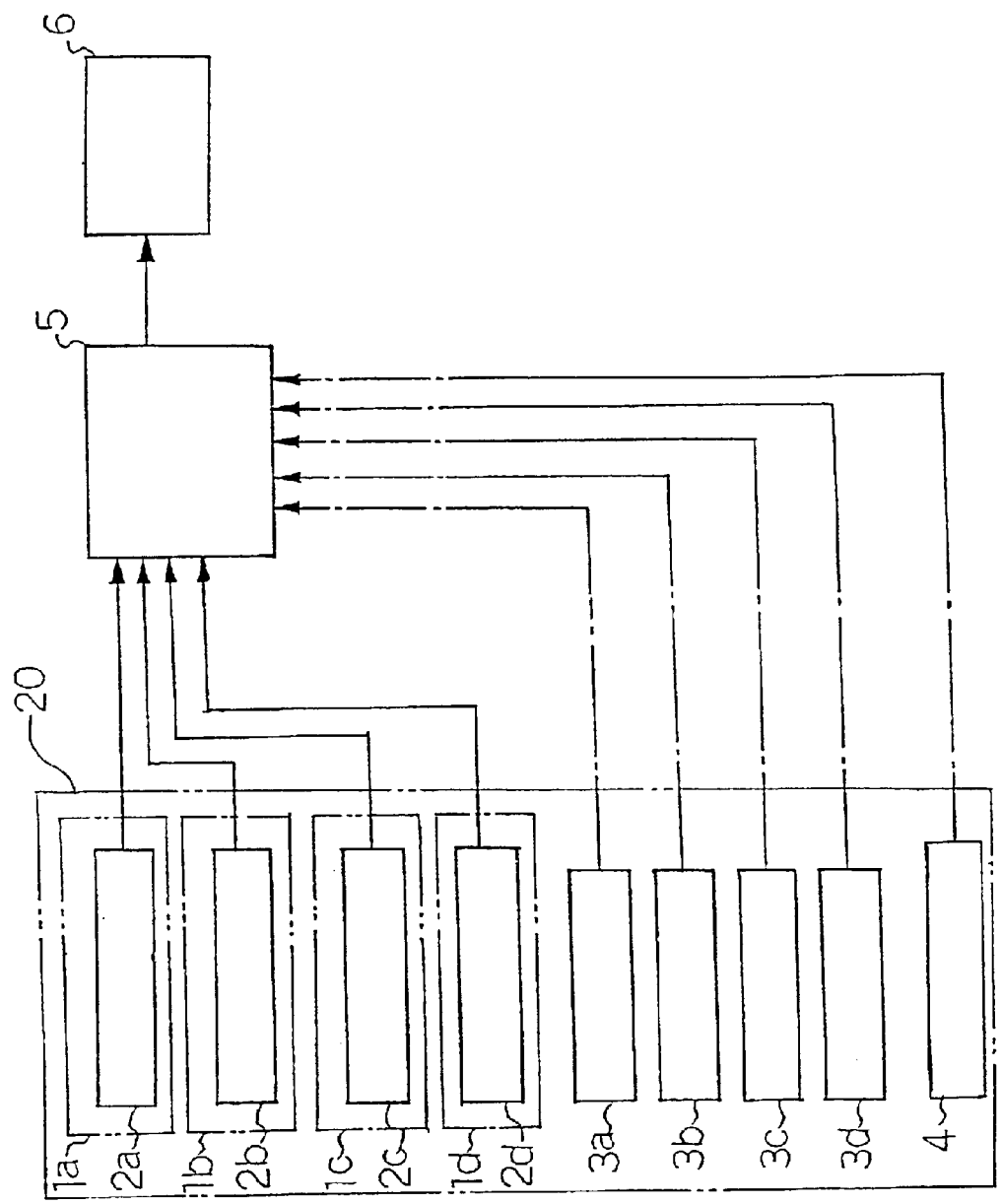

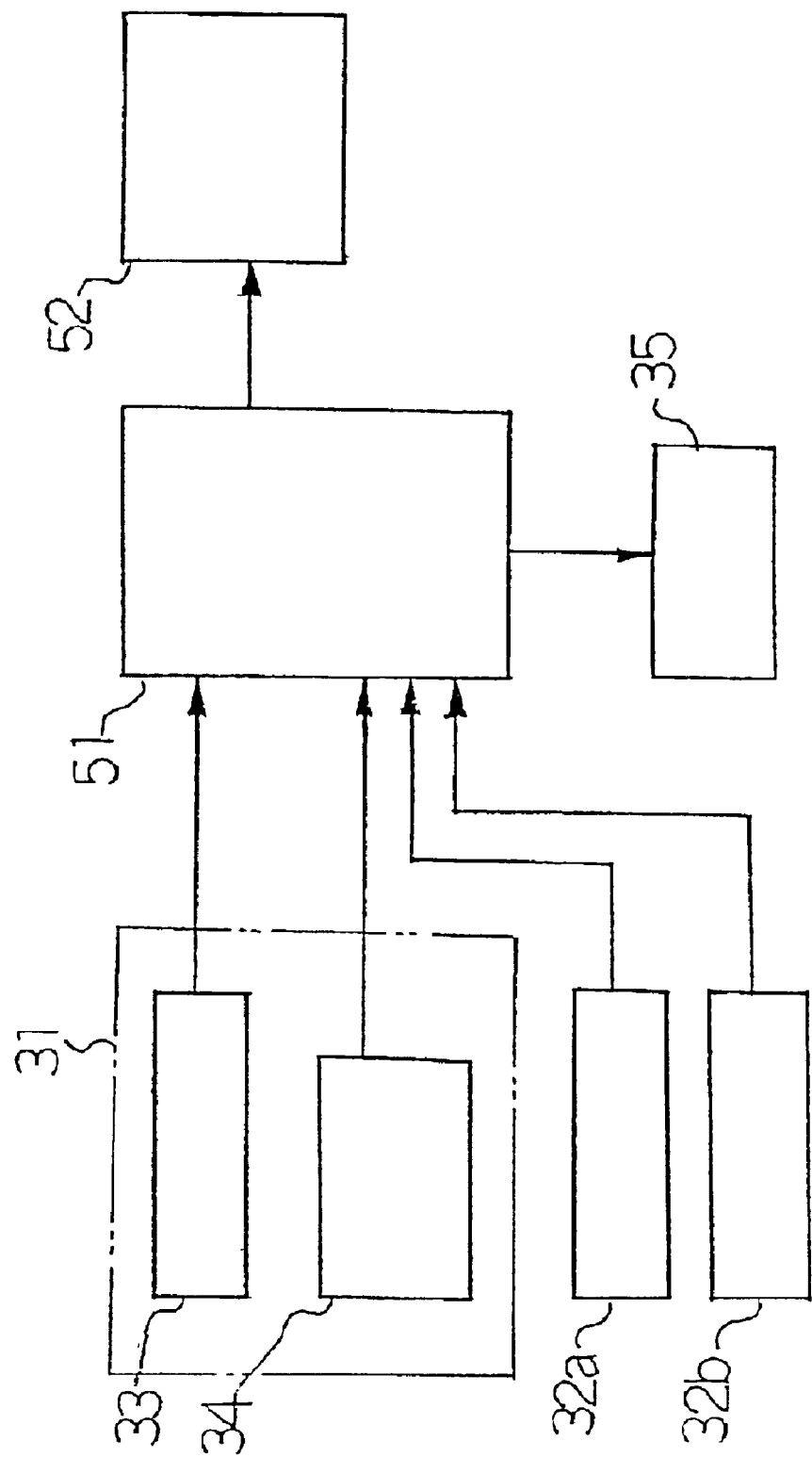

Fig. 10(a)
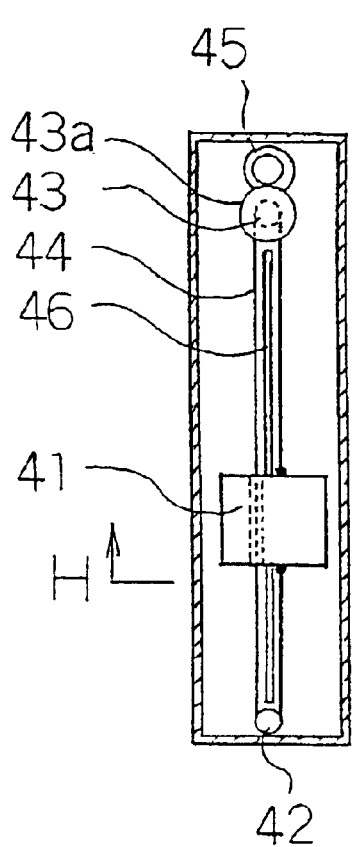
Fig. 10(b)
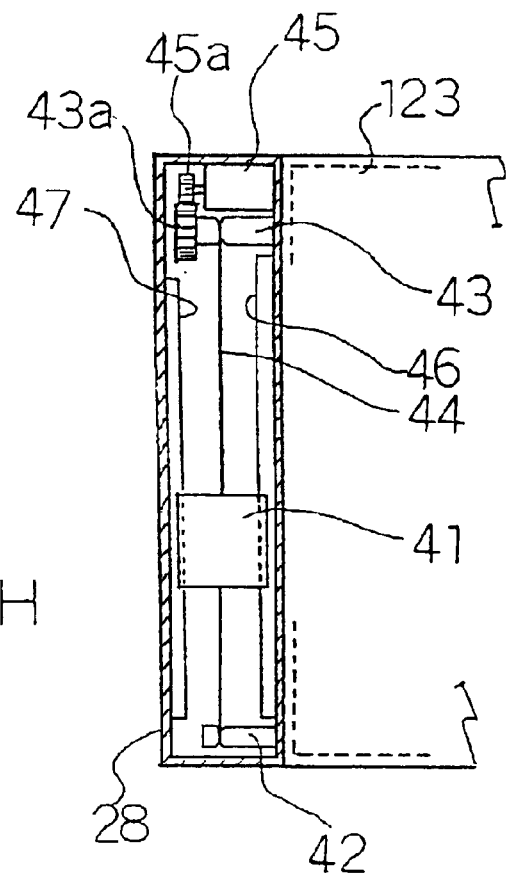
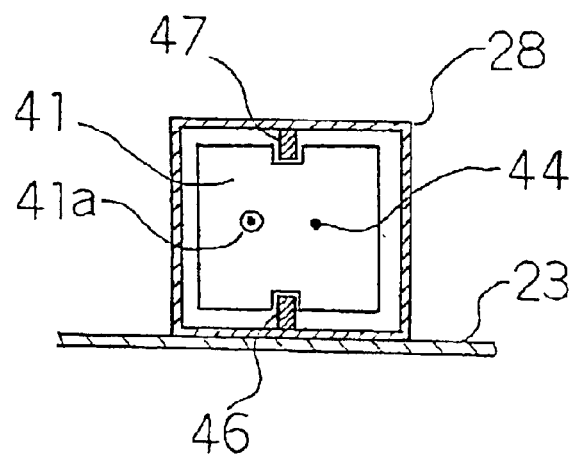
Fig. 10(c)

VIBRATION ABSORBING SYSTEM OF MICRO GRAVITY ROTATING APPARATUS

TECHNICAL FIELD

The present invention relates generally to a vibration control system of a microgravitational rotating apparatus and more particularly to a system that is able to control vibration caused by weight imbalances of acceleration-adding substances as experimental objects placed in boxes of a rotating apparatus for performing experiments in space, as well as able to measure a substance mass with respect to the vibration-causing weight imbalances in the microgravitational rotating apparatus.

BACKGROUND ART

FIG. 29 is a schematic plan view showing one example of a rotating apparatus that is currently used in space. In FIG. 29, a rotating device 260, such as a motor, has four supporting members 261, 262, 263, 264 fitted thereto extending radially. Experimental boxes 270, 271, 272, 273 are fitted to respective ends of the supporting members 261 to 264 and experimental objects, such as plants, are contained in the experimental boxes 270 to 273. In the microgravitational state, such rotating apparatus is driven by the rotating device 260 to rotate at a slow speed of about 1 rotation/second and experiments on the objects in the experimental boxes 270 to 273, while rotating, are carried out.

In the mentioned rotating apparatus, the experimental boxes 270 to 273 are fitted to the ends of the supporting members 261 to 264, so that the end portions thereof become large in the shape. Also, while the rotating apparatus itself is symmetrical around the rotating axis, experimental objects of different kinds and different sizes are contained in the experimental boxes 270 to 273, causing weight imbalances between the experimental objects so contained. Hence, by the rotation, vibration occurs in a rotary shaft as well as in the supporting members 261 to 264 and the experimental boxes 270 to 273, thereby moving the experimental objects or giving a bad influences to them. Also, the rotation is often carried out without knowing the exact weight of the entire rotating apparatus including the experimental devices.

In the prior art rotating apparatus used in space, as described above, vibration occurs during the rotation and is transmitted to the arms or containers, like boxes, (hereinafter such containers are referred to as "boxes") constituting a rotator, and gives them bad influences. Also, the vibration spreads to the surrounding environment via the rotary shaft and influences the surrounding space equipment and apparatus as well as the control thereof. Such vibration can be solved by structural means to the extent that the vibration is a steady-state vibration that can be known beforehand. But if the vibration has changes of arbitrarily occurring vibration modes, countermeasures therefor are difficult and control thereof is also limited. Thus, further countermeasures therefor are desired.

Also, there are mass imbalances of the experimental objects in the boxes and the vibration occurs due to acceleration caused by the rotation of the experimental objects having the mass imbalances. Many of the experimental objects placed in the boxes are plants or animals that grow, with changes in the mass, thereby causing mass imbalances between each of the boxes. On the other hand, in space, measurements of weights of the experimental objects or measurements of weight imbalances are not so easy as they are on the ground and any appropriate means therefor is desired. If, in microgravitational space, masses of the experimental objects or imbalance amounts thereof can be easily measured, control measures for the vibrational forces caused in the rotating apparatus, while rotating, can be taken more securely.

DISCLOSURE OF THE INVENTION

It is therefore an object of the present invention to provide a microgravitational rotating apparatus vibration control system that comprises a substance mass measuring system that is able to easily measure masses of experimental objects placed in rotating boxes, without the need to take the experimental objects out of the boxes, to thereby foreknow weight imbalance amounts of the rotator.

It is also an object of the present invention to provide a microgravitational rotating apparatus vibration control system in which, in order to cope with arbitrary vibration caused in the rotating apparatus in space, a counterweight is provided and, by adjusting the position of the counterweight, imbalance amounts of the rotating apparatus caused by different sizes of the experimental objects placed in the boxes are solved and vibration caused by the imbalance amounts is actively or passively controlled to thereby reduce arbitrary vibration modes.

It is also an object of the present invention to provide a microgravitational rotating apparatus vibration control system in which, in order to cope with arbitrary vibration caused in the rotating apparatus, a counterweight is provided movably in a rotating supporting structure and, by moving the counterweight, the arbitrary vibration modes can be reduced.

In order to achieve the abovementioned objects, the present invention provides the apparatus mentioned in (1) to (44) below.

(1) A microgravitational rotating apparatus vibration control system, the microgravitational rotating apparatus comprising a casing, a rotary shaft provided within the casing having both its ends supported by bearings so as to be rotationally driven by a motor, a plurality of arms, extending radially, having their one ends fitted to a circumferential periphery of the rotary shaft and a rotator having a plurality of boxes, fitted to the other ends of the plurality of arms, in which a gravitational, or gravity-adding, object is placed. Vibration occurring in the rotator is controlled by the bearings.

(2) A microgravitational rotating apparatus vibration control system as mentioned in (1) above, wherein the vibration control system enables measurement of a mass of the object by comprising, in each of the plurality of boxes, a plurality of side plates fitted substantially in parallel to side wall inner surfaces of the box via spring members. An acceleration sensor is fitted to each of the plurality of side plates, a distance sensor is fitted to an inner surface of the box corresponding to and close to the side plate for measuring a distance to the object. A computing unit is inputted with signals of the acceleration sensor when the object collides with the side plate, displacement signals of the spring members at the time of the collision and signals of the distance sensor on an initial position of the object before the collision and a position of the object at the time of the collision, and computes the mass of the object based on these signals.

(3) A microgravitational rotating apparatus vibration control system as mentioned in (1) above, wherein the vibration control system enables measurement of a mass of the object by comprising, in each of the plurality of boxes, a plurality of side plates, each having a pressure sensor, a displacement sensor and an acceleration sensor, or a sensor unit combining these sensors, fitted substantially in parallel to side wall inner surfaces of the box. A computing unit is inputted with signals of the respective sensors or the sensor unit on a load of the object added on the side plate and computes the mass of the object based on these signals.

(4) A microgravitational rotating apparatus vibration control system as mentioned in (2) or (3) above, has the mass measuring system further comprising a display unit that displays results of computation by the computing unit.

(5) A microgravitational rotating apparatus vibration control system as mentioned in (1) above, wherein one or more of the plurality of boxes are cabins, laboratories, containers, space factories, etc. The vibration control system enables measurement of a mass of the object by comprising, in each of the boxes, a side plate fitted to one side wall inner surface of the box via a spring member having a displacement sensor, an acceleration sensor fitted to the side plate, a first position sensor detecting the object arriving at a position of the side plate, a second position sensor arranged at a predetermined distance from the first position sensor and detecting passing of the object, a push-out device provided on the opposite side of the side plate in the box and pushing out the object toward the side plate and a computing unit that takes signals of the arrival and passing of the object detected by the first and second position sensors, signals of the acceleration sensor when the object collides with the side plate and signals of the displacement sensor of the spring member at the time of the collision, and computes the mass of the object based on these signals.

(6) A microgravitational rotating apparatus vibration control system as mentioned in (1) above, wherein one or more of the plurality of boxes are cabins, laboratories, containers, space factories, etc. The vibration control system enables measurement of a weight of a human body as the object by comprising, in each of the boxes, a side plate fitted to one side wall inner surface of the box via a spring member having a displacement sensor, an acceleration sensor fitted to the side plate, a first position sensor detecting the human body arriving at a position of the side plate, a second position sensor arranged at a predetermined distance from the first position sensor and detecting passing of the human body, a stand having a handrail, provided on the opposite side of the side plate in the box, by which the human body jumps toward the side plate, and a computing unit that takes signals of the arrival and passing of the human body detected by the first and second position sensors, signals of the acceleration sensor when the human body collides with the side plate and signals of the displacement sensor of the spring member at the time of the collision, and computes the weight of the human body based on these signals.

(7) A microgravitational rotating apparatus vibration control system as mentioned in (5) or (6) above, wherein the mass measuring system further comprises a display unit that displays results of computation by the computing unit.

(8) A microgravitational rotating apparatus vibration control system as mentioned in (1) above, wherein the vibration control system comprises a plurality of acceleration sensors fitted to predetermined measuring points of the rotator. A counterweight is arranged on each of the plurality of boxes to be movable in the direction along an axis of the rotary shaft. A drive means drives the counterweight and a control unit takes signals detected by the plurality of acceleration sensors to thereby detect imbalance amounts in the acceleration caused during rotation between each of the plurality of boxes and controls the drive means so as to adjust a moving position of the counterweight to thereby resolve the imbalance amounts to control vibration.

(9) A microgravitational rotating apparatus vibration control system as mentioned in (8) above, wherein the vibration control system further comprises a counterweight and a drive means thereof, both provided around each of the plurality of arms. The counterweight is electrically driven to be movable in parallel with the arm at a distance from the rotary shaft.

(10) A microgravitational rotating apparatus vibration control system as mentioned in (9) above, wherein the plurality of acceleration sensors are fitted to the plurality of arms and boxes and the counterweight movable in parallel with the arm is arranged in one piece or in plural pieces with respect to each of the plurality of arms.

(11) A microgravitational rotating apparatus vibration control system as mentioned in any one of (8) to (10) above, wherein the control unit, in controlling vibration by detecting the imbalance amounts, enables an active vibration control by slightly moving the counterweight in such a direction that vibration of the box may not occur in a predetermined frequency.

(12) A microgravitational rotating apparatus vibration control system as mentioned in (11) above, wherein the control unit has a control function not only to move the counterweight so as to enable active vibration control but in a stationary state, also to be able to electrically move the counterweight so as to solve imbalance amounts of an entire system of the arm and box.

(13) A microgravitational rotating apparatus vibration control system is characterized in that the vibration control system has a necessary function of solving rotation imbalance amounts and controlling vibration by combining the constructions mentioned in (8) to (12) above.

(14) A microgravitational rotating apparatus vibration control system as mentioned in any one of (8) to (13) above is characterized in that the drive means drives the counterweight by a threaded bar that engages with the counterweight via a thread engagement.

(15) A microgravitational rotating apparatus vibration control system as mentioned in any one of (8) to (13) above is characterized in that the drive means drives the counterweight by means of a cable and a pulley.

(16) A microgravitational rotating apparatus vibration control system as mentioned in any one of (8) to (15) above is characterized in that the control unit, in controlling the counter weight by a control means, detects vibration of each of the plurality of boxes from detected signals taken from the acceleration sensor, compares the vibration with a predetermined demand value and controls the vibration so as to suppress the vibration below the demand value.

(17) A microgravitational rotating apparatus vibration control system as mentioned in any one of (8) to (16) above is characterized in that the control unit, in order to measure weight imbalance amounts between each of the plurality of boxes before start of rotation, rotates the rotator by a predetermined amount and thereby, in the relation between a displacement of the rotary shaft in an axial direction of the rotary shaft or in an arbitrary direction orthogonal to the rotary shaft and a power given to the motor, enables measurement of the imbalance amounts.

(18) A microgravitational rotating apparatus vibration control system as mentioned in any one of (8) to (16) above is characterized in that the control unit, in order to measure an entire weight of the rotator including the plurality of boxes before start of rotation, rotates the rotator by a predetermined amount and thereby, in the relation between any of a displacement, an acceleration and both of the displacement and acceleration, and power given to the motor, enables measurement of the weight of an entire system of the rotator in the microgravitational environment in space.

(19) A microgravitational rotating apparatus vibration control system as mentioned in any one of (8) to (16) above is characterized in that the control unit, in order to measure an entire weight of the rotator including the plurality of boxes before start of rotation, gives power to the motor by a predetermined amount and thereby, in the relation between a displacement of the rotary shaft in an axial direction of the rotary shaft or in an arbitrary direction orthogonal to the rotary shaft and power given to the motor, enables measurement of the weight of an entire system of the rotator in the microgravitational environment in space.

(20) A microgravitational rotating apparatus vibration control system as mentioned in any one of (17) to (19) above is characterized in that the control unit, based on the result of the measurement, electrically moves an arbitrary number of the counterweights before start of rotation and thereby enables correction of the weight imbalance amounts of an entire system of the rotator before regular rotation.

(21) A microgravitational rotating apparatus vibration control system as mentioned in (20) above is characterized in that the correction of the weight imbalance amounts is effected plural times so as to enable enhancement of the correction accuracy of the imbalance amounts.

(22) A microgravitational rotating apparatus vibration control system as mentioned in any one of (17) to (21) above is characterized in that the measurement or the correction of the imbalance amounts is effected with a calibration function.

(23) A microgravitational rotating apparatus vibration control system as mentioned in any one of (8) to (22) above is characterized in that a link member, enabling any movement of 1 to 3 freedoms, is interposed between the box and the arm so as to enable a vibration control in such a direction also that the counterweight, effecting an active vibration control, is movable.

(24) A microgravitational rotating apparatus vibration control system as mentioned in any one of (8) to (22) above is characterized in that an elastic or plastic member, enabling any movement of 1 to 3 freedoms, is interposed between the box and the arm so as to enable a vibration control in such a direction also that the counterweight, effecting an active vibration control, is movable.

(25) A microgravitational rotating apparatus vibration control system as mentioned in any one of (8) to (22) above is characterized in that the link member of (23) above and the elastic or plastic member of (24) above are combined for supporting the portion between the box and the arm to thereby enable a vibration control by the counterweight.

(26) A microgravitational rotating apparatus vibration control system as mentioned in any one of (8) to (25) above is characterized in that the bearings are any of elastically supported bearings, plastically supported bearings, magnetic bearings, air cushion type bearings, spring or damper type bearings, motor type bearings and fluid type bearings.

(27) A microgravitational rotating apparatus vibration control system as mentioned in (26) above is characterized in that the bearings are magnetic bearings that change magnetic force so as to enable an active vibration control of a rotator.

(28) A microgravitational rotating apparatus vibration control system as mentioned in (26) above is characterized in that the damper type bearings are of any of hydraulic a type, fluid type, motor type and pneumatic type that actively change damping force so as to enable vibration control.

(29) A microgravitational rotating apparatus vibration control system as mentioned in (8) or (9) above is characterized in that the rotator, comprising the rotary shaft and plurality of arms and boxes, is supported rotatably to the casing via a plurality of springs of which the elastic force is adjustable and the control unit enables a vibration control of the rotator by adjusting the elastic force of the plurality of springs based on signals from the acceleration sensor.

(30) A microgravitational rotating apparatus vibration control system as mentioned in (1) above is characterized in that the vibration control system comprises a plurality of acceleration sensors fitted to desired measuring points of the rotator, a vibration generator fitted to a desired position of each of the plurality of boxes and a control unit that takes signals detected by the plurality of acceleration sensors to detect imbalance amounts in the acceleration caused between each of the plurality of boxes during rotation and controls the vibration generator so as to enable a vibration control by resolving the imbalance amounts.

(31) A microgravitational rotating apparatus vibration control system as mentioned in any one of (8), (10) and (30) above is characterized in that the casing at its outer periphery is supported to an outside stationary side via a plurality of vibration isolating devices that have an elastic force.

(32) A microgravitational rotating apparatus vibration control system as mentioned in any one of (8), (10), (30) and (31) above is characterized in that the plurality of boxes, instead of being supported to the plurality of arms, are contained in a driven rotator that rotates together with the rotary shaft around an axis of the rotary shaft.

(33) A microgravitational rotating apparatus vibration control system as mentioned in (31) above is characterized in that each of the plurality of vibration isolating devices receives vibration transmitted to the casing and effects an active vibration control by changing its elastic coefficient or damping factor or both of the elastic coefficient and the damping factor.

(34) A microgravitational rotating apparatus vibration control system as mentioned in (31) above is characterized in that each of the plurality of vibration isolating devices comprises only a passive spring as a means of the vibration control.

(35) A microgravitational rotating apparatus vibration control system as mentioned in (31) above is characterized in that each of the plurality of vibration isolating devices comprises a passive spring and a damper as a means of the vibration control.

(36) A microgravitational rotating apparatus vibration control system as mentioned in (31) above is characterized in that each of the plurality of vibration isolating devices is constructed of a passive spring and a material having a damping characteristic.

(37) A microgravitational rotating apparatus vibration control system as mentioned in (31) above is characterized in that the plurality of vibration isolating devices are fitted between the outer periphery of the casing and the stationary side such that acting directions of the elastic forces of all of the plurality of vibration isolating devices are inclined to an axial direction of the rotary shaft.

(38) A microgravitational rotating apparatus vibration control system as mentioned in (31) above is characterized in that the plurality of vibration isolating devices are fitted between the outer periphery of the casing and the stationary side such that acting directions of the elastic forces of all of the plurality of vibration isolating devices are either same as or orthogonal to an axial direction of the rotary shaft.

(39) A microgravitational rotating apparatus vibration control system as mentioned in (31) above is characterized in that the plurality of vibration isolating devices are fitted between the outer periphery of the casing and the stationary side such that acting directions of the elastic forces of the plurality of vibration isolating devices share a combination of those inclined to, the same as and orthogonal to an axial direction of the rotary shaft.

(40) A microgravitational rotating apparatus vibration control system as mentioned in (1) above is characterized in that the plurality of arms are a plurality of hollow shaped supporting structures and the vibration control system comprises an acceleration sensor, detecting accelerations in the 1 to 3 dimensional directions, fitted to each of the plurality of boxes, a counterweight arranged to be movable along a longitudinal direction in each of the plurality of supporting structures, a drive means, driving the counterweight, arranged in each of the plurality of supporting structures and a control unit that takes signals detected by the acceleration sensor to detect vibration of each of the plurality of boxes, selects the counterweight of the supporting structure corresponding to the box causing the vibration and controls the drive means corresponding to the counterweight so as to move the counterweight in the direction reverse to the vibration to thereby reduce the vibration.

(41) A microgravitational rotating apparatus vibration control system as mentioned in (40) above is characterized in that, where a horizontal direction is defined as a direction along a rotating plane of the plurality of supporting structures, an orthogonal direction is defined as a direction tangential to a rotating circle of the plurality of supporting structures and a vertical direction is defined as a direction vertical to the rotating plane of the plurality of supporting structures, an orthogonal horizontal supporting structure, extending in the orthogonal and horizontal direction, and a vertical supporting structure, extending in the vertical direction, are provided both between each of the plurality of supporting structures and each of the plurality of boxes and a counterweight is arranged to be movable along a longitudinal direction in each of the orthogonal horizontal supporting structure and the vertical supporting structure.

(42) A microgravitational rotating apparatus vibration control system as mentioned in (40) or (41) above is characterized in that the drive means comprises a linearly driving type cylinder.

(43) A microgravitational rotating apparatus vibration control system as mentioned in (40) or (41) above is characterized in that the drive means comprises a means to move the counterweight frontward and backward by a gas pressure.

(44) A microgravitational rotating apparatus vibration control system as mentioned in (40) or (41) above is characterized in that the drive means comprises a linear motor coil applied to an inner wall surface of the respective supporting structures so that the counterweight, made of a magnetic material, may be moved.

In the apparatus (1) of the present invention, the object as an experimental object, that adds gravity in microgravitational space, is placed in each of the boxes and the boxes are rotated around the axis of the rotary shaft. The objects placed in the boxes are, for example, plants or animals and the weights thereof are not balanced between each of the boxes. Thus, if the rotator rotates, differences in the acceleration and vibration occur. The rotary shaft is, at its both ends, supported by the bearings, and these bearings are constructed, for example, by magnetic bearings, elastic material-supported or spring-supported bearings, etc. Hence, the vibration occurring in the rotary shaft is absorbed by the bearings and the vibration of the rotator can be suppressed to the minimum.

In the apparatus (2) of the present invention, the object is contained in the box under the microgravitational environment and the mass thereof cannot be easily measured. Hence, when the mass of the object is to be measured by the present invention, a method of instantly accelerating the rotation of the rotary shaft is employed and the object is caused to collide with any of the side plates provided on the side wall inner surfaces of the boxes. The computing unit is inputted with the acceleration signals sent from the acceleration sensor at the time of the collision, the displacement signals of the spring members at the time of the collision and the position signals of the object sent from the distance sensor and, based on these signals, can compute the mass of the object while the object remains placed in the box.

According to the apparatus (2) of the present invention, as the object remains placed in the box, there is no need of taking the object outside during the experiments and the mass can be easily measured by only causing the object to collide with the side plate provided in the box under the microgravitational environment.

In the apparatus (3) of the present invention, the computing unit is inputted with the signals from the pressure sensor, the displacement sensor and the acceleration sensor and measures the mass of the object by computation, as in the means (2) above. Hence, by using more sensors, the mass can be measured to a higher accuracy.

In the apparatus (4) of the present invention, the results of the computation by the computing unit are displayed on the display unit. Hence, the mass of the object can be easily confirmed, whenever necessary, without handling the object, and the function of the system of the apparatus (2) above can be greatly enhanced.

In the apparatus (5) of the present invention, at the start of the measurement, the object to be measured is pushed out by the push-out device toward the side plate and is caused to fly in the space in the box and collide with the side plate. During this movement of the object, the second position sensor detects the passing of the object and the first position sensor detects the arrival thereof at the side plate. The computing unit takes the signals of the first and the second position sensors, the signals of the acceleration sensor at the time of the collision of the object and the signals of the spring members and, based on these signals, computes the velocity and the acceleration of the object and also, based on such computed values and the signals of the acceleration sensor and the displacement signals of the spring members, computes the mass of the object. Hence, according to the apparatus (5) of the present invention, by only causing the object to collide with the side plate, the mass of the object can be easily measured by computation.

In the apparatus (6) of the present invention, in place of the push-out device of the apparatus (5) above, the stand having the handrail is provided and the object to be measured is a human body, such as an astronaut working in space, so that the weight of the human body may be easily measured in the microgravitational environment. The human body to be measured grips the handrail and, by the reaction thereof, jumps toward the side plate to collide with the side plate. As in the measurement of the mass of the object by the apparatus (5) above, the signals of the first and the second position sensors, the displacement signals of the spring members and the signals of the acceleration sensor are taken into the computing unit and the weight of the human body can be computed at the computing unit.

In the apparatus (7) of the present invention, the mass of the object or the weight of the human body computed at the computing unit is displayed at the display unit. Hence, the function of the apparatus (5) and (6) above of the present invention is further enhanced.

In the apparatus (8) to (11) and (16) of the present invention, the counterweight movable vertically, that is, in the direction along the axis of the rotary shaft, or the counterweight movable horizontally, that is, parallel with the arm, is provided. When vibration occurs due to differences in the weight of the object and in the acceleration during the rotation, the control unit detects the vibration by the signals from the acceleration sensors and controls the drive means to adjust the position of the counterweight so as to resolve the imbalance amounts in the rotation. By this adjustment of the counterweight, the imbalance amounts caused in the rotating apparatus during the rotation are solved and also the vibration caused by the imbalances is controlled. Also, in the means (13) of the present invention, the counterweight movable vertically and the counterweight movable horizontally are combined so as to adjust the movement of the counterweight more precisely, whereby a more effective vibration control becomes possible.

In the apparatus (12) of the present invention, the movement of the counterweight is controlled not only during the rotation but also in the stationary state and the weight imbalance amounts of the entire system of the arm and box can be resolved.

In the apparatus (14) and (15) of the present invention, the drive means of the counterweight can be realized by the simple mechanism using the rotatable threaded bar or the combination of the cable and pulleys and the construction of the apparatus can be simplified.

In the apparatus (17) to (22) of the present invention, in the relation between the displacement of the rotary shaft and the power given to the motor, the control unit can measure the imbalances in the weight of the boxes and the weight of the entire rotator before the start of the rotation and, based on the results of the measurement, can control the position of the counterweight so as to correct the imbalance amounts.

Also, in the apparatus (23) to (25) of the present invention, the link member or the elastic or plastic member or the combination of these members is interposed in the supporting portion between the arm and the box and the vibration can be effectively absorbed. Further, in the apparatus (26) to (28) of the present invention, the bearings of the rotary shaft can be employed from any of the elastic or plastic type, electromagnetic type, pneumatic type, spring type, damper type, motor type and fluid type, and thereby the vibration can be effectively absorbed.

In the apparatus (29) of the present invention, the entire rotator is supported to the casing via the springs of which elastic force is adjustable. The control unit, detecting the imbalances in the acceleration by the signals from the acceleration sensor, controls to appropriately adjust the elastic force of the corresponding spring, and the vibration can be effectively absorbed by the spring of the place where the vibration occurred.

In the apparatus (30) of the present invention, the imbalances in the acceleration occurring in the box are detected by the acceleration sensors and the signals thereof are inputted into the control unit. The control unit controls the vibration generator of that box so as to resolve the imbalances and the vibration caused by the imbalances can be absorbed.

In the apparatus (31) of the present invention, the entire casing is supported to the outside stationary part via the vibration isolating devices. Hence, the vibration that is not completely controlled by the vibration control system provided in the casing and spreads outside of the casing can be absorbed by the elasticity of the vibration isolating devices provided on the outer periphery of the casing and transmission of the vibration to the outside can be prevented.

In the apparatus (32) of the present invention, the boxes are contained in the containing portions of the rotator having no structure of the arms. The rotator, together with the plurality of boxes, are rotated by the rotary shaft, wherein the vibration control systems as mentioned in the apparatus (8), (10), (30) and (31) are applied to the present apparatus (32). Thus, an effective vibration control can be effected.

In the apparatus (33) of the present invention, the vibration isolating devices effect an active vibration control of the vibration of the casing so as to effectively absorb the vibration without transmission of the vibration to the outside. Also, the vibration isolating device comprises the passive spring in the apparatus (34), the passive spring and the damper in the apparatus (35) and the passive spring and the damping characteristic material in the apparatus (36), whereby small vibration of the casing is absorbed by the simple mechanism. Thus, the vibration control mechanism can be simplified.

In the apparatus (37) of the present invention, the vibration isolating devices are fitted inclinedly to the axis of the rotary shaft and thereby the vibrations caused in the three dimensional arbitrary directions can be absorbed as a whole. Also, the vibration isolating devices are fitted along the direction same as or orthogonal to the axial direction of the rotary shaft in the apparatus (38) or along the direction inclined to, same as or orthogonal to the axial direction of the rotary shaft in the apparatus (39). Thus, the apparatus of the invention can be appropriately selected out of those (37), (38) and (39) according to the vibration patterns caused by the specification of the rotating apparatus or the state of the experiments.

In the apparatus (40) of the present invention, while the experimental objects, for example, plants, are placed in the boxes and are rotated for experiments in the space, there are caused imbalances in the sizes and weights of the experimental objects placed in the boxes and this causes vibration between each of the boxes following the rotation. In this case, the control unit takes the signals from the acceleration sensor fitted to each of the boxes to thereby detect one to three dimension directional vibration components of the box causing the vibration and moves the counterweight in the direction to cancel the vibration, that is, drives the drive means of the counterweight of the supporting structure on the opposite side to thereby move the counterweight in the direction to effect the vibration control. Thus, the vibration can be effectively controlled.

In the apparatus (41) of the present invention, at the connection portion between the horizontal supporting structure and the box of the apparatus (40), the orthogonal horizontal supporting structure and the vertical supporting structure are provided. By this construction, the supporting structure in the direction of X axis, that is, the horizontal supporting structure, the supporting structure in the direction of Y axis, that is, the orthogonal horizontal supporting structure, and the supporting structure in the direction of Z axis, that is, the vertical supporting structure, as well as the respective counterweights arranged therein, are provided for each of the boxes. Hence, for each of the boxes, there are provided the counterweights movable in the one to three dimensional directions of the X, Y and Z axes and thereby the vibration caused in each of the boxes can be controlled by moving the counterweights in the direction reverse to the vibration along the X, Y and Z axes. When vibration occurs in any of the boxes, the X, Y and Z axes directional components of the vibration are detected by the control unit. The control unit selects the counterweights of the supporting structures of the X, Y and Z axes directions provided on the opposite side in the axial symmetry of the box causing the vibration and controls to move the counterweights in the direction reverse to the vibration. Thereby, the vibration can be controlled. Thus, by the apparatus (41) of the present invention, the vibration can be controlled more finely than in the apparatus (40).

The drive means of the counterweight is the cylinder in the apparatus (42), the gas pressure in the apparatus (43) and the linear motor in the apparatus (44). Thus, the application range of the present invention is enlarged and the drive means appropriate for the respective characteristics of the apparatus can be selected.

BRIEF DESCRIPTION OF THE DRAWINGS

FIGS. 1(a) and (b) show a microgravitational rotating apparatus vibration control system, as an example to which a substance mass measuring system is applied, of a first embodiment according to the present invention, wherein FIG. 1(a) is a cross sectional side view and FIG. 1(b) is a cross sectional view taken on line A—A and seen in the arrow direction of FIG. 1(a).

FIGS. 2(a) and (b) show details of an interior of a box used in the substance mass measuring system of the first embodiment, wherein FIG. 2(a) is a cross sectional plan view and FIG. 2(b) is a cross sectional view taken on line B—B and seen in the arrow direction of FIG. 2(a).

FIG. 3 is a control system diagram of the substance mass measuring system of the first embodiment.

FIGS. 4(a) and (b) are explanatory views showing a principle of the substance mass measuring system of the first embodiment, wherein FIG. 4(a) is an explanatory view of a substance collision and FIG. 4(b) is an explanatory view of a substance moving distance.

FIGS. 5(a) and (b) show wiring arrangement of the substance mass measuring system of the first embodiment, wherein FIG. 5(a) is a cross sectional side view and FIG. 5(b) is a cross sectional view taken on line C—C and seen in the arrow direction of FIG. 5(a).

FIGS. 6(a) to (d) show a microgravitational environment substance mass measuring system of a second embodiment according to the present invention, wherein FIG. 6(a) is a cross sectional side view, FIG. 6(b) is a view in which a push-out device of FIG. 6(a) works, FIG. 6(c) is a cross sectional view taken on line D—D and seen in the arrow direction of FIG. 6(a) and FIG. 6(d) is a cross sectional view taken on line E—E and seen in the arrow direction of FIG. 6(a).

FIG. 7 is a control system diagram of the substance mass measuring system of the second embodiment.

FIGS. 8(a) and (b) show a microgravitational environment substance mass measuring system of a third embodiment according to the present invention, wherein FIG. 8(a) is a cross sectional view and FIG. 8(b) is a cross sectional view taken on line F—F and seen in the arrow direction of FIG. 8(a).

FIGS. 9(a) and (b) show a microgravitational rotating apparatus vibration control system of a fourth embodiment according to the present invention, wherein FIG. 9(a) is a cross sectional side view and FIG. 9(b) is a cross sectional view taken on line G—G and seen in the arrow direction of FIG. 9(a).

FIGS. 10(a) to (c) show an interior of a counterweight case of the vibration control system of the fourth embodiment, wherein FIG. 10(a) is a cross sectional side view seen along the X axis, FIG. 10(b) is a cross sectional side view seen along the Y axis and FIG. 10(c) is a cross sectional view taken along line H—H and seen in the arrow direction of FIG. 10(a).

FIGS. 12(a) to (c) show a counterweight case containing a counterweight in a microgravitational rotating apparatus vibration control system of a fifth embodiment according to the present invention, wherein FIG. 12(a) is a cross sectional side view seen along the X axis, FIG. 12(b) is a cross sectional side view seen along the Y axis and FIG. 12(c) is a cross sectional view taken on line J—J and seen in the arrow direction of FIG. 12(a).

FIGS. 13(a) and (b) show a microgravitational rotating apparatus vibration control system of a sixth embodiment according to the present invention, wherein FIG. 13(a) is a cross sectional side view and FIG. 13(b) is a cross sectional view taken on line K—K and seen in the arrow direction of FIG. 13(a).

FIGS. 14(a) to (d) show an arrangement of counterweights of the sixth embodiment, wherein FIG. 14(a) is a side view, FIG. 14(b) is a cross sectional view taken on line K—K and seen in the arrow direction of FIG. 14(a), FIG. 14(c) is a cross sectional view taken on line L—L and seen in the arrow direction of FIG. 14(a) and FIG. 14(d) is a cross sectional view taken on line M—M and seen in the arrow direction of FIG. 14(a).

FIGS. 15(a) to (c) show an arrangement of counterweights in a microgravitational rotating apparatus vibration control system of a seventh embodiment according to the present invention, wherein FIG. 15(a) is a side view, FIG. 15(b) is a cross sectional view taken on line P—P and seen in the arrow direction of FIG. 15(a) and FIG. 15(c) is a cross sectional view taken on line Q—Q and seen in the arrow direction of FIG. 15(a).

FIGS. 18(a) to (c) show a microgravitational rotating apparatus vibration control system of a tenth embodiment according to the present invention, wherein FIG. 18(a) is a cross sectional side view, FIG. 18(b) is a cross sectional view taken on line R—R and seen in the arrow direction of FIG. 18(a) and FIG. 18(c) is a cross sectional view taken on line S—S and seen in the arrow direction of FIG. 18(a).

FIGS. 19(a) and (b) are graphs showing two examples of a demand value and a control effect of the vibration in the vibration control systems of the fourth to the tenth embodiments, wherein FIG. 19(a) shows an example where the vibration is of a rotary shaft having a natural vibration of a single natural value (X) and FIG. 19(b) shows an example where patterns of the natural frequency change to ($X_2$) from ($X_1$).

FIGS. 20(a) and (b) show a microgravitational rotating apparatus vibration control system of an eleventh embodiment according to the present invention, wherein FIG. 20(a) is a plan view and FIG. 20(b) is a side view.

FIGS. 21(a) to (c) show an interior of a supporting structure used in the eleventh embodiment, wherein FIG. 21(a) is a cross sectional plan view, FIG. 21(b) is a cross sectional side view and FIG. 21(c) is across sectional view taken on line T—T and seen in the arrow direction of FIG. 21(b).

FIGS. 23(a) and (b) show a microgravitational rotating apparatus vibration control system of a twelfth embodiment according to the present invention, wherein FIG. 23(a) is a plan view and FIG. 23(b) is a side view.

FIGS. 25(a) and (b) show a microgravitational rotating apparatus vibration control system of a fourteenth embodiment according to the present invention, wherein FIG. 25(a) is a side view and FIG. 25(b) is a cross sectional view taken on line U—U of FIG. 25(a).

FIGS. 28(a) and (b) show an interior of a supporting structure used in the fifteenth embodiment, wherein FIG. 28(a) is a longitudinal cross sectional view and FIG. 28(b) is a cross sectional view taken on line V—V of FIG. 28(a).

BEST MODE FOR CARRYING OUT THE INVENTION

Herebelow, the present invention will be described based on embodiments according to the present invention with reference to the appended drawings.

Figures 1A, 1B:
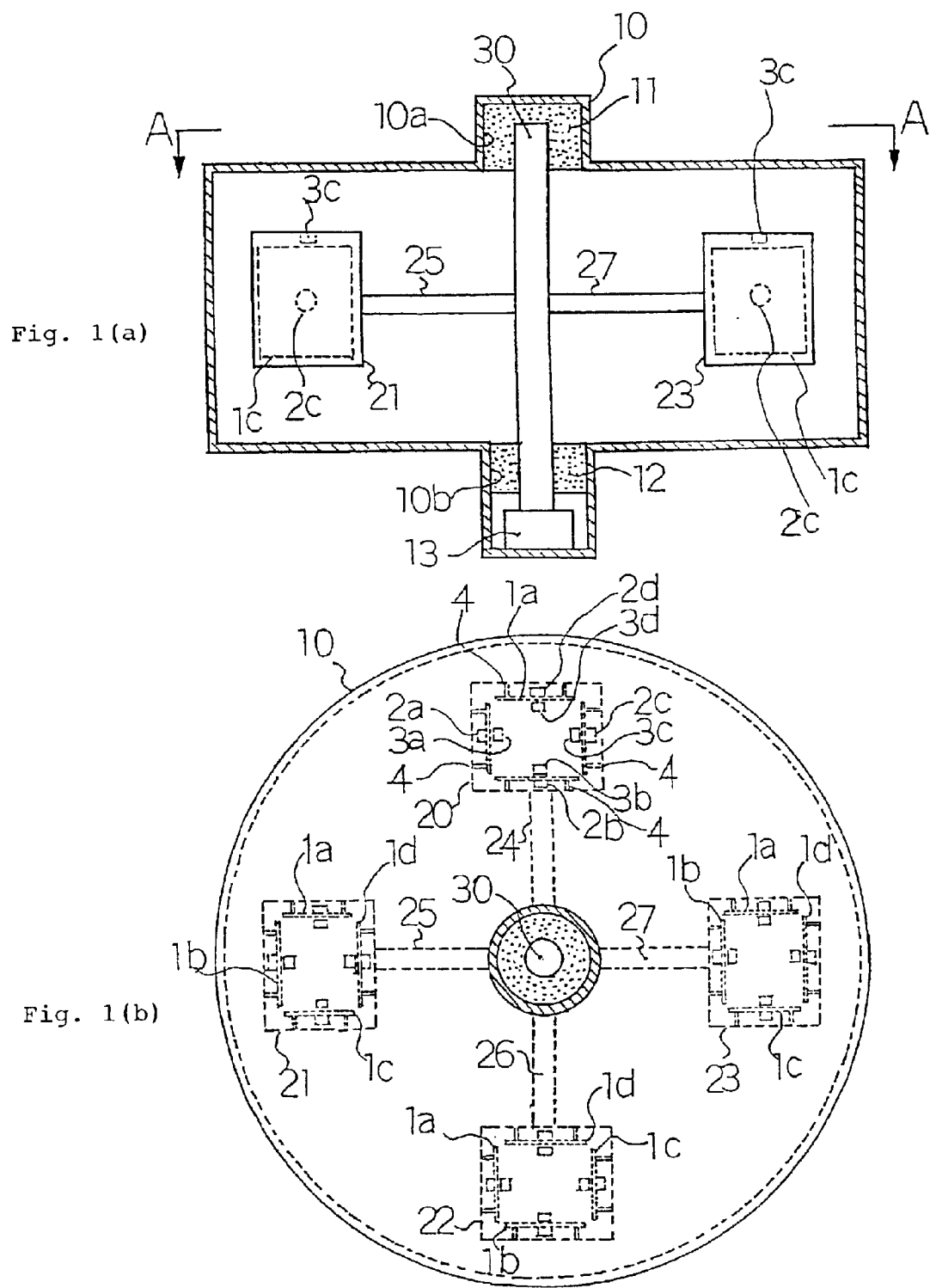

FIGS. 1(a) and (b) show a microgravitational rotating apparatus vibration control system, as an example to which a substance mass measuring system is applied, of a first embodiment according to the present invention, wherein FIG. 1(a) is a cross sectional side view and FIG. 1(b) is a cross sectional view taken on line A—A and seen in the arrow direction of FIG. 1(a). In FIG. 1(a), numeral designates a casing that comprises upper and lower recess portions 10a, 10b, both projecting outwardly. Within the recess portions 10a, 10b, there are provided bearings 11, 12, respectively. The bearings 11, 12 are constructed by magnetic bearings or other bearings comprising elastic materials, springs, etc.

Numeral 30 designates a rotary shaft that has its upper end supported by the bearing 11 within the recess portion 10a and its lower end connected to a motor 13 and supported by the bearing 12 both within the recess portion 10b. Arms 24, 25, 26, 27, as shown in FIG. 1(b), are fitted at their one ends to the rotary shaft 30 extending radially in the horizontal direction and boxes 20, 21, 22, 23 are fitted to the other ends of the respective arms 24 to 27.

In the rotating apparatus constructed as mentioned above, substances as measuring objects or experimental objects, such as plants or animals, are placed in the boxes 20 to 23 to be rotated by the motor 13 at a slow speed in the space environment, so that experiments to observe a growing state of the plants or a living state of the animals in space are carried out. As experimental objects having different shapes, sizes and weights are so contained in the boxes 20 to 23, when they rotate, there are caused differences in the acceleration due to weight imbalances between each of the boxes 20 to 23, thereby causing vibration of the boxes. This vibration spreads to vibrate the rotary shaft 30 via the arms 24 to 27 and further to the casing 10 via the bearing portions, thus being transmitted to the outside environment to give bad influences on the surroundings. In the present first embodiment, such vibration is to be controlled by the bearings 11, 12.

The above plants or animals contained in the boxes 20 to 23 grow as time passes to cause mass differences between each of the boxes and thereby imbalances in the rotator occur. In the microgravitational environment in space, the mass of the object cannot be measured as it is done on the ground and also such imbalance amount itself cannot be measured. Thus, the vibration control is to be done such that the resulting vibration caused by the rotation of the rotating apparatus is controlled by the bearings 11, 12.

In the first embodiment according to the present invention, the construction is made such that the mass of the experimental objects in the boxes of the rotating apparatus can be easily measured in space to thereby detect the mass imbalances, so that the vibration control may be effectively carried out.

That is, in FIGS. 1(a) and (b), in each of the square boxes 20 to 23, there are provided four side plates 1a, 1b, 1c, 1d fitted substantially in parallel to respective vertical side wall inner surfaces of the box via spring members 4. The spring members 4 are provided at four corner portions of each of the square side plates 1a to 1d. Each of the spring members 4 has a sensor (not shown) assembled therein for detecting a displacement signal of that spring member 4. At a back side surface central portion of the side plates 1a to 1d, there are provided acceleration sensors 2a, 2b, 2c, 2d, respectively. Also, on horizontal upper wall inner surfaces of the boxes 20 to 23 and at positions closely corresponding to upper end central portions of the side plates 1a to 1d, there are provided distance sensors 3a, 3b, 3c, 3d, respectively.

Figure 2A:
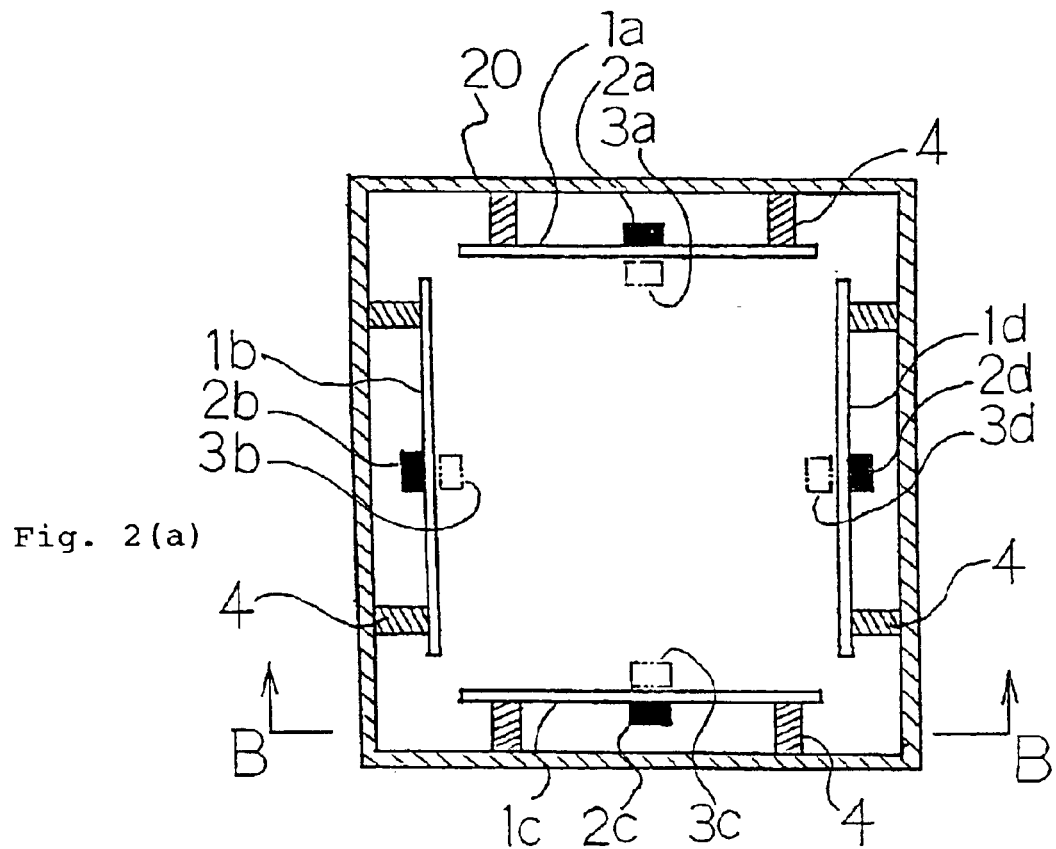
Figure 2B:
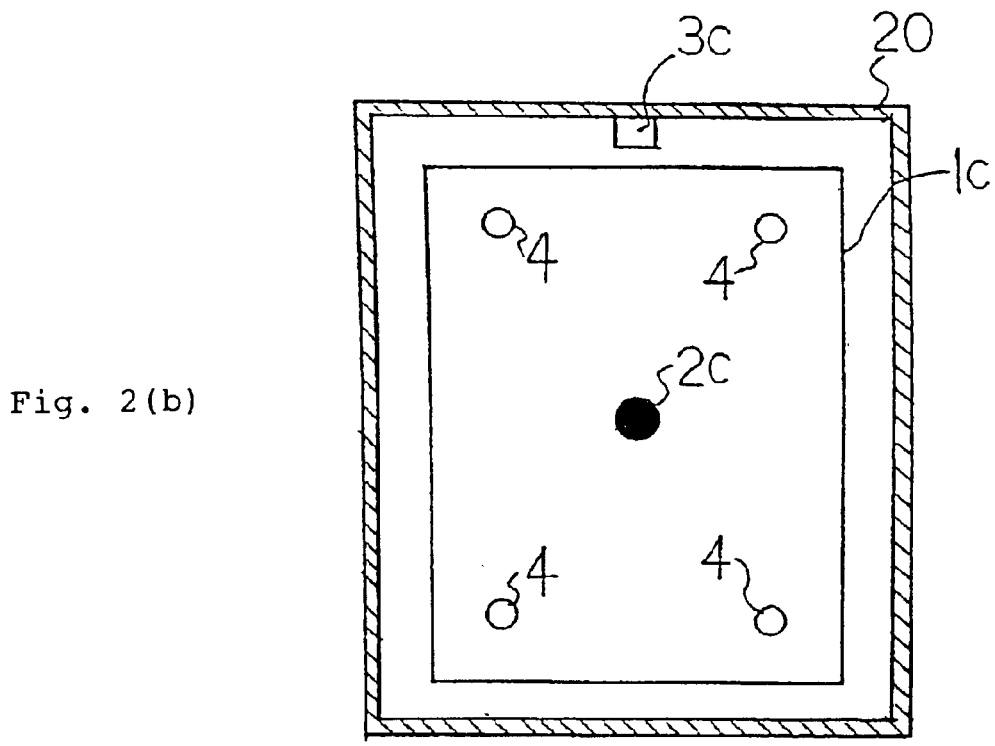

FIGS. 2(a) and (b) show details of an interior of the box 20 of the rotating apparatus used in the first embodiment, wherein FIG. 2(a) is a cross sectional plan view and FIG. 2(b) is a cross sectional view taken on line B—B and seen in the arrow direction of FIG. 2(a). In FIG. 2(a), the side plates 1a to 1d are fitted to the vertical side wall inner surfaces of the box 20 via the spring members 4. At the central portions of the back side surfaces, facing the box inner side walls, of the side plates 1a to 1d, the acceleration sensors 2a to 2d are fitted. Also, on the horizontal upper wall inner surfaces of the box 20 and at the positions closely corresponding to the upper end central portions of the side plates 1a to 1d, the distance sensors 3a to 3d are fitted, as schematically shown by phantom lines.

In FIG. 2(b), the distance sensor 3c is fitted to the inner surface of the upper wall of the box 20 so as to closely correspond to the upper end central portion of the side plate 1c. The side plate 1c is supported to one of the vertical side wall inner surfaces of the box 20 at four corner positions of the side plate 1c via the four spring members 4. The acceleration sensor 2c is fitted to the back side central position of the side plate 1c. This construction is the same with respect to the side plates 1a, 1b, 1d of the box 20 as well as the side plates 1a to 1d of the boxes 21 to 23 and description and illustration thereof are omitted.

FIG. 3 is a control system diagram of the substance mass measuring system of the first embodiment. For simplicity of the description, illustration is made only on the system of the box 20. Description and illustration on the systems of the boxes 21 to 23 are the same and omitted. In FIG. 3, the four side plates 1a to 1d are provided within the box 20, as mentioned above with respect to FIGS. 2(a) and (b). The acceleration sensors 2a to 2d are fitted to the respective side plates 1a to 1d and signals detected by the respective sensors 2a to 2d are inputted into a computing unit 5. The distance sensors 3a to 3d are fitted to the upper wall inner surface of the box 20 closely corresponding to the respective acceleration sensors 2a to 2d and signals detected by the respective sensors 3a to 3d are also inputted into the computing unit 5. Further, the displacement signals of the spring members 4 are inputted into the computing unit 5. Based on these signals, masses of the object substances within the box 20 are computed at the computing unit 5, as will be described later, and displayed at a display unit 6.

Figure 4A:
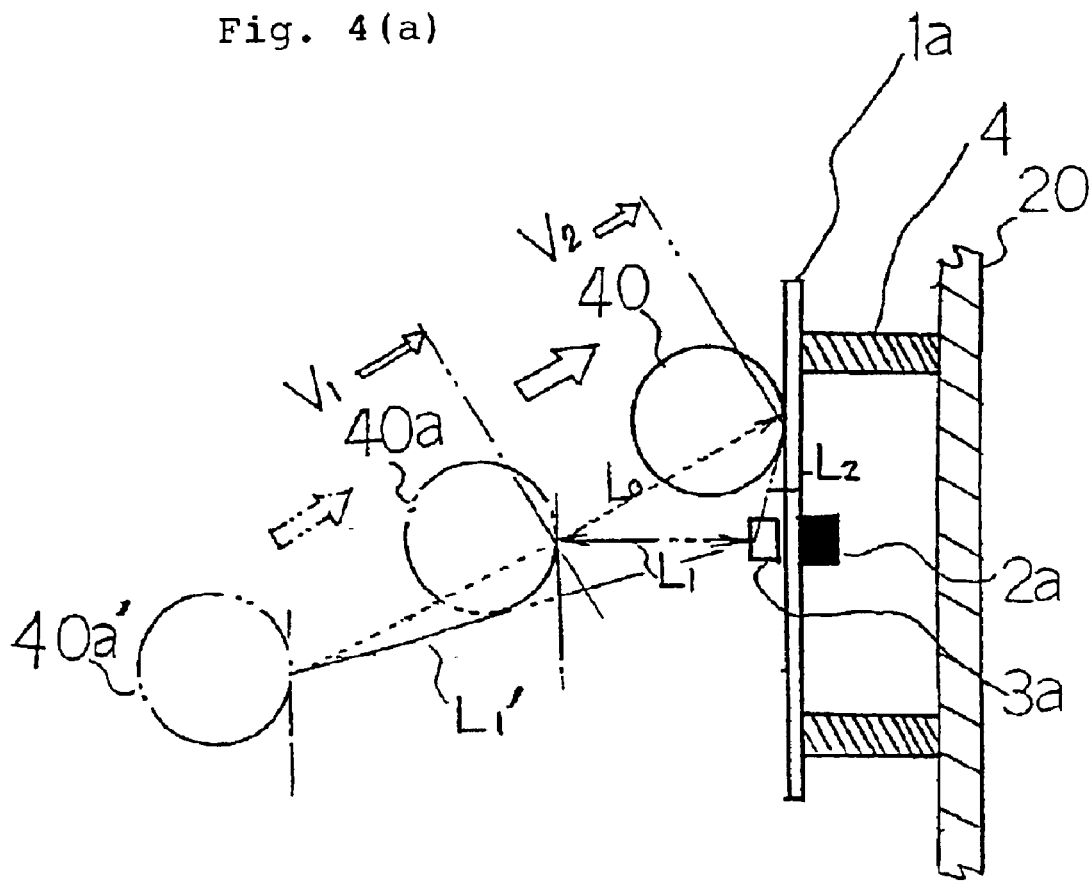
Figure 4B:
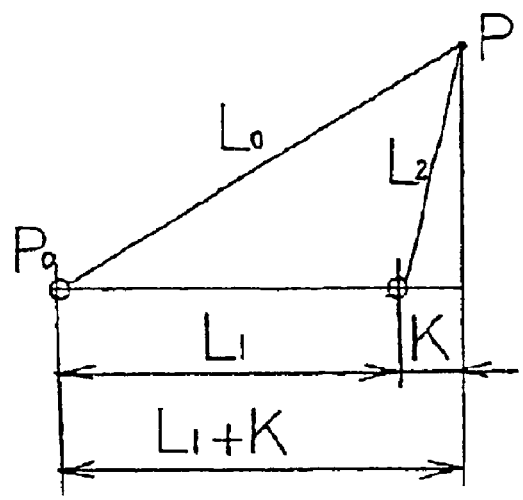

FIGS. 4(a) and (b) are explanatory views showing a principle of the substance mass measuring system of the first embodiment, wherein FIG. 4(a) is an explanatory view of a substance collision and FIG. 4(b) is an explanatory view of a substance moving distance. FIGS. 4(a) and (b) show an example of the side plate 1a of the box 20 only, but the principle is the same with respect to all the other side plates and description thereon is omitted. In FIG. 4(a), a substance 40 is moved from position 40a to collide with the side plate 1a. This movement of the substance can be effected by an adjustment to instantaneously change the rotation of the box 20, while it is rotating, to thereby make use of the centrifugal force. The illustration shows an example that the substance 40 moves obliquely upwardly in an initial velocity $V_1$ at the position 40a and collides with the side plate 1a at velocity $V_2$.

In the course of this movement of the substance 40, the distance sensor 3a measures distance $L_1$ between the position 40a and the sensor 3a, and distance $L_2$ between the position of collision and the sensor 3a and these data are inputted into the computing unit 5. Where a moving distance of the substance 40 is $L_o$, $L_o$ can be obtained by $L_1$ and $L_2$ at the computing unit 5. Also, the velocity $V_2$ can be computed as an average velocity by $V_2=L_o$/moving time (t). Likewise, the distance sensor 3a measures distance L between a previous position 40a' and the position 40a of the substance 40 and thereby the initial velocity $V_1$ of the substance 40 at the position 40a can be computed as an average velocity.

The acceleration signal measured by the acceleration sensor 2a at the time of collision as well as the displacement amount signal of the spring members 4 are inputted into the computing unit 5. In FIG. 4(b) showing the moving state of the substance 40 of FIG. 4(a), it is clear that, where K is a distance between the surface of the side plate 1a and the distance sensor 3a, the moving distance $L_o$ can be computed by the measured distances $L_1$ and $L_2$ and the constant value K.

That is, in the above state, where $V_1$ is the initial velocity, $V_2$ is the velocity at the time of collision, t is the moving time of the substance 40, α is the acceleration signal at the time of collision, $m_1$ is a mass of the side plate 1a, $m_2$ is the displacement amount signal of the spring member 4, $m_3$ is a coefficient including a viscosity of the space surrounding the substance 40, and also where F is a function of $m_1$ to $m_3$ and α, then mass M of the substance 40 is defined as $$M=[t/(V_2-V_1)]\times F(m_1, m_2, m_3, \alpha).$$

In the above state, $V_1$, $V_2$, t, α and $m_2$ are measured values or computed values, that is, $V_1$ and $V_2$ are computed values as mentioned above and $m_1$ and $m_3$ are known values. Hence, $t/(V_2-V_1)$ can be obtained by computation and also F ($m_1$, $m_2$, $m_3$, α) can be obtained. Thus, in the control system shown in FIG. 3, the computing unit 5 can compute the mass M of the object substance, that is, the substance 40, within the box 20 and this computed value is displayed in the display unit 6. It is to be noted that, although the description has been made on the example of the box 20, the principle is the same for the boxes 21 to 23 and the mass of the substances can be likewise measured.

Figure 5A:
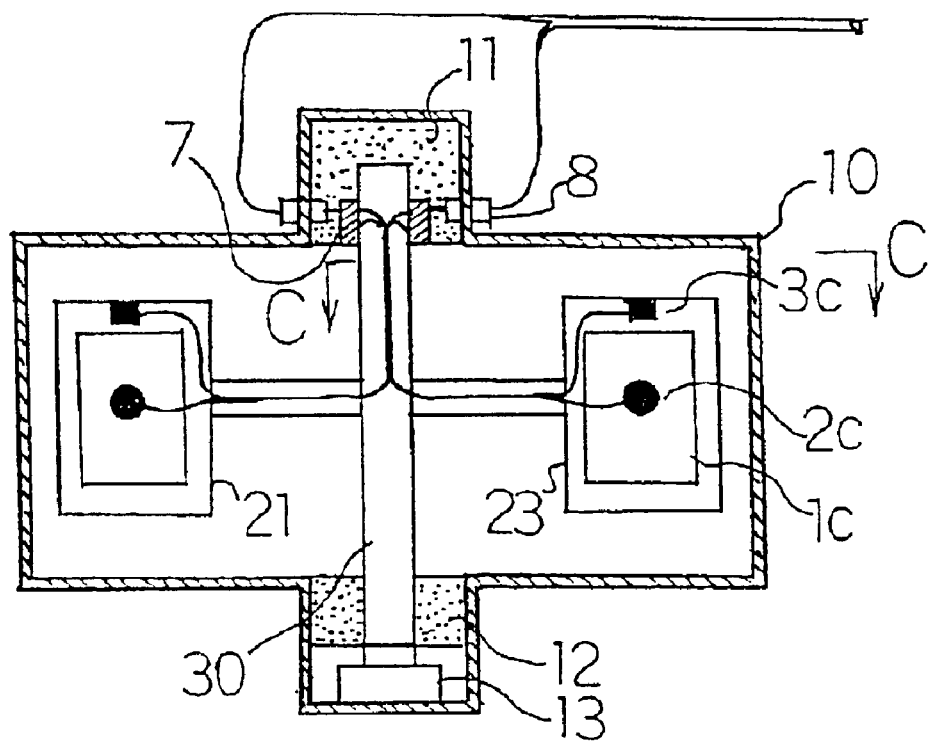
Figure 5B:
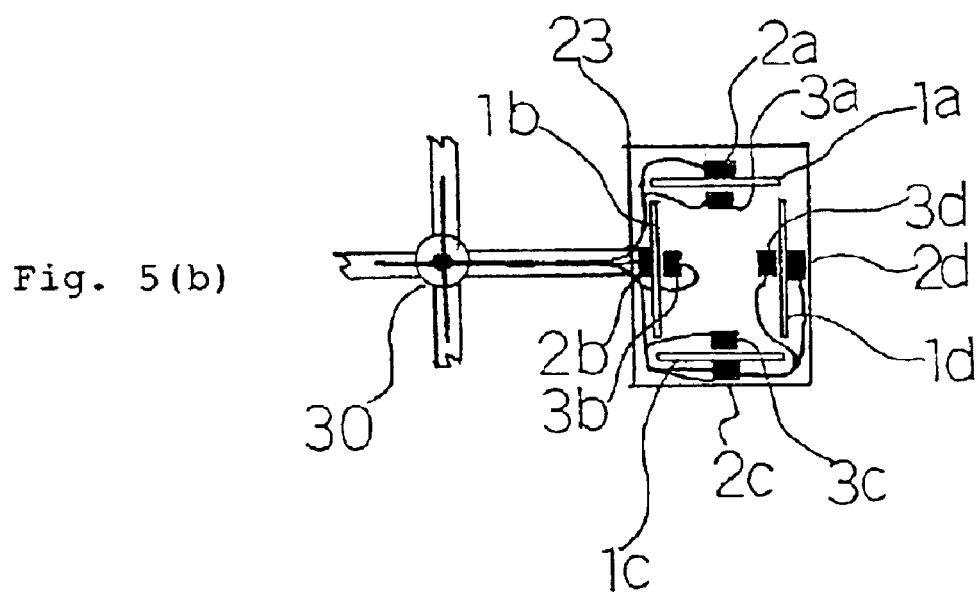

FIGS. 5(a) and (b) schematically show wiring arrangement of the substance mass measuring system described above, wherein FIG. 5(a) is a cross sectional side view and FIG. 5(b) is a cross sectional view taken on line C—C and seen in the arrow direction of FIG. 5(a). In FIGS. 5(a) and (b), wiring from the acceleration sensors 2a to 2d and the distance sensors 3a to 3d provided within each of the boxes 20 to 23 passes through the arms 24 to 27 and the rotary shaft 30 to be taken outside of the casing 10 of each of the boxes 20 to 23 via a slip ring 7 and a connector 8 and is connected to the computing unit 5 (FIG. 3).

According to the first embodiment as described above, the side plates 1a to 1d are fitted to the inner surfaces of the side walls of each of the boxes 20 to 23 via the spring members 4, wherein the side plates 1a to 1d have the acceleration sensors 2a to 2d fitted thereto and the boxes 20 to 23 have the distance sensors 3a to 3d fitted thereto. Thus, by simply causing the substance 40 in each of the boxes 20 to 23 to collide with the side plates 1a told, the mass of the substance 40 can be obtained by computation at the computing unit 5 to be displayed in the display unit 6.

It is to be noted that, while the above first embodiment has been described with an example where the acceleration sensors and the distance sensors are provided within the boxes, if pressure sensors, displacement sensors and acceleration sensors are arranged on the side plates 1a to 1d or sensor units comprising assembly of these sensors are fitted to the side plates 1a to 1d so that signals from these sensors may be taken for the computing unit to likewise compute the mass of the substance, then more accurate measurements can be effected.

Figure 6A:
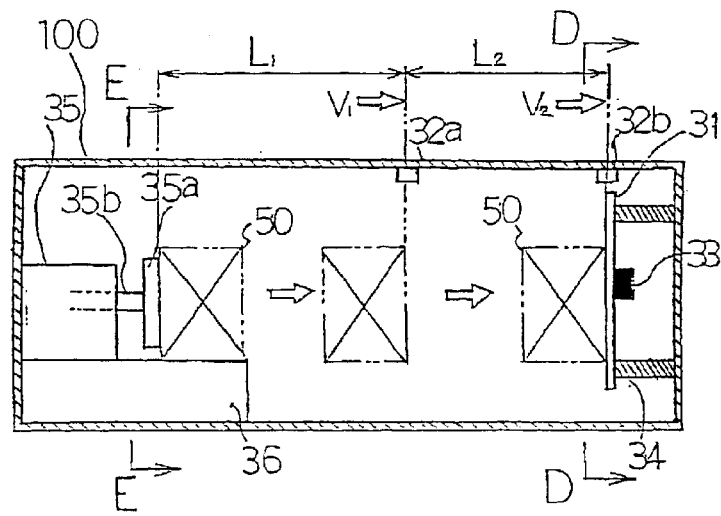
Figure 6B:
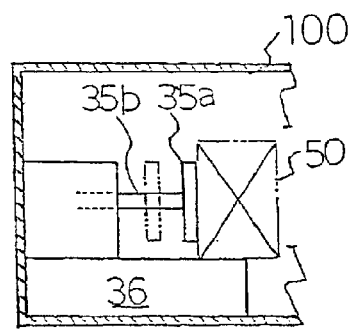
Figure 6C:
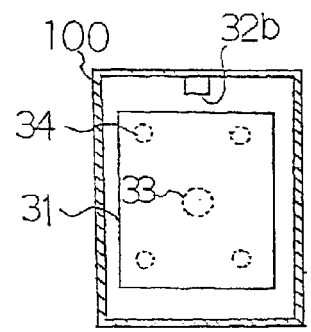
Figure 6D:
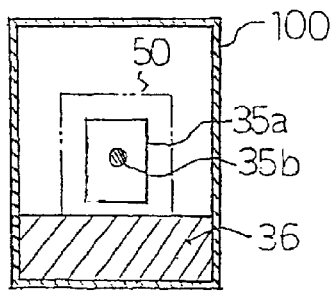

FIGS. 6(a) to (d) show a microgravitational environment substance mass measuring system of a second embodiment according to the present invention, wherein FIG. 6(a) is a cross sectional side view, FIG. 6(b) is a view in which a push-out device of FIG. 6(a) works, FIG. 6(c) is a cross sectional view taken on line D—D and seen in the arrow direction of FIG. 6(a) and FIG. 6(d) is a cross sectional view taken on line E—E and seen in the arrow direction of FIG. 6(a). In FIG. 6(a), numeral 100 designates a casing, that may be a room like a cabin, a laboratory, a container or a space factory. Also, the casing 100 may be the box as a rotator shown in FIG. 1 or may be a box-like structure provided detachably within a casing as described later with respect to FIG. 18.

Numeral 31 designates a side plate that is fitted to one side end of the casing 100 via spring members 34. Numerals 32a, 32b designate position sensors that are fitted to an inner surface of an upper wall of the casing 100. The position sensor 32a is arranged at an initial position of the measurement and the position sensor 32b at a position of the side plate 31. Numeral 33 designates an acceleration sensor that is fitted to a backside surface of the side plate 31. Numeral 34 designates the spring members mentioned above and each has a sensor (not shown) assembled therein for detecting a displacement amount of the spring.

Numeral 35 designates a push-out device that is arranged at the other side end, opposing the side plate 31, of the casing 100. When a piston 35b of the push-out device 35 works to elongate, a push-out plate 35a, fitted to an end of the piston 35b, projects to push out a substance 50 toward the side plate 31. Numeral 36 designates a table, and the substance 50 of which mass is to be measured is placed thereon.

FIG. 6(b) shows the state where the push-out device 35 works, wherein the piston 35b elongates to push the push-out plate 35a as well as the substance 50 so that the substance 50 may be pushed out into a space within the casing 100. In FIG. 6(c) showing the side plate 31, the acceleration sensor 33 is fitted to a central portion of the backside surface of the side plate 31 and the side plate 31 is fitted substantially parallel to the inner surface of one side wall of the casing 100 via the spring members 34 provided at four corner portions of the side plate 31. The position sensor 32b is fitted to the inner surface of the upper wall of the casing 100 at the position above the side plate 31. In FIG. 6(d) showing the push-out plate 35a of the push-out device 35, the construction is made such that, when the push-out plate 35a is projected by the piston 35b, the substance 50 is pushed out.

FIG. 7 is a control system diagram of the substance mass measuring system of the second embodiment of FIG. 6. As described in FIG. 6, the side plate 31 having the acceleration sensor 33 is fitted to the side wall inner surface of the casing 100 via the spring members 34, and when the substance 50 collides with the side plate 31, an acceleration signal thereof is inputted into a computing unit 51. Also, displacement signals of the spring members 34 caused by the collision are detected by the sensors contained in the spring members 34 to be inputted into the computing unit 51. Further, signals of passing, detected by the position sensors 32a, 32b during the movement of the substance 50, are inputted into the computing unit 51. It is to be noted that, when the mass measurement is to be started, the computing unit 51 sends a drive signal to the push-out unit 35 so as to control it to project the piston 35b and thereby to push out the substance 50. The measured mass of the substance 50 is displayed in a display unit 52.

In the second embodiment constructed as mentioned above, when the mass of the substance 50 is to be measured, the substance 50 is set on the table 36, as shown in FIG. 6(a). Then, the push-out unit 35 is caused to work so as to project the push-out plate 35a to thereby push out the substance 50 into the space within the casing 100 toward the side plate 31. While the substance 50 moves in the space, the passing thereof is detected by the position sensor 32a. Then, the substance 50 collides with the side plate 31. This arrival at the side plate 31 of the substance 50 is detected by the position sensor 32b. The detected signals of the position sensors 32a, 32b are inputted into the computing unit 51, as shown in FIG. 7.

When the substance 50 collides with the side plate 31, the acceleration signal detected by the acceleration sensor 33 attached to the backside of the side plate 31 and the displacement signals of the spring members 34 are inputted into the computing unit 51. With reference to FIG. 6(a), where $V_1$ is an initial velocity of the substance 50 when the measurement is started, $V_2$ is a velocity of the substance 50 when it collides with the side plate 31, t is a time from the measurement start to the collision of the substance 50, $\alpha$ is the acceleration signal detected by the acceleration sensor 33, $m_1$ is a mass of the side plate 31, $m_2$ is the displacement amount signal of the spring members 34 and $m_3$ is a coefficient including a viscosity of the space surrounding the substance 50 and also where F is a function of $m_1$ to $m_3$ and $\alpha$, then mass M of the substance 50 is defined as $$M=[t/(V_2-V_1)]\times F(m_1, m_2, m_3, \alpha).$$

In the above state, $V_1$, $V_2$, t, a and $m_2$ are measured values or computed values, that is, $V_1$ can be obtained as an average velocity by a time from the start of the push-out device 35 to the detection of the substance 50 by the position sensor 32a and a known distance $L_1$ and $V_2$ also can be obtained as an average velocity by a time difference t between the detections of the substance 50 by the respective position sensors 32a, 32b and a known distance $L_2$. Also, based on the known values $m_1$ and $m_3$, $t/(V_2-V_1)$ can be obtained by computation at the computing unit 51. Further, the function $F(m_1, m_2\ m_3, \alpha)$ can be obtained and thus the mass M of the substance 50 is computed and displayed in the display unit 52.

It is to be noted that, in the above second embodiment, if the casing 100 is box-like as in the structure of FIG. 18, to be described later, in which the box is contained detachably in the rotator, the casing 100 is once taken outside of the rotator so that the mass measurement may be done outside of the rotator by the same procedures as mentioned above, that is, by pushing out the substance 50 to cause it to collide with the side plate 31, and thus the mass of the plurality of boxes contained in the rotator can be previously adjusted to thereby easily solve the occurrence of imbalances in the entire rotator.

According to the above described second embodiment, in cosmic space, the side plate 31 is fitted within the casing 100 via the spring members 34, the acceleration sensor 33 is fitted to the side plate 31 and the position sensors 32a, 32b are fitted to the casing 100, and the substance 50 is caused to collide with the side plate 31 in the casing 100. By such simple procedures, the mass of the substance 50 can be obtained by computation at the computing unit 51 and displayed in the display unit 52. Thereby, the mass can be easily known.

Figure 8A:
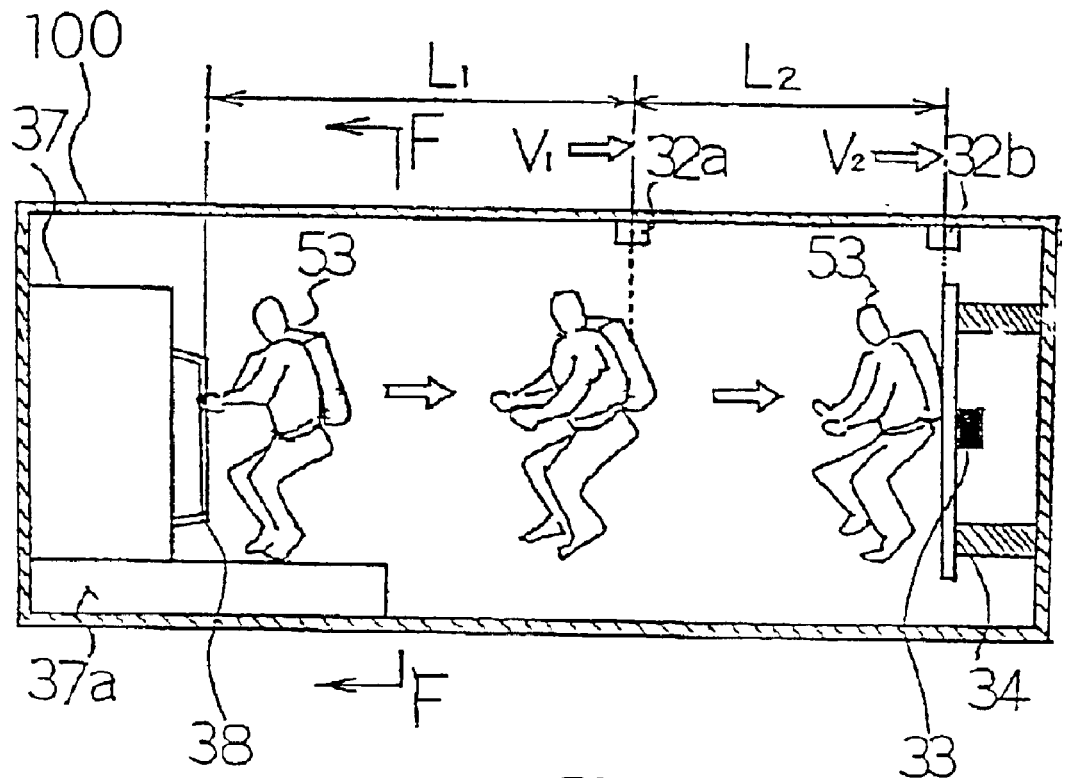
Figure 8B:
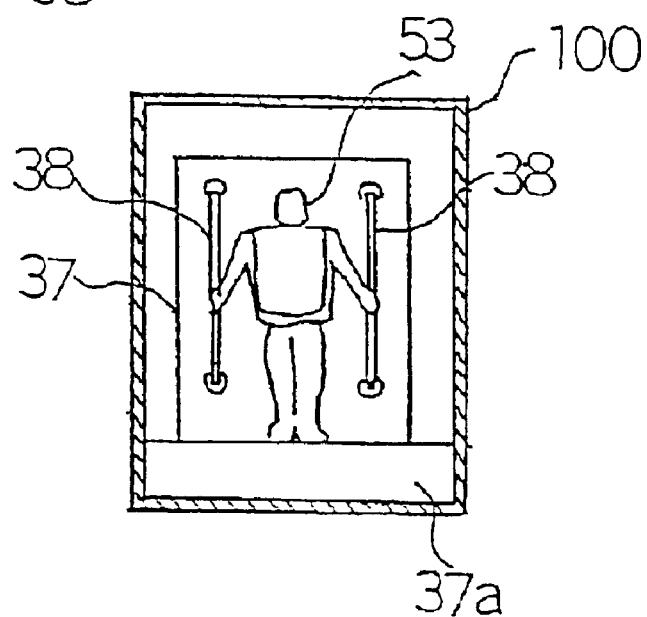

FIGS. 8(a) and (b) show a microgravitational environment substance mass measuring system of a third embodiment according to the present invention, wherein FIG. 8(a) is a cross sectional view and FIG. 8(b) is a cross sectional view taken on line F—F and seen in the arrow direction of FIG. 8(a). As shown in FIG. 8(a), the construction of the casing 100, the side plate 31, the position sensors 32a, 32b, the acceleration sensor 33 and the spring members 34 is the same as that of the second embodiment shown in FIG. 6 and the control system thereof is also the same as shown in FIG. 7. In the present third embodiment, in place of the substance 50, the weight of a man 53, such as an experimenting astronaut, is measured, and for this purpose, a stand 37 and a table 37a are provided and also handrails 38 are attached to the stand 37, as shown in FIG. 8(b). Construction of other portions is the same as that of the second embodiment.

In FIGS. 8(a) and (b), when a weight of the man 53 is to be measured, the man 53 stands on the table 37a with his hands gripping the handrails 38. Then, by making use of reaction, the man 53 jumps into the space with his backside being directed to the side plate 31. While the man 53 moves in this posture toward the side plate 31, passing the of the man 53 is detected by the position sensor 32a, and the man 53 collides with the side plate 31 to be detected by the position sensor 32b. The detected signals of the position sensors 32a, 32b are inputted into the computing unit 51. Likewise, the acceleration signal detected by the acceleration sensor 33 at the time of the collision of the man 53 with the side plate 31 and the displacement signals of the spring members 34 at the time of the collision are inputted into the computing unit 51.

As in the second embodiment, $t/(V_2-V_1)$ and a function F $(m_1, m_2, \alpha)$ are computed at the computing unit 51 and weight M of the man 53 is thereby obtained to be displayed in the display unit 52. In the present third embodiment, as in the substance 50 of the second embodiment, the man 53 simply collides with the side plate 31, whereby his own weight can be easily measured in space and be displayed.

It is to be noted that, in the present third embodiment also, the casing 100 may be such a box-like one as in the structure of FIG. 18, to be described later, in which the plurality of boxes are contained detachably in the rotator. In this case, the casing 100 is once taken outside of the rotator and the mass measurement of the man 53 can be done outside of the rotator by the same procedures as mentioned above. Thereby, a weight measurement of a man in the microgravitational environment is easily carried out.

Figure 9A:
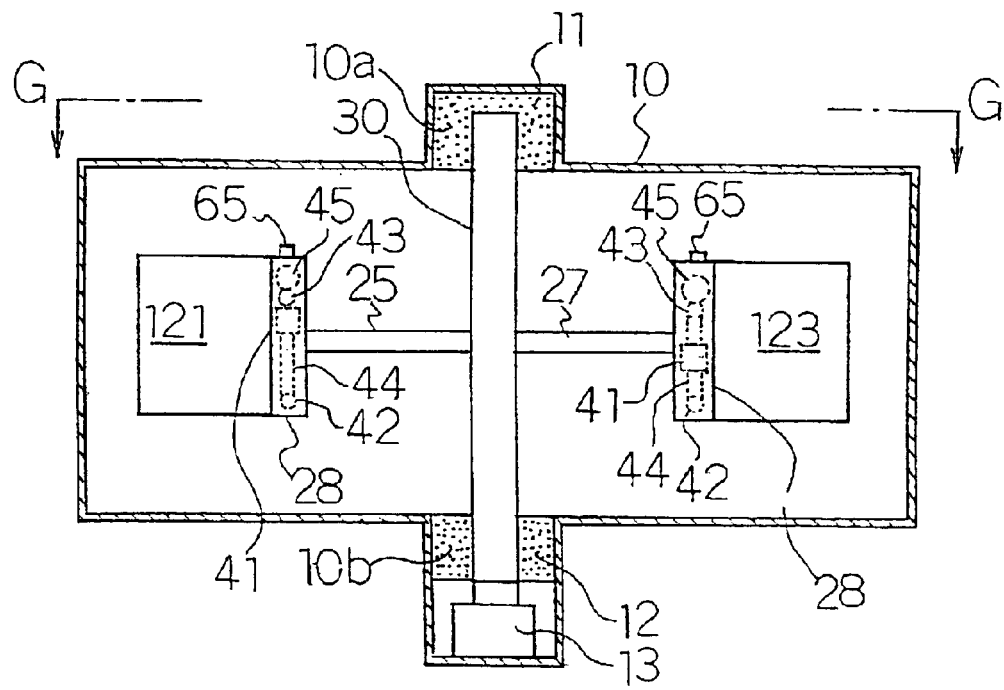
Figure 9B:
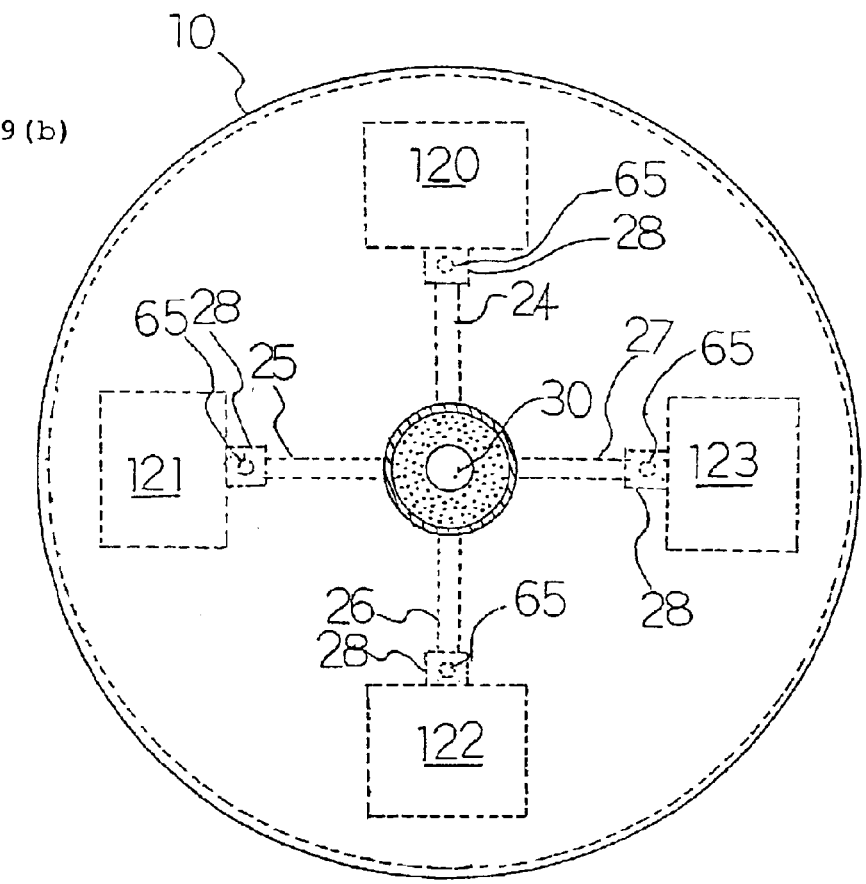

FIGS. 9(a) and (b) show a microgravitational rotating apparatus vibration control system of a fourth embodiment according to the present invention, wherein FIG. 9(a) is a cross sectional side view and FIG. 9(b) is a cross sectional view taken on line G—G and seen in the arrow direction of FIG. 9(a). In FIGS. 9(a) and (b), numeral 10 designates an outer side casing that contains the entirety of a rotator. On central portions of upper and lower surfaces of the casing 10, there are provided recess portions 10a, 10b projecting outwardly. Within the upper and lower recess portions 10a, 10b, there are provided bearings 11, 12, respectively. The bearings 11, 12 may be constructed by any of magnetic bearings, spring-supported, elastic material-supported or plastic material-supported bearings, air cushion bearings, damper type bearings, motor type bearings and fluid type bearings. In FIG. 9(a), while a rotary shaft 30 is supported at its both ends, it may also be supported at one end only thereof.

Numeral 30 designates the rotary shaft, as mentioned above, that has its upper and lower ends arranged within the recess portions 10a and 10b, respectively, such that the upper end is supported by the bearing 11 and the lower end is connected to a motor 13 and supported by the bearing 12. Or, as mentioned above, only one end of the rotary shaft 30 may be supported by a bearing. Thus, the rotary shaft 30 is supported by the bearings 11, 12, making no contact with a stationary side of the casing 10. Numeral 65 designates an acceleration sensor that is fitted to an upper surface of each of boxes 120 to 123 so as to detect vibration of each of the boxes 120 to 123 and to input signals thereof into a control unit to be described later. It is to be noted that the acceleration sensor may be provided not on the boxes but on other necessary measuring points, such as on the rotary shaft 30 or on arms 24 to 27.

The arms 24, 25, 26, 27 are fitted at their one ends to the rotary shaft 30, as shown in FIG. 9(b), extending horizontally along X and Y axes, and the boxes 20, 21, 22, 23 are fitted to the other ends of the respective arms 24 to 27. At each of connecting portions between the boxes 20 to 23 and the respective arms 24 to 27, a counterweight case 28 of a vertically elongated square box shape is fitted. In the counterweight case 28, a counterweight 41, upper and lower pulleys 43, 42, a cable 44 and a motor 45 are arranged in such a construction that, when the counterweight 41 moves up and down in the direction along an axis of the rotary shaft 30, imbalances between each of the boxes 20 to 23 are adjusted and vibration caused by the imbalances is controlled, as will be described below.

FIGS. 10(a) to (c) show an interior of the abovementioned counterweight case 28 fitted to the respective boxes 20 to 23, wherein FIG. 10(a) is a cross sectional side view seen along the X axis, FIG. 10(b) is a cross sectional side view seen along the Y axis and FIG. 10(c) is a cross sectional view taken along line H—H and seen in the arrow direction of FIG. 10(a). In FIGS. 10(a) to (c), the counterweight case 28 is shown only from the example of the box 23 but the construction is the same with respect to the boxes 20 to 22 and description thereof is omitted. Along the vertical or longitudinal direction within the counterweight case 28, there are provided two rails 47 and 46 on inner surfaces of two, upper and lower seen in FIG. 10(c), side walls of the counterweight case 28. The counterweight 41 has two grooves provided in its outer side surfaces to be engaged with the rails 46, 47 and is arranged movable up and down along the rails 46, 47. A cable 44, formed in a loop, is wound around the upper and lower pulleys 43, 42, wherein one side of the loop is fixed to upper and lower surfaces of the counterweight 41 and the other side may freely pass through a through hole 41a provided in the counterweight 41. Thus, when the cable 44 moves up and down by rotation of the pulleys 43, 42, the counterweight also moves up and down along the rails 47, 46.

The upper pulley 43 has a gear 43a fitted thereto, and this gear 43a engages with a gear 45a of the motor provided above the upper pulley 43. When the motor is driven to rotate the upper pulley 43, the cable and also the counterweight 41 move up and down.

It is to be noted that the counterweight case 28 containing the counterweight 41 may be provided not only on the inner circumferential side of the boxes 120 to 123 but also on the outer circumferential side thereof so that the counterweights 41 may move up and down both on the outer and inner circumferential sides of the boxes 120 to 123.

In the fourth embodiment constructed as mentioned above, experimental objects of plants, animals, etc. are placed in the boxes 120 to 123. In the space environment, the motor 13 is driven to rotate the boxes 120 to 123 at a slow speed so that experiments to observe a growing state of the plants, a living state of the animals, etc. in space may be carried out. As various experimental objects having different shapes, sizes and weights are so contained in the boxes 120 to 123, when they are rotated, there occur differences in the acceleration caused by the imbalances in the weight between each of the boxes 120 to 123 and vibration occurs in the boxes. This vibration is conveyed to the rotary shaft 30 via the arms 24 to 27 and further to the casing 10 via the bearing portions, thereby giving bad influences not only on the experiments but also on the surrounding environment.

Hence, in the present fourth embodiment, vibration caused in the rotary shaft 30 may be detected by the acceleration sensors 65. The vibration caused by the weight imbalances between each of the boxes 120 to 123 is mainly of a mode to vibrate the boxes 120 to 123 up and down at the ends of the arms 24 to 27, and this vibration is detected by each of the acceleration sensors 65. Signals from the acceleration sensors 65 are inputted into a control unit, to be described later, and the control unit finds the box in which vibration occurred. Then, in order to adjust the imbalance amount between each of the boxes 120 to 123 that has caused the vibration, the control unit causes the counterweight 41 of the box in which an upward acceleration is large to move downward and, reversely, causes the counterweight 41 of the box in which a downward acceleration is large to move upward.

Figure 11:
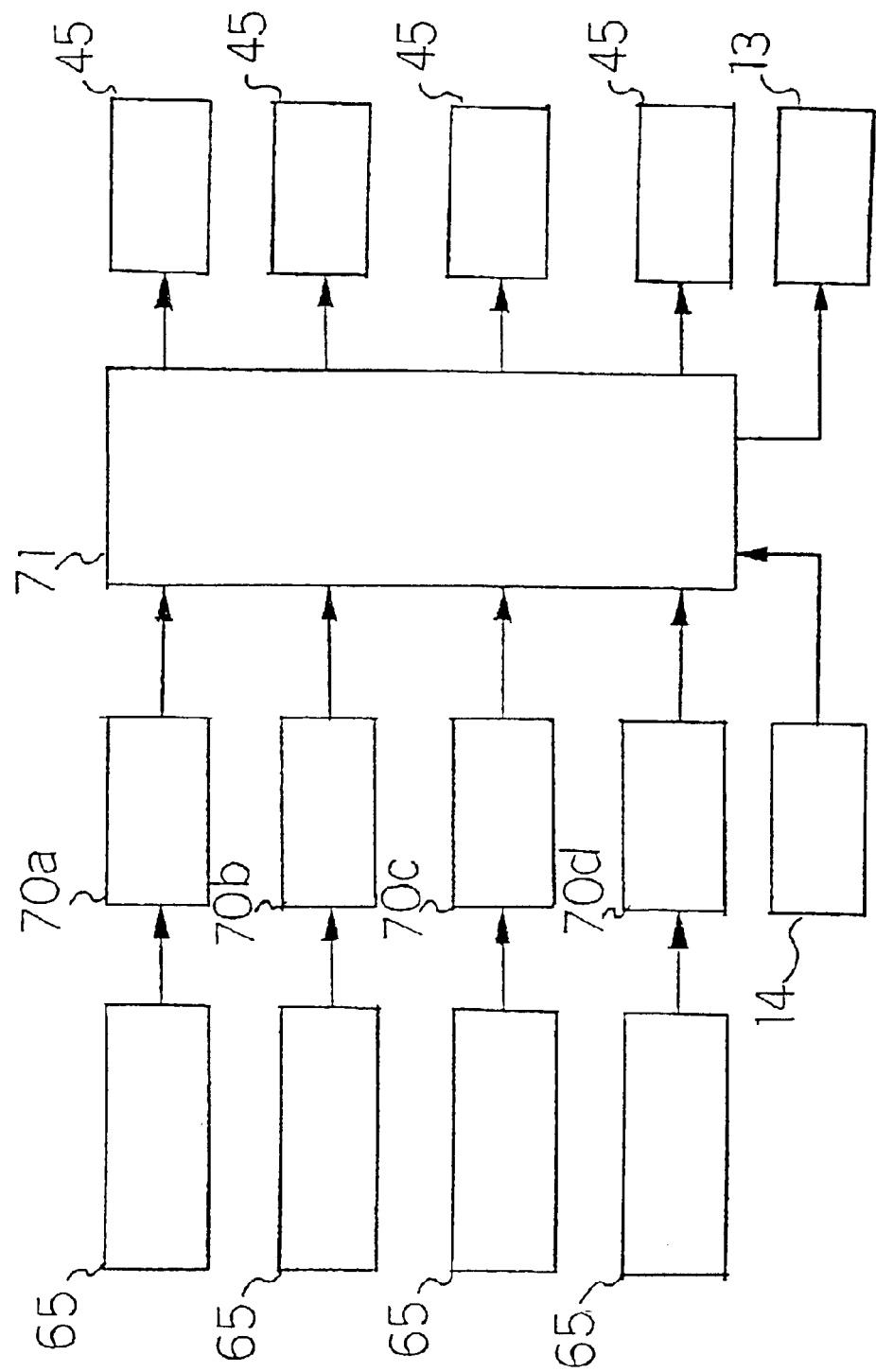
FIG. 11 is a control system diagram of the rotating apparatus vibration control system of the fourth embodiment.

FIG. 11 is a control system diagram of the rotating apparatus vibration control system of the fourth embodiment. In FIG. 11, upward and downward directional acceleration signals from the acceleration sensor 65 fitted to the upper surface of each of the boxes 120 to 123 are amplified by respective amplifiers 70a to 70d to be inputted into a control unit 71 so that signals of the acceleration acting on each of the boxes 120 to 123 in the experimental apparatus may be received by the control unit 71. From these signals, upward and downward directional vibration acting on each of the boxes is detected to thereby select the counterweight 41 to be moved in the direction to cancel the vibration corresponding to each of the boxes. Thus, the control is done such that the motor 45 of that counterweight 41 is driven to move the counterweight 41 in the direction reverse to the amplitude of the vibration to thereby cancel the vibration.

The control unit 71 also controls the drive of the motor 13 and thus the start and stop of the rotation of the rotary shaft 30. Thus, in comparison with demand value data showing the allowable vibration range of the rotating experimental apparatus that is stored in a storage unit (not shown), the counterweight 41 is controlled to be moved up and down so that the vibration may be controlled to fall within the demand value.

Also, the control unit 71 contains data of the relation between the displacement of the rotary shaft 30 in the axial direction or in an arbitrary direction orthogonal to the axis and the necessary power of the motor. By presumption based on the characteristics of these data, the weight imbalance amount or the weight of the entire system of the rotator in the microgravitational environment can be measured. By such measurements, the movement direction and the movement amount of the counterweight can be decided.

In the present fourth embodiment, therefore, if there are imbalances between each of the boxes 120 to 123 and vibration is thereby caused during the rotation, the imbalances in the acceleration caused by the imbalance amount during the rotation are adjusted by the upward and downward movements of the counterweights 41 and, by this adjustment, the upward and downward vibration of the boxes 120 to 123 caused by the imbalances can be prevented.

Figure 12A:
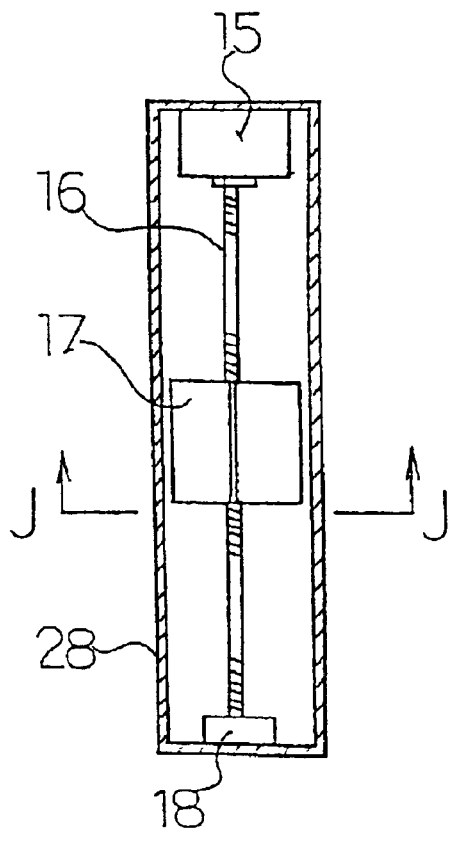
Figure 12B:
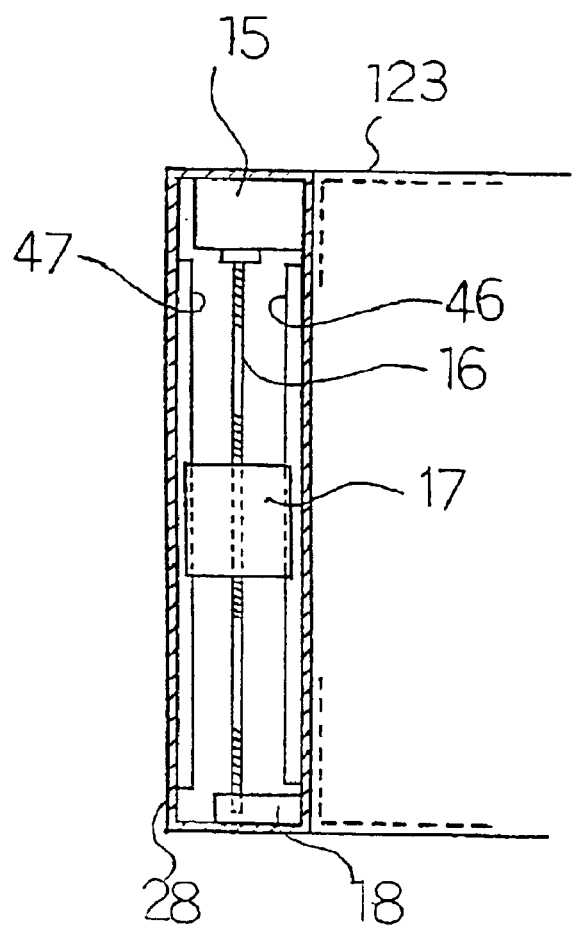
Figure 12C:
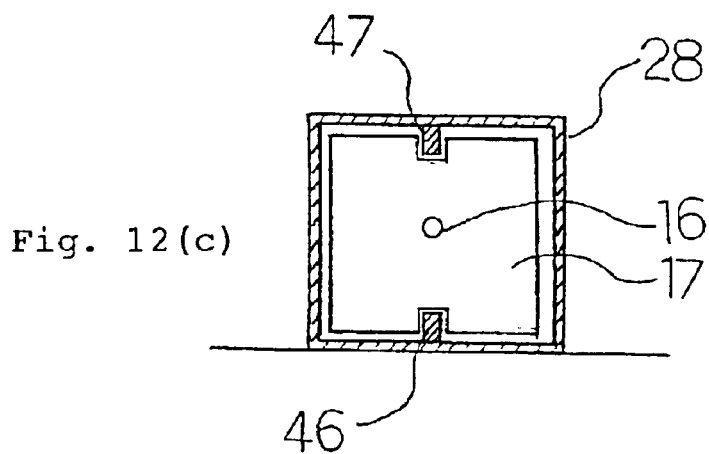

FIGS. 12(a) to (c) show a counterweight case containing a counterweight in a microgravitational rotating apparatus vibration control system of a fifth embodiment according to the present invention, wherein FIG. 12(a) is a cross sectional side view seen along the X axis, FIG. 12(b) is a cross sectional side view seen along the Y axis and FIG. 12(c) is a cross sectional view taken on line J—J and seen in the arrow direction of FIG. 12(a). In the present fifth embodiment, the construction is made such that a counterweight is moved up and down by rotation of a threaded bar via a thread engagement between the counterweight and the threaded bar. This is in place of the moving method of the counterweight 41 using the pulleys 42, 43, the cable 44 and the motor 45 in the fourth embodiment. Construction of other portions is the same as that of the fourth embodiment shown in FIGS. 9 to 11, and description of the same portions is omitted.

In FIGS. 12(a) to (c), there are provided two rails 47 and 46 on inner surfaces of two, upper and lower seen in FIG. 12(c), side walls of the counterweight case 28. A counterweight 17 has two grooves provided in its outer side surfaces to be engaged with the rails 46, 47 and is arranged to be movable up and down along the rails 46, 47. A threaded bar 16 passes through the counterweight 17 via a thread engagement therebetween, and the threaded bar 16 has its one end connected to a motor 15 fixed within the counterweight case 28 and has the other end supported by a bearing 18. Thereby, it is so constructed that, when the motor 15 is driven to rotate the threaded bar 16, the counterweight 17is moved up and down by the rotation of the threaded bar 16. It is to be noted that, while the counterweight 17 only of the box 123 is illustrated, the construction is the same with respect to the boxes 120 to 122 also.

In the present fifth embodiment also, when vibration occurs in the experimental apparatus due to imbalances in the substances placed in the boxes during the rotation, the imbalances are adjusted, as in the fourth embodiment, by the rotation of the threaded bar 16 and thus by the upward and downward movements of the counterweight 17 and the vibration caused by the imbalances can be suppressed. It is to be noted that the control system of the fifth embodiment is the same as that shown in FIG. 11 and description thereon is omitted.

Figure 13A:
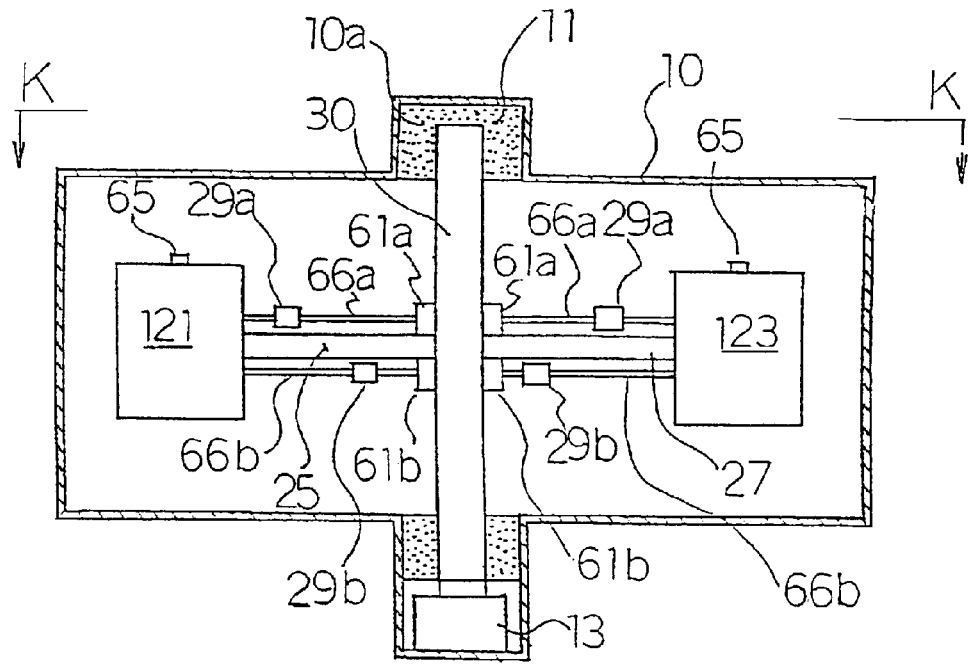
Figure 13B:
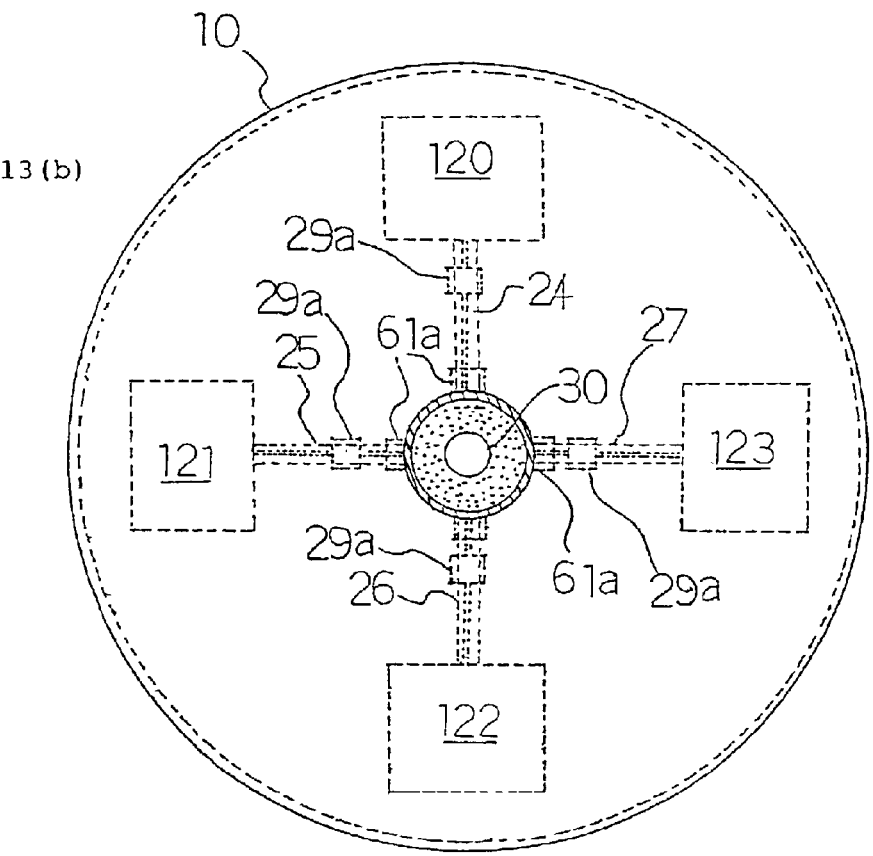

FIGS. 13(a) and (b) show a microgravitational rotating apparatus vibration control system of a sixth embodiment according to the present invention, wherein FIG. 13(a) is a cross sectional side view and FIG. 13(b) is a cross sectional view taken on line K—K and seen in the arrow direction of FIG. 13(a). This example of the sixth embodiment is constructed such that a pair of counterweights are arranged on upper and lower sides of each arm and imbalances caused between each of the boxes are resolved by moving the counterweights in the horizontal direction so that vibration caused by the imbalances may be suppressed. Construction of other portions of this rotating experimental apparatus is the same as that of the fourth embodiment shown in FIGS. 9 to 11.

In FIGS. 13(a) and (b), on the upper side of each of the arms 24, 25, 26, 27 and parallel therewith, there is arranged a threaded bar 66a. Each of the threaded bars 66a has its one end connected to the respective boxes 120 to 123 and the other end connected to a motor 61a that is fixed to an upper surface of each of the arms 24 to 27. A counterweight 29a is fitted to each of the threaded bars 66a via a thread engagement and, when the motor 61a rotates to thereby rotate the threaded bar 66a, the counterweight 29a moves rightward or leftward in the figures, as will be described later. Likewise, on the lower side of each of the arms 24 to 27 and parallel therewith, there is arranged a threaded bar 66b to rotate between a motor 61b and the respective boxes 120 to 123, and thereby a counterweight 29b moves rightward or leftward in the figures. Also, an acceleration sensor 65 is fitted to an upper surface of each of the boxes 120 to 123.

Figure 14A:
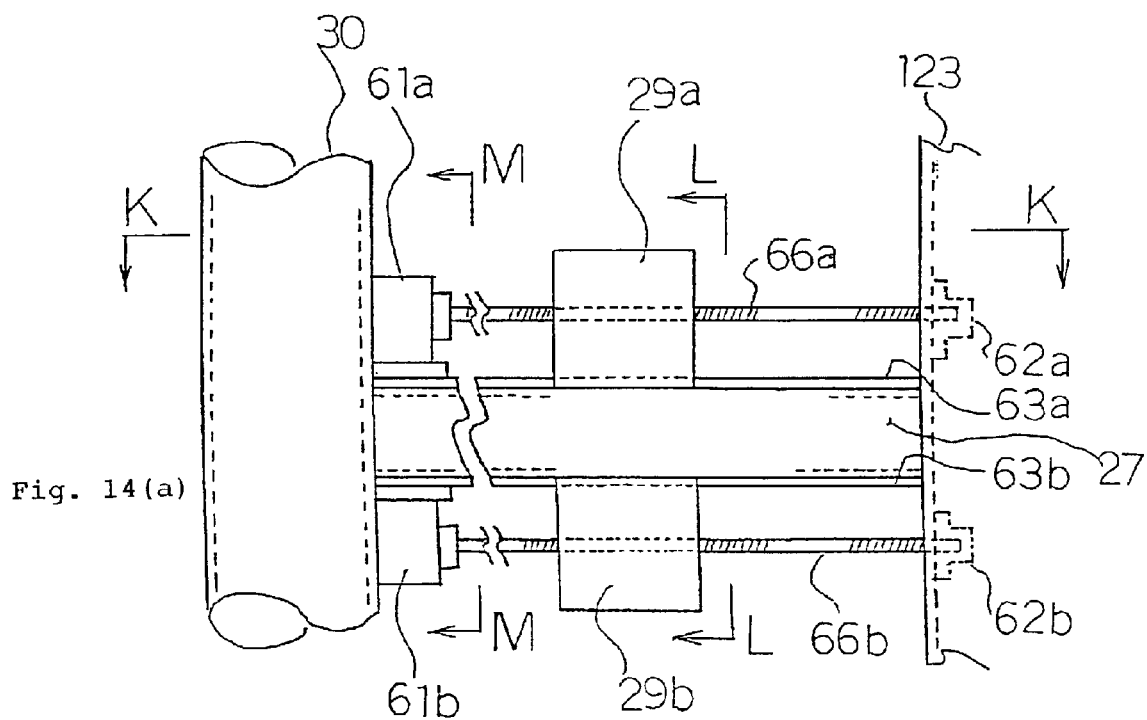
Figure 14B:
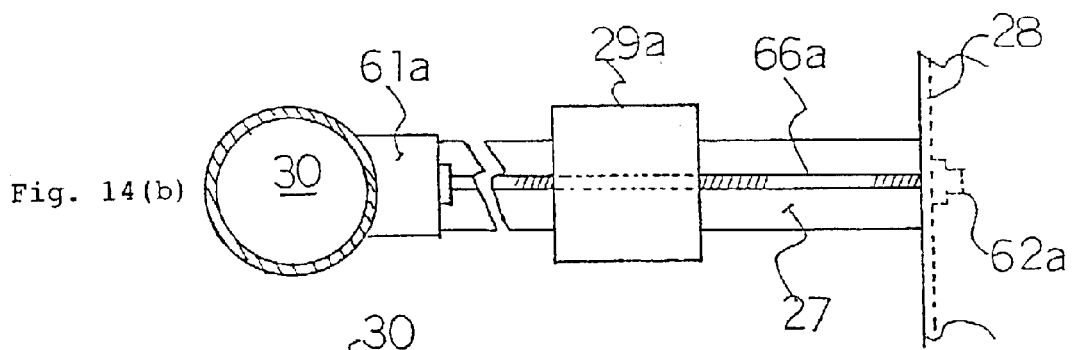
Figures 14C, 14D:
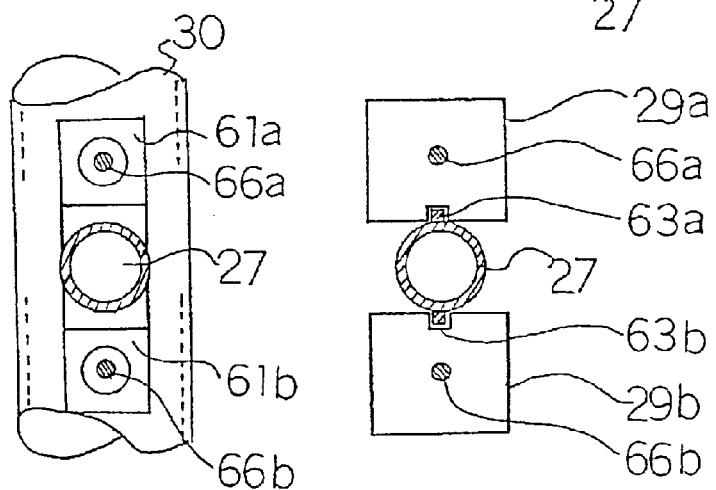

FIGS. 14(a) to (d) show an arrangement of the counterweights, of the abovementioned sixth embodiment, wherein FIG. 14(a) is a side view, FIG. 14(b) is a cross sectional view taken on line K—K and seen in the arrow direction of FIG. 14(a), FIG. 14(c) is a cross sectional view taken on line L—L and seen in the arrow direction of FIG. 14(a) and FIG. 14(d) is a cross sectional view taken on line M—M and seen in the arrow direction of FIG. 14(a). In these figures, the threaded bars 66a, 66b are arranged on the upper and lower sides, respectively, of the arm 27 in parallel therewith, having their one ends connected to the motors 61a, 61 band the other ends supported to bearings 62a, 62b provided on the box 123. The motors 61a, 61b are fixed to the arm 27 and, when the motors 61a, 61b rotate, the threaded bars 66a, 66b correspondingly rotate and the counterweights 29a, 29b can move rightward and leftward in the figures.

As shown in FIG. 14(c), the arm 27 has two rails 63a, 63b provided on its upper and lower sides. The counterweight 29a having a groove on its lower side and the counterweight 29b having a groove on its upper side engage with the rails 63a and 63b, respectively, via their respective grooves so that the counterweights 29a, 29b are movable along the rails 63a, 63b. In the construction in which there are provided the four arms 24 to 27, as shown in FIG. 13(b), and the counterweights 29a, 29b are arranged on the upper and lower sides of each of the arms 24 to 27 so as to move horizontally, when weight imbalances occur between each of the boxes 120 to 123 and vibration arises due to differences in the acceleration during the rotation, signals from the acceleration sensors 65 are sent to a control unit (not shown). Thereby, each of the motors 61a, 61b, that count eight in total, is controlled to move each of the counterweights 29a, 29b rightward or leftward so that the imbalances may be resolved. Thus, the vibration caused by the imbalances in the weight can be suppressed. It is to be noted that the above control system is the same as that shown in FIG. 11 and illustration thereof is omitted.

Figure 15A:
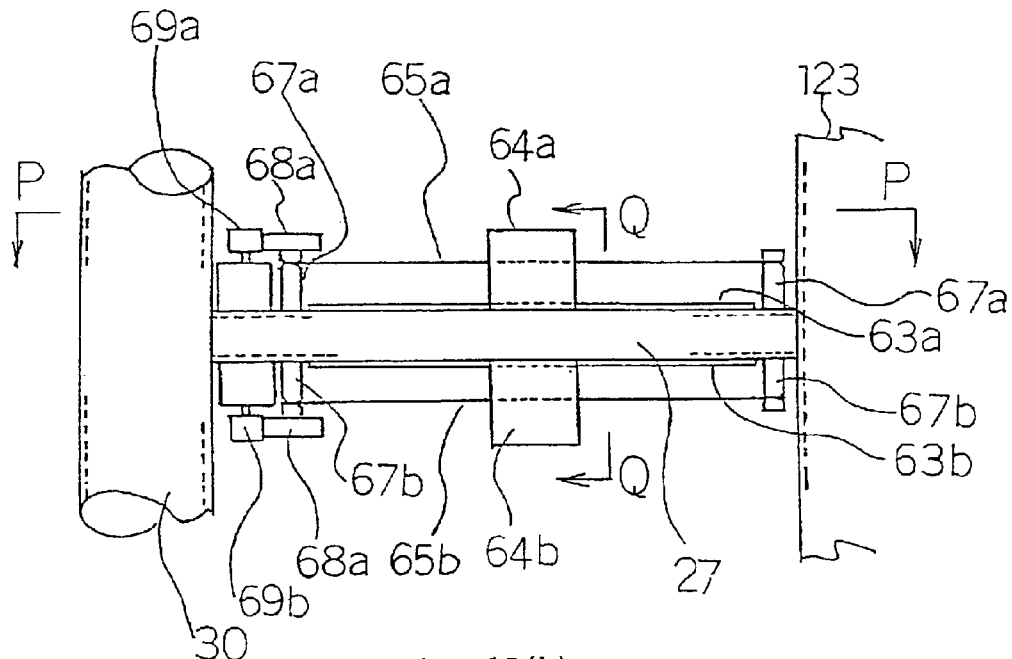
Figure 15B:
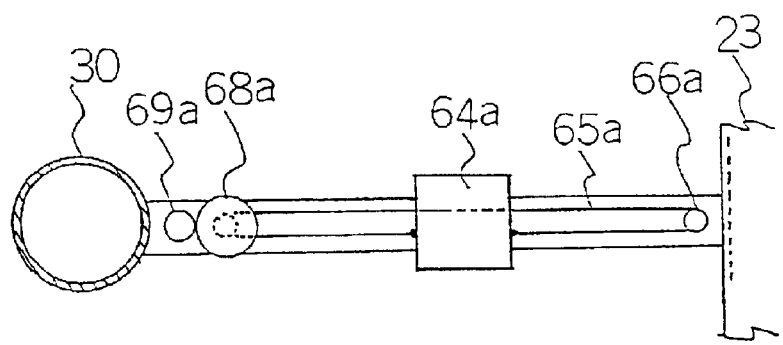
Figure 15C:
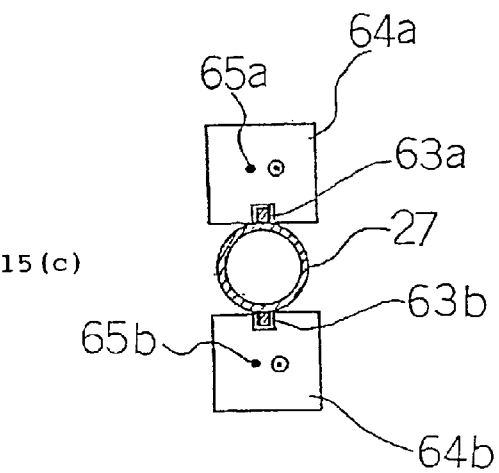

FIGS. 15(a) to (c) show an arrangement of counterweights in a microgravitational rotating apparatus vibration control system of a seventh embodiment according to the present invention, wherein FIG. 15(a) is a side view, FIG. 15(b) is a cross sectional view taken on line P—P and seen in the arrow direction of FIG. 15(a) and FIG. 15(c) is a cross sectional view taken on line Q—Q and seen in the arrow direction of FIG. 15(a). In the present seventh embodiment, movement of the counterweight is effected by a combination of a motor and pulleys, in place of the moving method of the counterweight using the threaded bar in the sixth embodiment shown in FIG. 14. Construction of other portions is the same as that of the sixth embodiment and description on the same portions is omitted.

As shown in FIG. 15(c), the arm 27 has two rails 63a, 63b on its upper and lower sides. A counterweight 64a having a groove on its lower side and a counterweight 64b having a groove on its upper side engage with the rails 63a and 63b, respectively, via their respective grooves so that the counterweights 64a, 64b are movable rightward and leftward in the figures along the rails 63a, 63b. A cable 65a, formed in a loop, is wound around two pulleys 67a provided on two end portions of the arm 27, wherein one side of the loop is fixed to two side surfaces of the counterweight 64a and the other side may freely pass through a through hole provided in the counterweight 64a. A cable 65b is likewise provided with respect to two pulleys 67b and the counterweight 64b. The pulleys 67a, 67b have gears 68a fitted thereto and the gears 68a engage with gears of motors 69a, 69b provided close to the pulleys 67a, 67b, respectively. Thus, it is so constructed that when the motors 69a, 69b are driven to rotate the pulleys 67a, 67b, the counterweights 64a, 64b move rightward and leftward.

In the seventh embodiment constructed as mentioned above, as in the sixth embodiment, if there occurs vibration due to imbalances between each of the boxes 120 to 123, signals from the acceleration sensor 65 of each of the boxes 120 to 123 are received by into a control unit (not shown) and thereby each of the motors 69a, 69b is controlled to make adjustment to move the counterweights 64a, 64b rightward and leftward so that the imbalances are resolved and the vibration caused by the imbalances can be suppressed.

It is to be noted that, in the fourth to the seventh embodiments described above, while the examples to actively control the vibration by movements of the counterweights during the rotation of the rotating apparatus have been described, it is also possible to adjust the weight imbalances of the entire rotating apparatus by moving each of the counterweights in a stationary state before the rotation of the rotating apparatus is started.

Figure 16:
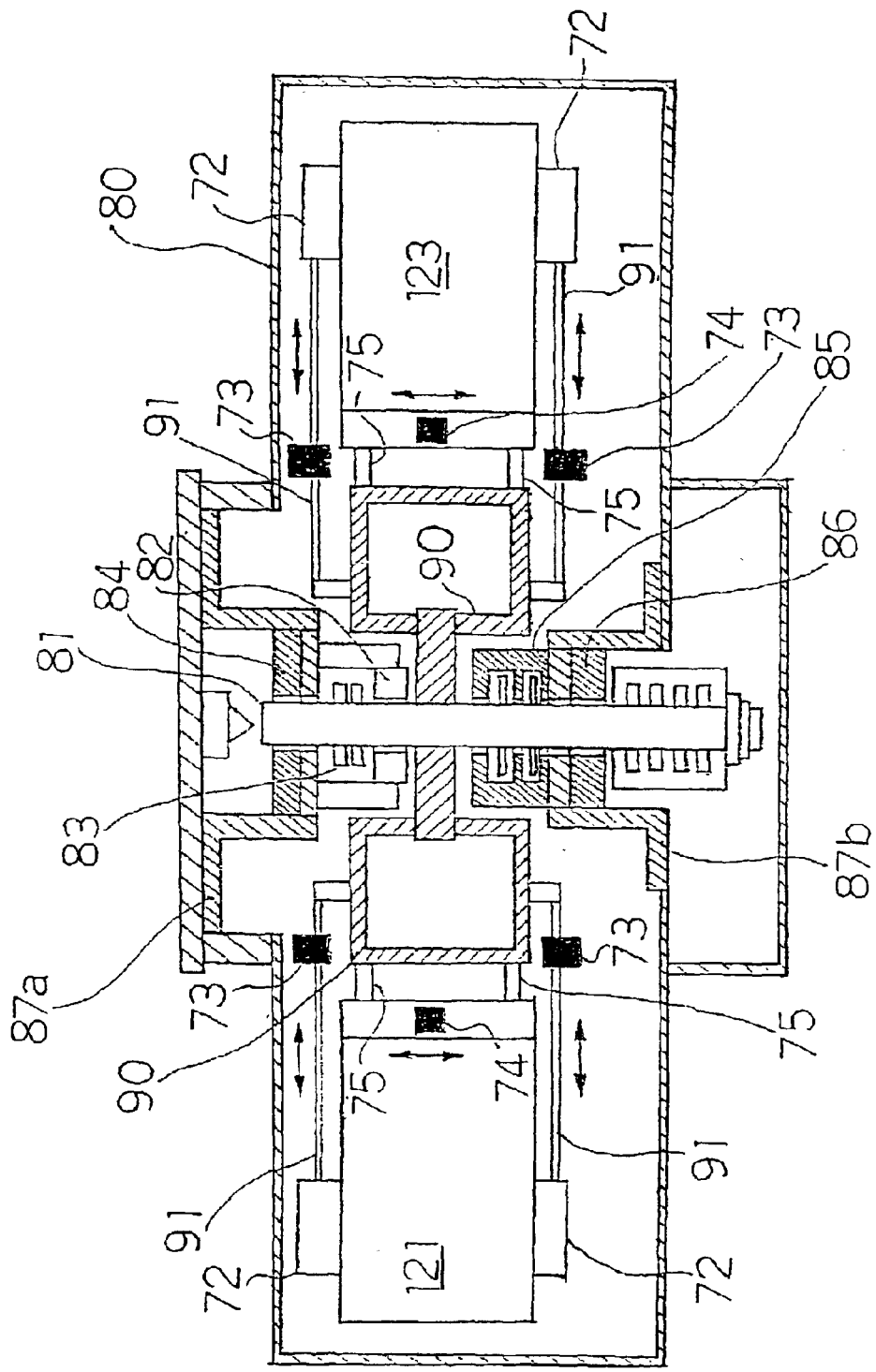
FIG. 16 is a cross sectional side view of a microgravitational rotating apparatus vibration control system of an eighth embodiment according to the present invention.

FIG. 16 is a cross sectional side view of a microgravitational rotating apparatus vibration control system of an eighth embodiment according to the present invention. The present eighth embodiment has functions both of the upward and downward movement of the counterweight in the fourth and the fifth embodiments and of the horizontal movement of the counterweight in parallel with the arm in the sixth and the seventh embodiments as well as freedom in the support of the boxes and the rotary shaft, thereby realizing a construction to more securely control the vibration. The entire construction thereof will be described below.

A casing 80 has supporting members 87a, 87b fitted thereto. A motor 82, bearings 84, 86 and a thrust bearing 85 are fitted to the supporting members 87a, 87b to thereby support a rotary shaft 81 rotatably by the motor 82. The bearings 84, 86 are any of a magnetic type, a spring type, an air cushion type, a fluid type, etc. to support the rotary shaft 81 elastically. A rotator 90, that corresponds to the arms 24 to 27 shown in FIG. 9(b), is fitted to an outer circumferential surface of the rotary shaft 81 and the boxes 120 to 123 are fitted to an outer periphery of the rotator 90 with link mechanisms 75 being interposed between the respective boxes 120 to 123 and the rotator 90. It is to be noted that the boxes are not necessarily four but may be fitted symmetrically in plural pieces, as the case may be. Also, a sensor 83 for detecting a displacement of the rotary shaft 81 due to vibration is fitted to an outer surface of the rotary shaft 81, and detected signals of the sensor 83 are inputted into a control unit (not shown). The sensor 83 may be fitted either to the rotary shaft 81 or to a stationary side around the rotary shaft 81.

On upper and lower sides of each of the boxes 120 to 123, balancer drive motors 72 are fitted and rails 91 are provided between the respective motors 72 and the rotator 90. Construction of the motor 72 and the rail 91 may be employed from any of the mechanisms shown in FIGS. 14 and 15. The upper and lower rails 91 are provided so as to move balancers 73 and, like the counterweights in the sixth and the seventh embodiments, it is so constructed that, when the motors 72 are driven, the balancers 73 are controlled to move rightward and leftward in the figure. The balancers 73 are provided, as in the examples shown in FIGS. 14 and 15, in two pieces on the upper and lower sides of each of the boxes 120 to 123, whereby an active vibration control during the rotation can be performed and a calibration to resolve weight imbalances by moving the balancers 73 in a stationary state or to correct the weight imbalances before start of rotation can be effected.

Also, another balancer 74 is provided on an inner circumferential side, opposing the rotary shaft 81, of each of the boxes 120 to 123. Construction of the balancer 74 may be employed from any of the mechanisms in the fourth and the fifth embodiments shown in FIGS. 10 and 12. Thereby, the upward and downward weight imbalances of the boxes caused in the rotation or in the stationary state can be adjusted so as to prevent the vibration.

The boxes 120 to 130 are supported to the rotator 90 via the link mechanisms 75, wherein each of the link mechanisms 75 comprises a link having one freedom only in the axial direction of the rotary shaft 81 so as to absorb the vibration between the boxes 120 to 123 and the rotator 90. If the link mechanism 75 uses a link having not one freedom, but two or three freedoms, according to the circumstances, however, the vibration could be more efficiently absorbed.

It is to be noted that, while the bearings 84, 86, the thrust bearing 85 and the motor 82 for supporting and driving the rotary shaft 81 and the rotator 90 are supported to the casing 80 via the supporting members 87a, 87b, a plurality of passive springs may be provided in place of the supporting members 87a, 87b so as to absorb the vibration caused from the rotating system and thereby a construction suppressing the vibration spreading to the casing 80 side to the minimum can also be realized.

Also, while the two kinds of the balancers 73, 74 are provided, such a construction as comprising either one of them, that is the balancer 73 only or the balancer 74 only, may be employed and this can be appropriately selected according to the state of the vibration.

According to the eighth embodiment, in addition to the functions of the fourth to the seventh embodiments, the function of the link mechanisms 75, as well as of the passive springs, if applicable, is achieved. Thereby, the weight imbalances between the boxes 120 to 123 are resolved and the vibration caused in the rotation can be more effectively absorbed.

Figure 17A:
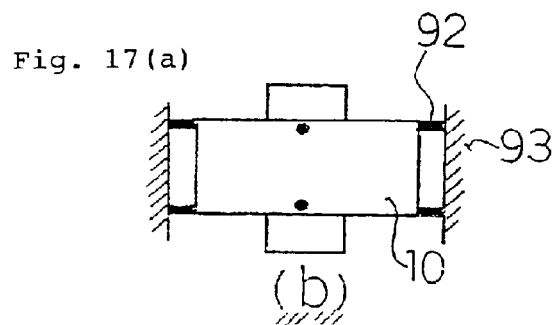
FIGS. 17(a) to (h) show four examples of vibration isolating devices used in a supporting system of a microgravitational rotating apparatus of a ninth embodiment according to the present invention, wherein FIGS. 17(a), (c), (e) and (g) are side views and FIGS. 17(b), (d), (e) and (h) are plan views of the supporting systems of FIGS. 17(a), (c), (e) and (g), respectively.
Figure 17B:
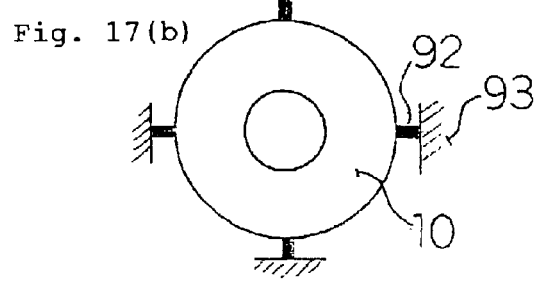

FIGS. 17(a) to (h) show four examples of vibration isolating devices used in a supporting system of a microgravitational rotating apparatus of a ninth embodiment according to the present invention, wherein FIGS. 17(a), (c), (e) and (g) are side views and FIGS. 17(b), (d), (e) and (h) are plan views of the supporting systems of FIGS. 17(a), (c), (e) and (g), respectively. In the present ninth embodiment, the microgravitational rotating apparatus itself is employed from any one of the rotating apparatus of the fourth to the eighth embodiments and, in addition to that, the entire rotating apparatus is elastically supported to an outside stationary part via vibration isolating devices. An interior construction of the rotating apparatus is the same as those of the rotating apparatus of the fourth to the eighth embodiments and description thereof is omitted.

In FIGS. 17(a) and (b), showing one example of the vibration isolating devices of the supporting system, a casing 10 (including the casing 80 of FIG. 16) is of the rotating apparatus described with respect to the fourth to the eighth embodiments. The casing 10 is, at four places on an upper periphery and four places on a lower periphery of an outer circumferential side wall (8 places in total), supported to a stationary side 93 via vibration isolating devices 92 by which an elastic force may act in the direction orthogonal to the rotary shaft. Each of the vibration isolating devices 92 is one such as produces an elastic force by an elastic substance, such as a spring member, fluid, air, an elastic material member or a magnetic bearing, and comprises therein a displacement sensor, so that displacements of the elastic substance caused by the vibration of the casing 10 may be detected and thereby control is done to change the spring constant (the elastic coefficient or the damping factor or both) so as to actively absorb the vibration.

It is to be noted that, even if the vibration isolating devices 92, instead of performing the active vibration control, perform a passive vibration control making use of an appropriate elastic force only, an effect to control the vibration can be still expected. Also, a construction to use a combination of a passive spring and a damper or to use a combination of a passive spring and a material having a damping characteristic may be employed.

Figure 17C:
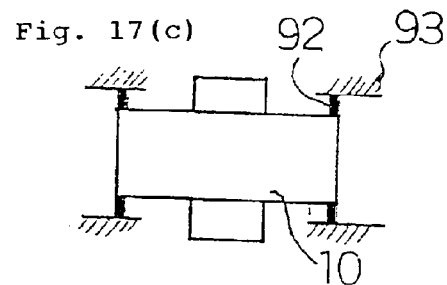
Figure 17D:
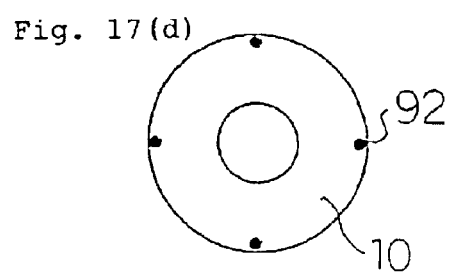
Figure 17E:
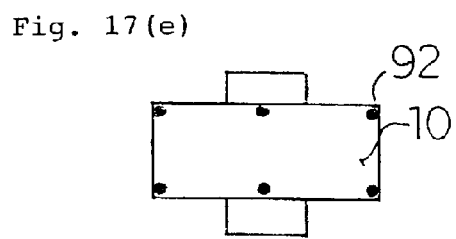
Figure 17F:
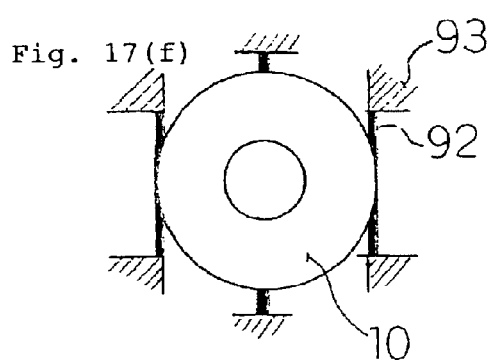
Figure 17G:
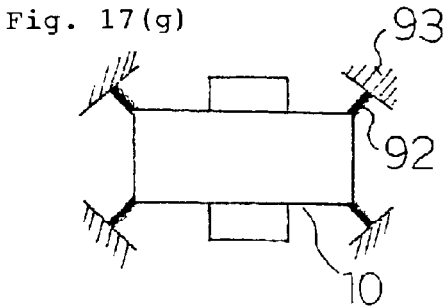
Figure 17H:
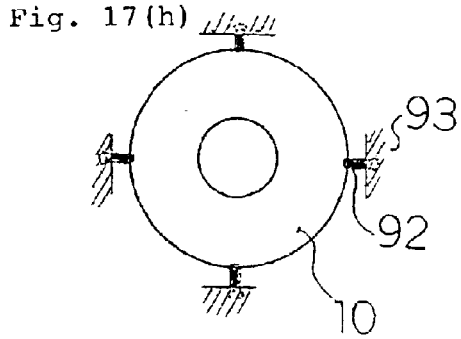

In FIGS. 17(c) and (d) showing another example of the vibration isolating devices of the supporting system, the casing 10 is supported at eight places to the stationary side 93 via vibration isolating devices 92 by which an elastic force may act in the upward and downward direction (in the same direction as the axial direction of the rotary shaft). In the example of FIGS. 17(e) and (f), the casing 10 is supported at eight places to the stationary side 93 via vibration isolating devices 92 by which an elastic force may act only in one direction out of the directions orthogonal to the rotary shaft. Further, in the example of FIGS. 17(g) and (h), the casing 10 is supported at eight places to the stationary side 93 via vibration isolating devices 92 by which an elastic force may act in a direction inclined to the rotary shaft.

In the above ninth embodiment, the rotating apparatus of the fourth to the eighth embodiments are supported to the stationary side 93 at eight places of the upper and lower peripheral portions of the casing 10 via the vibration isolating devices 92. Therefore, in the example of FIGS. 17(a) and (b), when vibration is caused in the horizontal direction in the casing 10, this horizontal directional vibration can be effectively absorbed. In the example of FIGS. 17(c) and (d), when vibration is caused in the upward and downward direction in the casing 10, this upward and downward directional vibration can be effectively absorbed. Also, in the example of FIGS. 17(e) and (f), when vibration is caused in one direction only in the horizontal direction, this one directional vibration can be effectively absorbed. Further, in the example of FIGS. 17(g) and (h), all of the three dimentional vibrations in the X, Y and Z directions can be coped with, whereby the vibration caused in every direction in the casing 10 can be uniformly absorbed.

It is to be noted that, while, in the present ninth embodiment, the examples where the casing 10 is supported at four places on each of the upper and lower portions (eight places in total) have been described, the number of the supporting places is not limited to eight but may be more or less according to the vibration state.

Also, the casing 10 may be supported by such a vibration isolating system in which the examples of the supporting system as described with respect to FIGS. 17(a) to (h) are combined. In this case, in order to meet various peculiar vibration patterns caused in the casing 10 according to the specification of the casing or the state of the experimental objects, the vibration isolating devices 92 are fitted, being supported at necessary circumferential places of the casing 10, so that the elastic forces may act in directions the same as, orthogonal to or inclined to the rotary shaft, and then a more effective vibration control becomes possible.

Figure 18A:
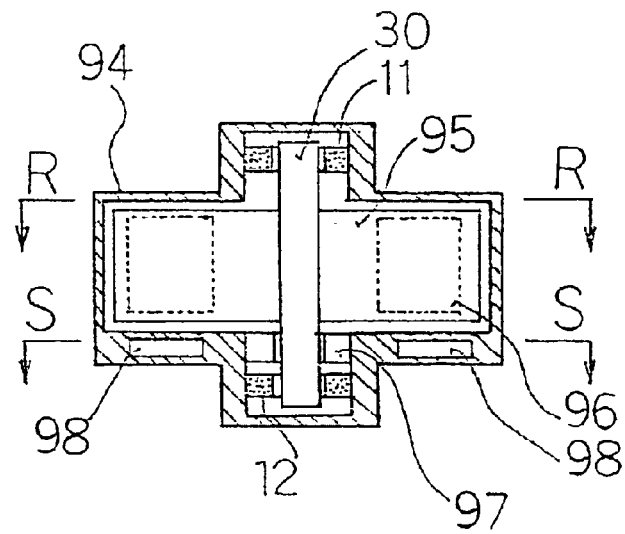
Figure 18B:
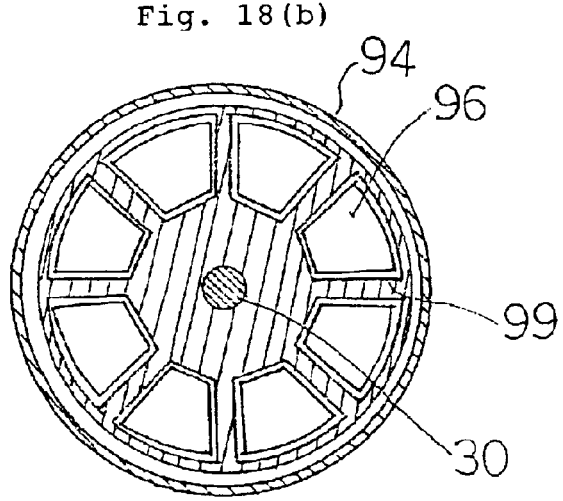
Figure 18C:
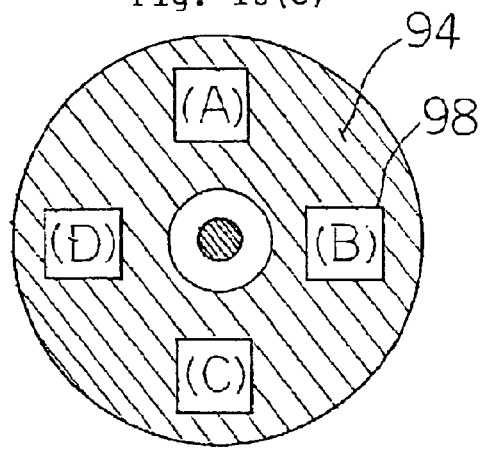

FIGS. 18(a) to (c) show a microgravitational rotating apparatus vibration control system of a tenth embodiment according to the present invention, wherein FIG. 18(a) is a cross sectional side view, FIG. 18(b) is a cross sectional view taken on line R—R and seen in the arrow direction of FIG. 18(a) and FIG. 18(c) is a cross sectional view taken on line S—S and seen in the arrow direction of FIG. 18(a). In the present tenth embodiment, while illustration is omitted, the rotating apparatus vibration control systems of the fourth to the eighth embodiments having the horizontally or vertically moving counterweights are applicable.

In FIGS. 18(a) to (c), as in the rotating apparatus shown in FIG. 9, a rotary shaft 30 arranged in a casing 94 has both its ends supported by bearings 11, 12 so as to be rotationally driven by a motor 97. A rotator 95 is fitted to the rotary shaft 30 to be rotated concentrically with the rotary shaft 30 in the casing 94.

The rotator 95 comprises a plurality, eight in the example illustrated, of box containers 99, in which boxes 96 are contained, arranged circumferentially around the rotary shaft 30 so that the rotator 95 may rotate together with the boxes 96 of eight pieces contained in the box containers 99. Also, each of the boxes 96 comprises tan opening through which the experimental objects are put in or taken out from above the rotator 95, although illustration is omitted.

In the construction of the abovementioned tenth embodiment, if the horizontally or vertically moving counterweights are to be fitted as in the fourth to the eighth embodiments, as there is provided no arm for supporting the boxes, the counterweights are fitted likewise to the corresponding places in the rotator 95 having the boxes 96.

Moreover, as shown in FIG. 18(c), there are provided electrical equipment modules 98A, 98B, 98C, 98D in a bottom wall portion (or this may be on a bottom wall surface) of the rotator 95. In the illustration, the example of four modules is shown but the number of the modules may be selected according to the necessity.

According to the present tenth embodiment also, as in the fourth to the eighth embodiments, by the vibration control construction using the counterweights, an effective vibration control is realized. Also, as in the ninth embodiment shown in FIG. 17, if the vibration isolating devices 92 are applied to the casing 94, then the vibration caused in the casing 94 can be more effectively absorbed.

It is to be noted that, although illustration is omitted, the vibration control systems of the fourth to the eighth embodiments may be constructed such that, in place of the counterweights 41, 17, 29a, 29b, 64a, 64b used therein, vibration generators are provided at desired places of the rotary shaft, the arms and the boxes to be driven by a control unit based on signals from acceleration sensors to thereby control the vibration of the rotator having the rotary shaft, the arms and the boxes. By this construction also, the same vibration control effect can be obtained. Also, if the construction of the vibration control is made such that the vibration generators are assembled into the counterweights and movement of the counterweights is controlled as well as the vibration generators are also driven, then a more accurate vibration control becomes possible.

Also, in FIG. 16, although a detailed explanation has been omitted, if passive springs are to be provided, the passive springs are operated as active springs and acceleration sensors are to be provided near the active springs. By this construction, signals from the acceleration sensors are received by a control unit, and when the vibration exceeds a predetermined value, the corresponding active springs are operated so as to adjust the elasticity to thereby control the vibration. Thus, a high vibration control can be achieved. The control system of this construction is basically the same as the system shown in FIG. 11 and detailed explanation thereof is omitted.

Also, in the fourth to the eighth embodiments of the present invention, as the means of the vibration control, the counterweights 41, 17 moving in the upward and downward direction, the counterweights 29a, 29b, 64a, 64b moving in the direction parallel with the arms, the passive springs and the active springs are used. Thus, as the control unit, a construction having the following function is also provided, although illustration is omitted.

That is, based on the signals from the acceleration sensors, the control unit ascertains the sizes of the signals and the place of origin of the vibration and selects the vibration control means of the most appropriate position out of the means mentioned above or selects a combination of the appropriate means to thereby control the vibration. According to such construction, a more accurate vibration control becomes possible.

It is to be noted that, as mentioned before, the casing 100 for measuring the mass of the substance 50 of the second embodiment shown in FIG. 6 and the casing 100 for measuring the weight of the man 53 shown in FIG. 8 are applicable as the box 96 to be detachably inserted into the rotator 95 of the tenth embodiment shown in FIG. 18. In this case, the casing 100, that is, the box 96, is taken out of the rotator 95 and the mass of the substance 50 or the weight of the man 53 can be easily measured outside of the rotator 95. Thereby, balances of the weight of the box to be placed in the rotator 95 can be adjusted beforehand so as to resolve imbalances of the weight.

Figure 19A:
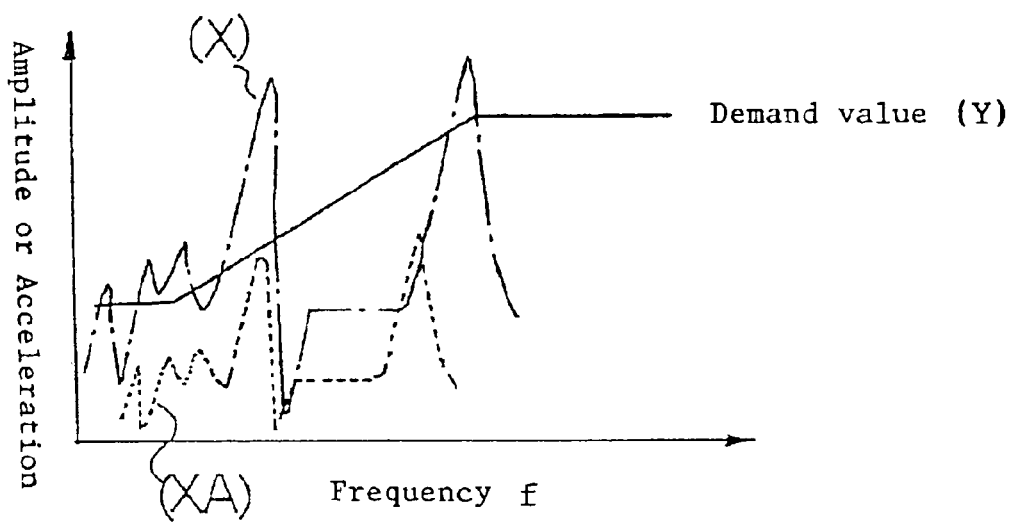

FIGS. 19(a) and (b) are graphs showing two examples of the demand value and the control effect of the vibration in the vibration control systems of the rotating experimental apparatus of the fourth to the tenth embodiments as described above. FIG. 19(a) shows an example where the vibration is of a rotary shaft having a natural vibration of a single natural value (X). In this example, a rotator vibration irregularity control device having counterweights of the present invention is used for the demand value (Y) and thereby the vibration is controlled to become patterns of vibration (XA) that are below the demand value (Y).

Figure 19B:
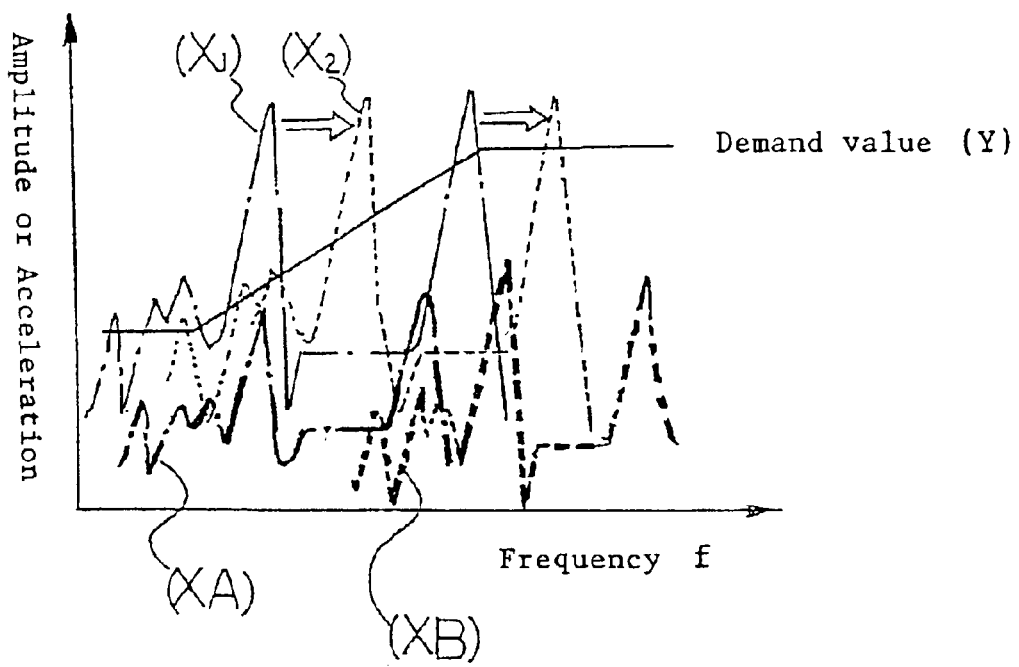

FIG. 19(b) shows an example where patterns of the natural frequency change to those $(X_2)$ from those $(X_1)$. This is a case, for example, where the plants in the experimental boxes grow to thereby change the vibration characteristics of the experimental boxes. In this case also, by likewise applying the rotator vibration irregularity control device of the present invention, the natural vibration $(X_1)$ is controlled to become patterns of the vibration (XA) that are below the demand value (Y) and the natural vibration $(X_2)$ is controlled to become patterns of the vibration (XB) that are also below the demand value (Y).

Figure 20A:
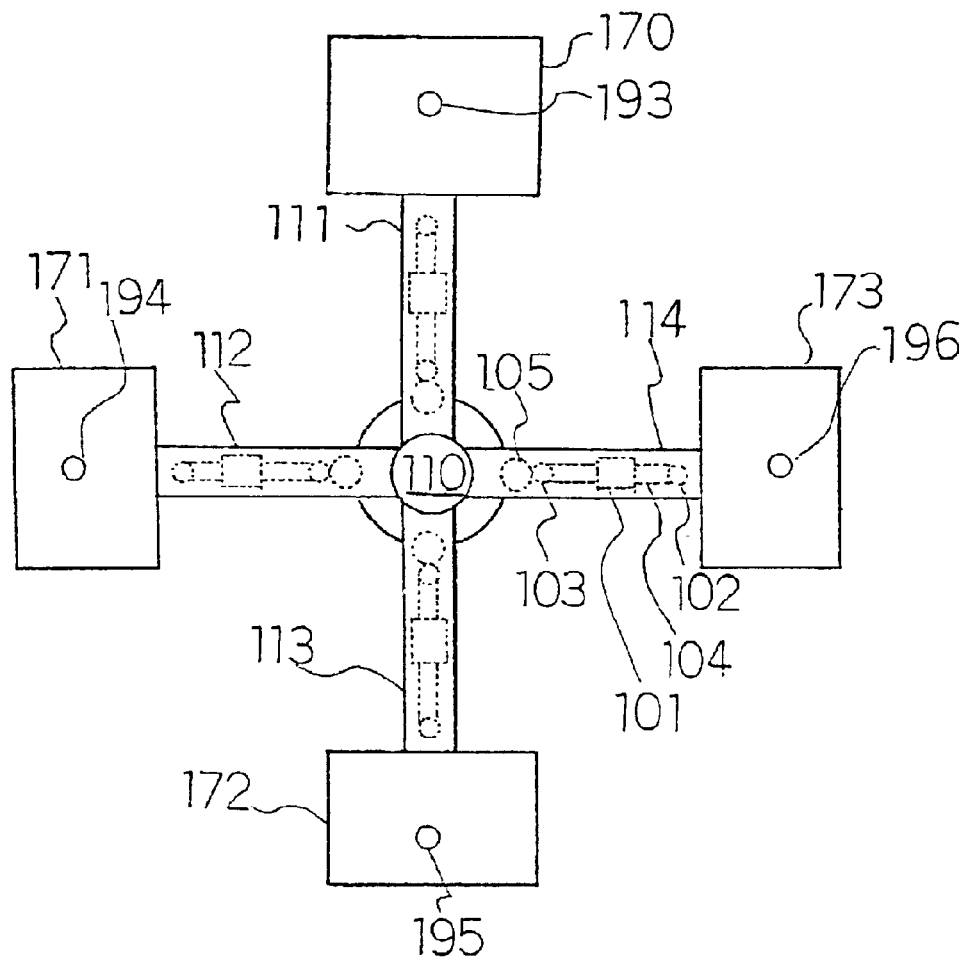
Figure 20B:
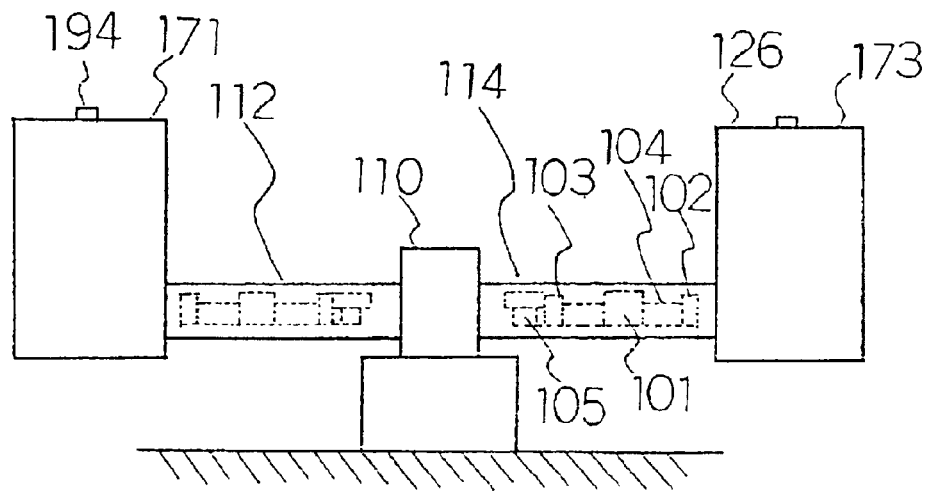

FIGS. 20(a) and (b) show a microgravitational rotating apparatus vibration control system of an eleventh embodiment according to the present invention, wherein FIG. 20(a) is a plan view and FIG. 20(b) is a side view. In FIGS. 20(a) and (b), like the prior art rotary type experimental boxes, the rotating apparatus having motors is fitted with four supporting structures 111, 112, 113, 114 of a hollow or pipe shape and the supporting structures 111 to 114 at their distal ends are fitted with experimental boxes 170, 171, 172, 173, respectively.

While each of the supporting structures 111 to 114 has a counterweight mounted therein, an example of the supporting structure 114 will be representatively described. In the supporting structure 114, a counterweight 101 is provided so as to be movable in the horizontal direction in the figure. The counterweight 101 is fitted with a cable 104 formed in a loop and the cable 104 is wound around pulleys 102, 103. When the counterweight 101 is pulled via the pulleys 102, 103, it is movable rightward or leftward in the horizontal direction in the figure. The pulley 103 engages with a motor 105, directly fitted to the rotating apparatus, via gears or friction means so that the pulley 103 may be rotationally driven. Such a counterweight moving device as constructed by the counterweight 101, the pulleys 102, 103, the cable 104 and the motor 105 is mounted in each of the supporting structures 111 to 114.

Also, on upper surfaces of the experimental boxes 170 to 173, acceleration sensors 193, 194, 195, 196, respectively, are fitted so that acceleration acting on the experimental boxes 170 to 173 in the one to three dimensional directions may be detected and the detected signals are inputted into a control unit (not shown). Wiring to the motors 105 and signal wires from the acceleration sensors 193 to 196 are connected to the control unit, provided on the stationary side, via a slip ring, etc.

Figure 21A:
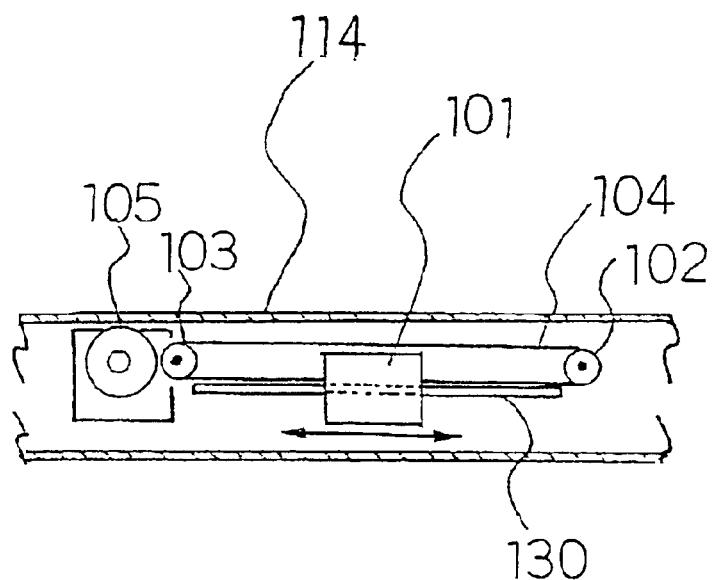
Figure 21B:
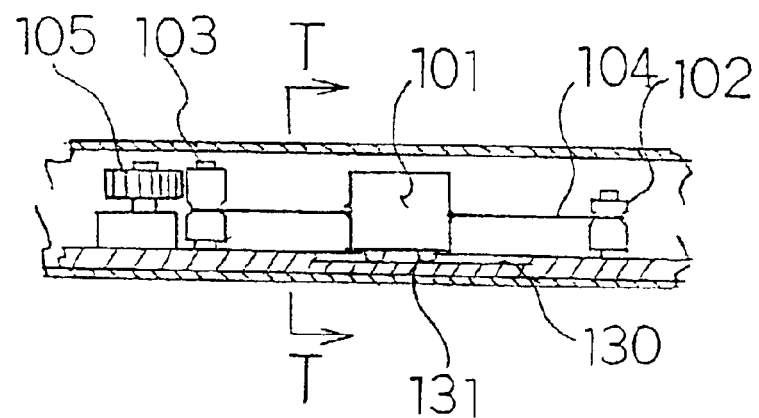
Figure 21C:
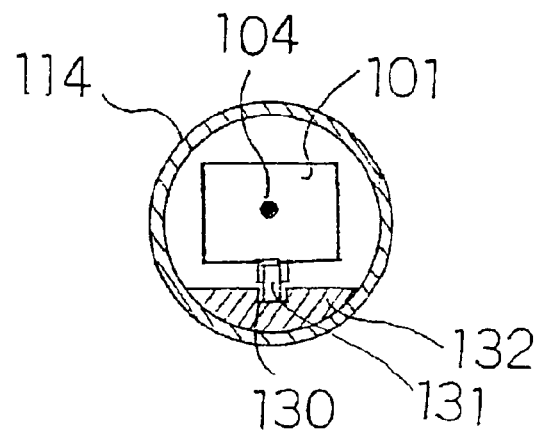

FIGS. 21(a) to (c) show the counterweight moving device provided in the supporting structure described with respect to FIG. 20, wherein FIG. 21(a) is a cross sectional plan view, FIG. 21(b) is a cross sectional side view and FIG. 21(c) is a cross sectional view taken on line T—T and seen in the arrow direction of FIG. 21(b). In these figures, the counterweight 101 on its right and left side surface is fitted with the cable 104 of the loop and the cable 104 is wound around the pulleys 102, 103 so that the counterweight 101 is movable rightward and leftward. The pulley 103 has gear teeth formed on its upper peripheral portion for a rotational engagement with a rotator of the motor 105. When the motor 105 is driven to rotate the pulley 103, the cable 104 wound around the pulley 103 moves rightward or leftward and the counterweight 101 moves rightward or leftward along a groove 130 to be described next.

That is, as shown in FIGS. 21(b) and (c), a wheel 131 is fitted to a bottom surface of the counterweight 101 and a horizontal surface portion 132 is formed on a bottom surface of the supporting structure 114. In a length directional central portion of the horizontal surface portion 132, a groove 130 is formed so that the wheel 131 engages with the groove 130 to be movable in the rightward and leftward direction.

Figure 22:
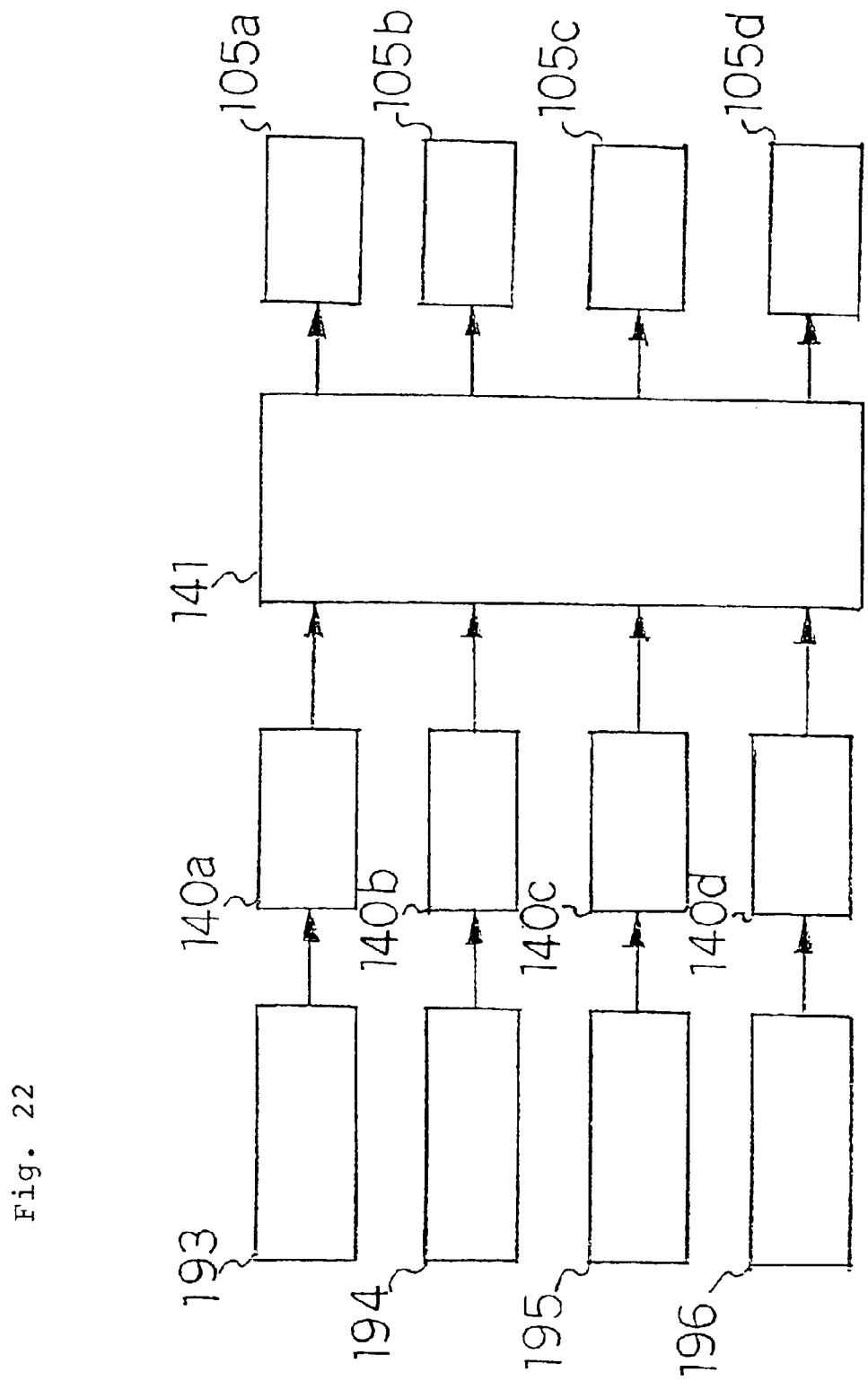
FIG. 22 is a control system diagram of the vibration control system of the eleventh embodiment.

FIG. 22 is a control system diagram of the vibration control system of the eleventh embodiment according to the present invention. In FIG. 22, acceleration signals of the one to three dimensional directions coming from the acceleration sensors 193 to 196 fitted to the upper surfaces of the experimental boxes 170 to 173 are amplified at amplifiers 140a to 140d to be inputted into a control unit 141. From these signals, the control unit 141 takes the acceleration signals caused by the regular rotation of the experimental devices as well as the acceleration signals caused by the extra vibration added on the experimental boxes 170 to 173. By these signals, the vibrations added on each of the experimental boxes in the X, Y and Z axes directions are detected to thereby select the counterweight 101 movable in the direction to cancel the corresponding vibration in each of the experimental boxes. Thus, control is made such that one or more of motors 105a to 105d connected to counterweights 101 are driven to thereby move the counterweights 101 in the direction reverse to the amplitude of the vibration so as to cancel the vibration.

Figure 23A:
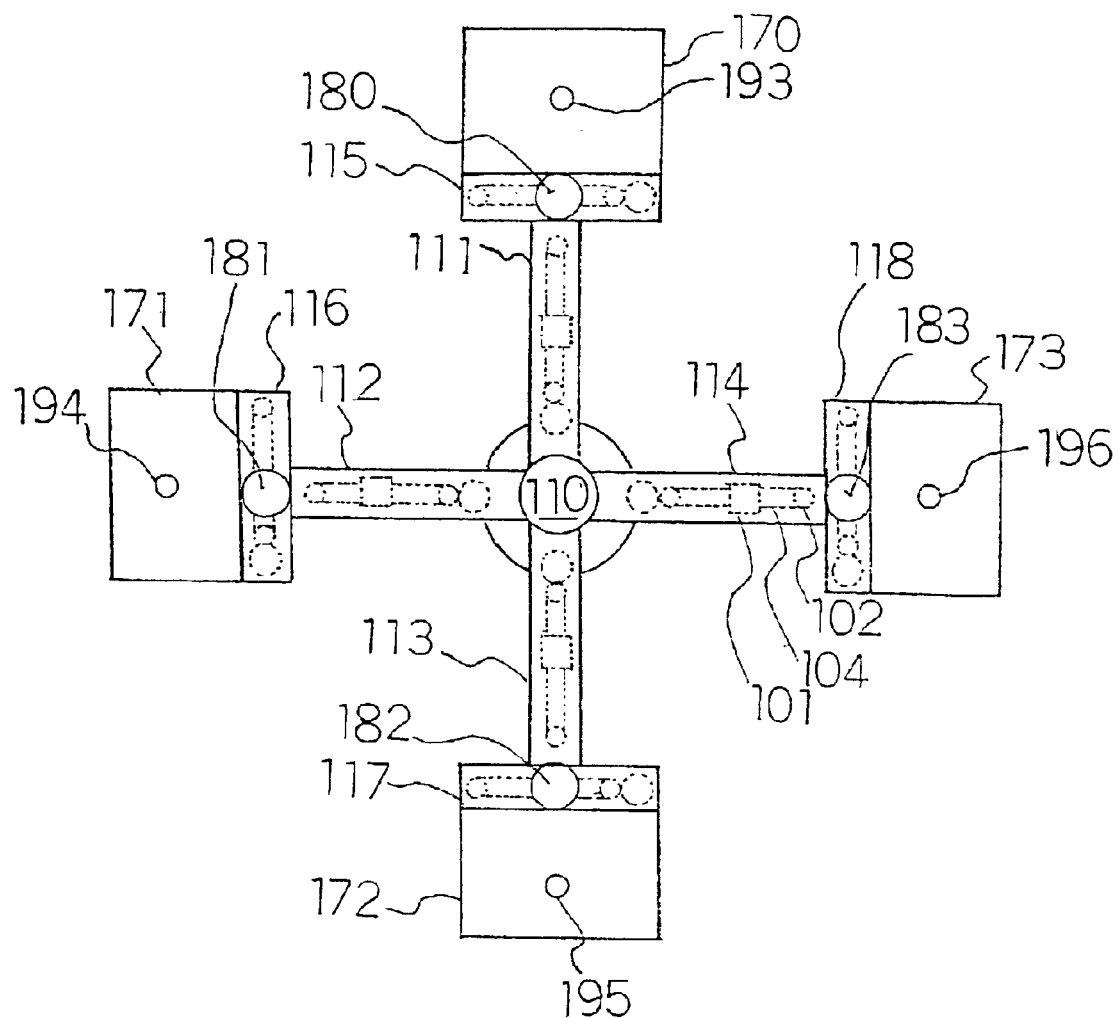
Figure 23B:
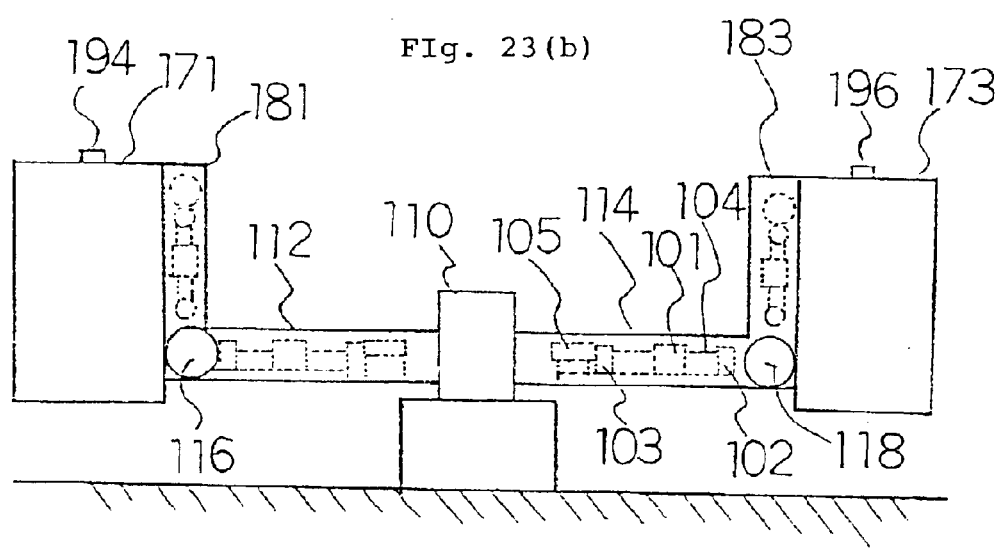

FIGS. 23(a) and (b) show a microgravitational rotating apparatus vibration control system of a twelfth embodiment according to the present invention, wherein FIG. 23(a) is a plan view and FIG. 23(b) is a side view. In FIGS. 23(a) and (b), like the eleventh embodiment shown in FIG. 20, the rotary type experimental apparatus is constructed such that the rotating apparatus having motors is fitted with four supporting structures 111, 112, 113, 114 and the supporting structures 111 to 114 at their distal ends are fitted with experimental boxes 170, 171, 172, 173.

In the present twelfth embodiment, the construction having the four horizontally arranged supporting structures 111 to 114 for supporting the respective boxes 170 to 173 is the same as that shown in FIG. 20 and, in addition thereto, horizontally, but orthogonally to the supporting structures 111 to 114, arranged supporting structures 115, 116, 117, 118 as well as vertically arranged supporting structures 180, 181, 182, 183 are provided. That is, the horizontal supporting structure 111 is fitted with the horizontal, but orthogonal thereto, supporting structure 115 and the vertical supporting structure 180 such that both of the supporting structures 115 and 180 are integrally fitted to a side surface of the box 170. Likewise, the horizontal supporting structure 112 is fitted with the horizontal orthogonal supporting structure 116 and the vertical supporting structure 181, the horizontal supporting structure 113 with the horizontal orthogonal supporting structure 117 and the vertical supporting structure 182, and the horizontal supporting structure 114 with the horizontal orthogonal supporting structure 118 and the vertical supporting structure 183. Also, each of the supporting structures 111 to 114, 115 to 118 and 180 to 183 has a counterweight 101, pulleys 102, 103 and a motor 105 arranged therein, as shown in FIGS. 20 to 22.

A control system of the abovementioned twelfth embodiment is basically the same as that shown in FIG. 22, although illustration is omitted. While the example of FIG. 22 illustrates only the motors 105a to 105d corresponding to the four supporting structures 111 to 114 (supporting structures in the direction of X axis), in addition thereto, motors 105 of the supporting structures 115 to 118 in the direction of Y axis and the supporting structures 180 to 183 in the direction of Z axis, that is, twelve motors in total, are controlled. For example, if vibration occurs in the direction of +X axis in the box 173, a control unit 141 controls a motor 105a of the supporting structure 114 to be driven so that the counterweight 101 may be instantly moved in the direction of −X axis to cancel the vibration. Also, as in the eleventh embodiment shown in FIG. 20, the counterweight 101 of the supporting structure 112 on the opposite side of the supporting structure 114 is combined, or the counterweights 101 of the supporting structures 111, 113, as the case may be, are combined so that optimal movements of the counterweights may be effected and thereby the vibration can be effectively controlled.

Likewise, if the vibration is in the direction of the Y axis, the motors 105 of the counterweights 101 of the supporting structures 115 to 118 in the direction of Y axis are selected, or if the vibration is in the direction of Z axis, the motors 105 of the counterweights 101 of the supporting structures 119 to 122 in the direction of Z axis are selected, so that the counterweights 101 are moved in the direction reverse to the amplitude of the vibration and thereby the vibration can be controlled.

Figure 24:
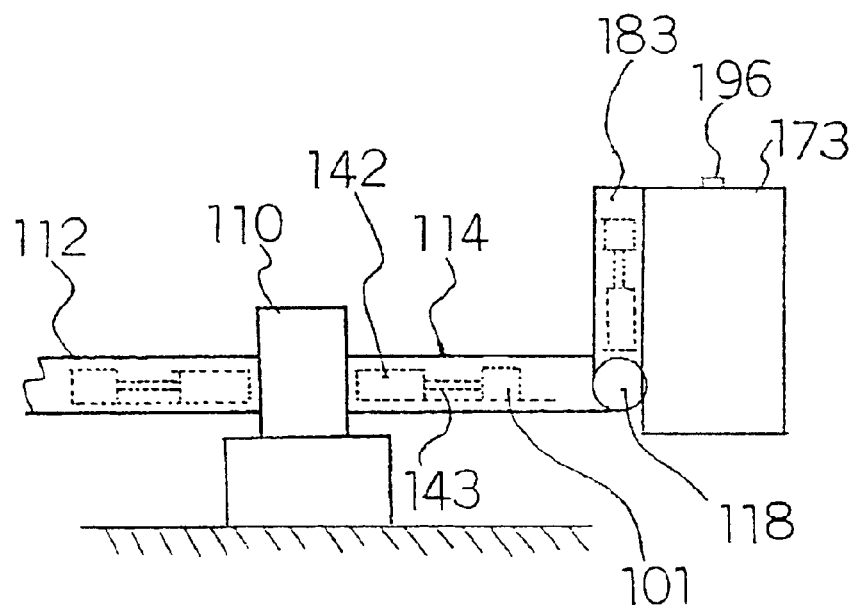
FIG. 24 is a side view of a microgravitational rotating apparatus vibration control system of a thirteenth embodiment according to the present invention.

FIG. 24 is a side view of a microgravitational rotating apparatus vibration control system of a thirteenth embodiment according to the present invention. FIG. 24 shows representatively the example of the box 173 and, as the other boxes 170 to 172 have the same vibration control system, illustration thereof is omitted. In the present thirteenth embodiment, in place of the pulleys 102, 103 and the motor 105 of the eleventh embodiment, a cylinder 142 is employed so as to move the counterweight 101, and the construction of other portions is the same as that of the eleventh and the twelfth embodiments shown in FIGS. 20 to 22 and FIG. 23.

In FIG. 24, the cylinder 142 is arranged in a supporting structure 114 in the direction of the X axis and a counterweight 101 is connected to a cylinder rod 143 of the cylinder 142 so as to be axially movable. Although not shown, the same construction is arranged in a supporting structure 118 in the direction of the Y axis and in a supporting structure 183 in the direction of the Z axis. Thus, vibration occurring in the X, Y and Z axes in each of the boxes 170 to 173 can be controlled by the cylinder 142 that moves the counterweight 101 in the direction reverse to the vibration.

Figure 25A:
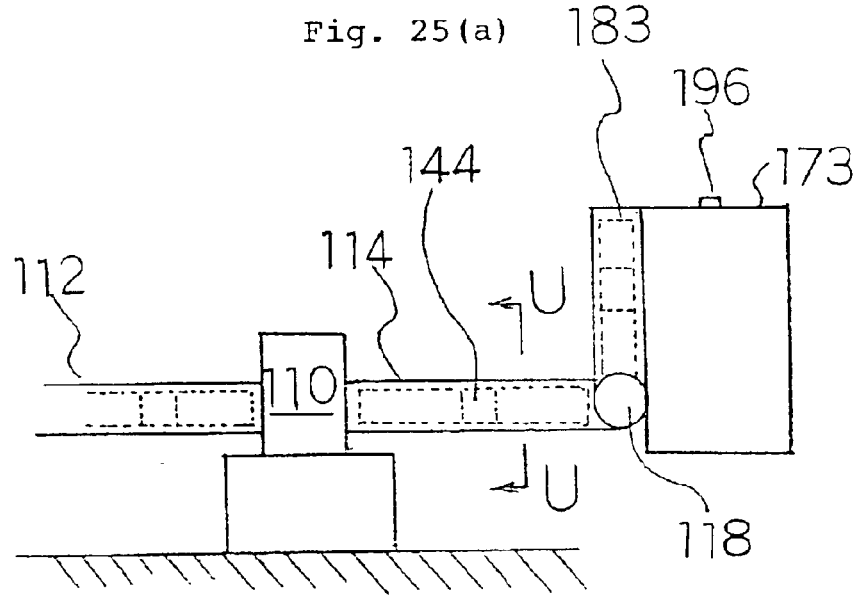
Figure 25B:
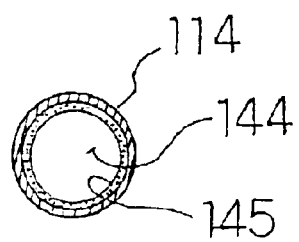

FIGS. 25(a) and (b) show a microgravitational rotating apparatus vibration control system of a fourteenth embodiment according to the present invention, wherein FIG. 25(a) is a side view and FIG. 25(b) is a cross sectional view taken on line U—U of FIG. 25(a). FIGS. 25(a) and (b) shows representatively the example of the box 173 and, as the other boxes 170 to 172 have the same vibration control system, illustration thereof is omitted. In the present fourteenth embodiment, instead of moving the counterweights by motors or actuators, the construction is made such that the counterweights are moved by gas pressure. Construction of other portions is the same as that of the eleventh and the twelfth embodiments.

In FIGS. 25(a) and (b), a counterweight 144 is of a columnar shape having a circular cross section and is movable along a supporting structure 114. A sealing member 145 made of an elastic material is arranged around the counterweight 144 so that the counterweight 144 makes contact with an inner wall surface of the supporting structure 114 via the sealing member 145 and thereby the counterweight 144 is smoothly movable in the supporting structure 114. Movement of the counterweight 144 is effected by gas being supplied into and drawn out of spaces in front and back of the counterweight 144 in the supporting structure 114, as will be described below.

Figure 26:
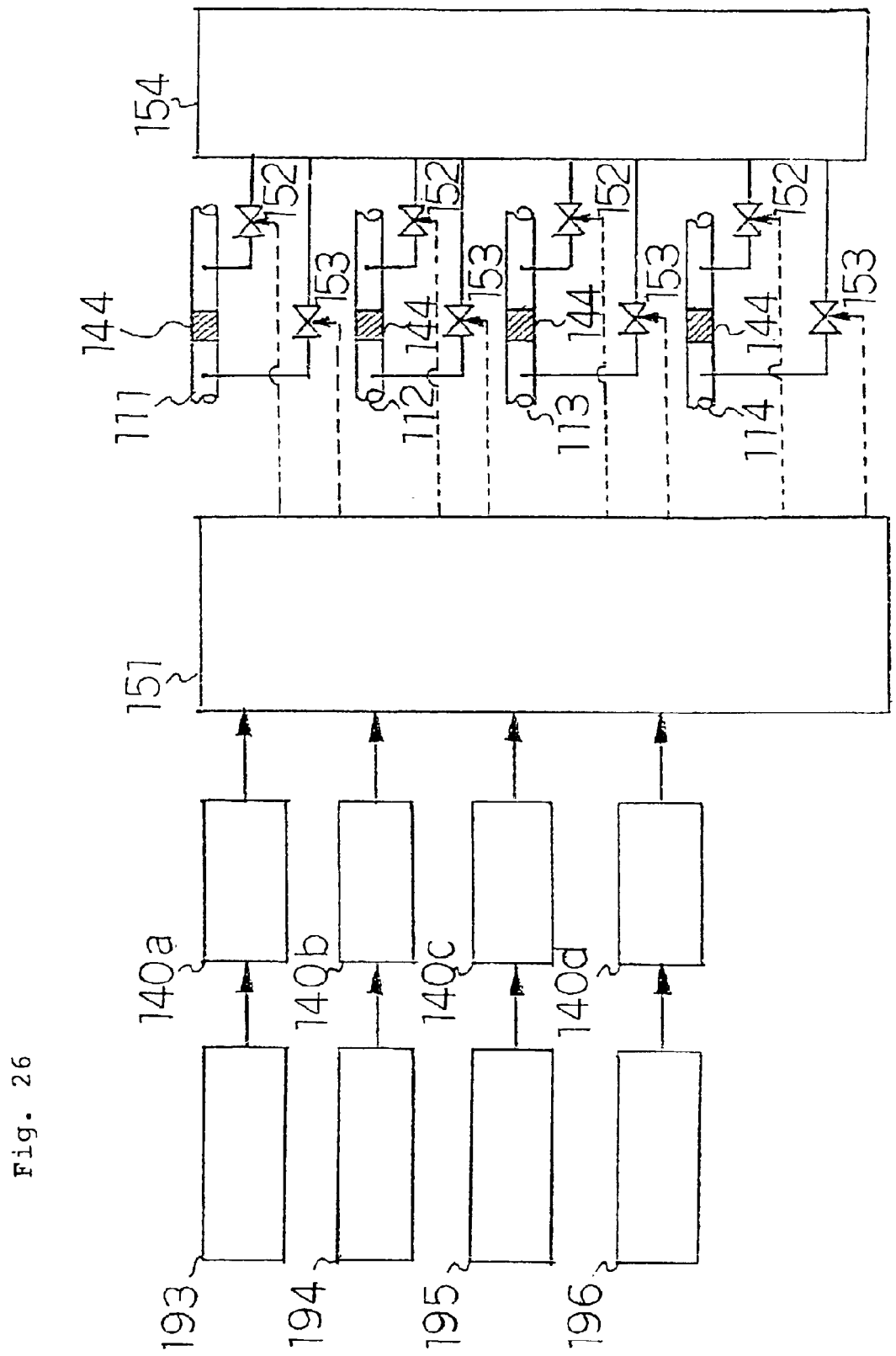
FIG. 26 is a gas control system diagram with respect to the fourteenth embodiment.

FIG. 26 is a gas control system diagram with respect to the present fourteenth embodiment, in which, for the purpose of ease of description, only the diagram of the supporting structures 111 to 114 in the direction of the X axis is shown. While the illustration of the diagrams of the supporting structures 115 to 118 in the direction of the Y axis and the supporting structures 180 to 183 in the direction of the Z axis, as in the twelfth embodiment shown in FIG. 23, is omitted, the control is basically the same. In FIG. 26, signals detected at acceleration sensors 193 to 196 are amplified at amplifiers 140a to 140d to be inputted into a control unit 151. Vibration of each of the boxes in the directions of the X, Y and Z axes is detected at the control unit 151 and control is done such that the counterweight 144 of the corresponding supporting structure is moved in the direction reverse to the amplitude of the vibration.

A gas line coming from a gas supply/recovery device 154 is connected to spaces in front and back of the counterweight 144 in each of the supporting structures via opening/closing valves 152, 153. When the counterweight 144 is to be moved frontward, or rightward in FIG. 26, the opening/closing valves 152, 153 are opened so that gas is supplied through the valve 153 and is drawn through the valve 152 and thereby the counterweight 144 is moved frontward. The amount of the movement is controllable by the gas supply pressure and amount. When the counterweight 144 is to be moved backward, or leftward in FIG. 26, the opening/closing valves 152, 153 are opened so that gas is supplied through the valve 152 and is drawn through the valve 153.

In the present fourteenth embodiment, the vibration occurring in the directions of the X, Y and Z axes in each of the supporting structures 170 to 173 is detected and the counterweight 144 of the supporting structure in which the vibration occurred is moved in the direction reverse to the vibration by supplying and withdrawing the gas, as mentioned above. Thereby, the vibration can be controlled.

It is to be noted that, in the present fourteenth embodiment, the gas supply is constructed by piping and so, while illustration is omitted, the gas supply/recovery device 154 needs to be mounted on the rotating portion. But if, for example, a stand is fitted on the four supporting structures 111 to 114, mounting of the gas supply/recovery device 154 can be easily realized.

Figure 27:
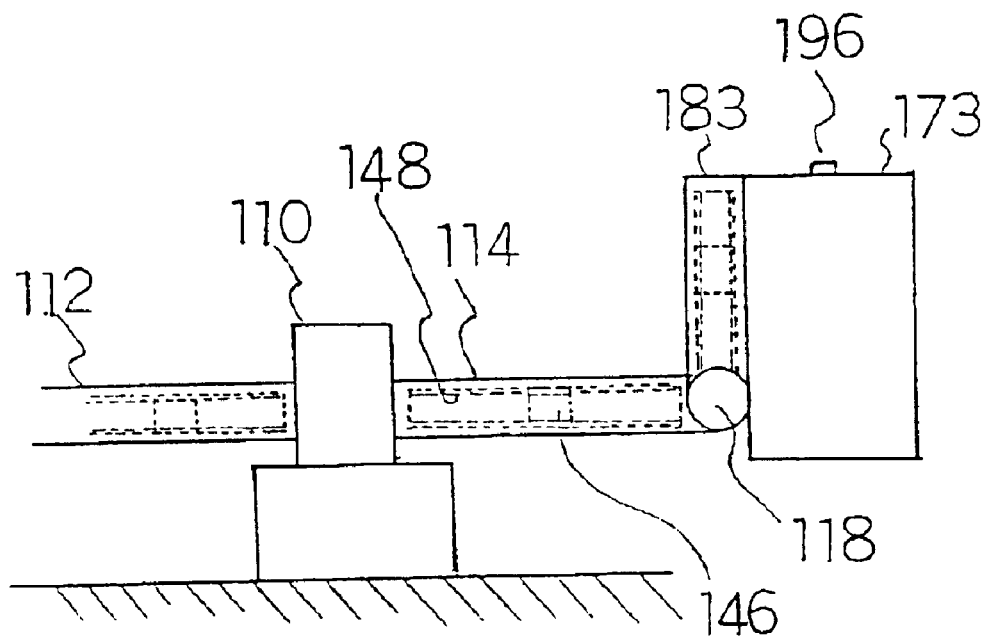
FIG. 27 is a side view of a microgravitational rotating apparatus vibration control system of a fifteenth embodiment according to the present invention.

FIG. 27 is a side view of a microgravitational rotating apparatus vibration control system of a fifteenth embodiment according to the present invention. While FIG. 27 shows representatively the portion of the box 173, the construction of the other boxes 170 to 172 is the same and illustration thereof is omitted. In the present fifteenth embodiment, the counterweight is constructed to be moved by a linear motor system and construction of other portions is the same as those of the eleventh and the twelfth embodiments.

In FIG. 27, a linear motor coil 148 is applied to an inner wall surface of the supporting structure 114 in the direction of the X axis. A counterweight 146 is made of a magnetic material and when the linear motor coil 148 is excited, the counterweight 146 is moved frontward and backward in the supporting structure 114. Likewise, with respect to the supporting structure 118 in the direction of the Y axis and the supporting structure 183 in the direction of the Z axis also, counterweights 146 of the linear motor system of the same construction are provided.

Figure 28A:
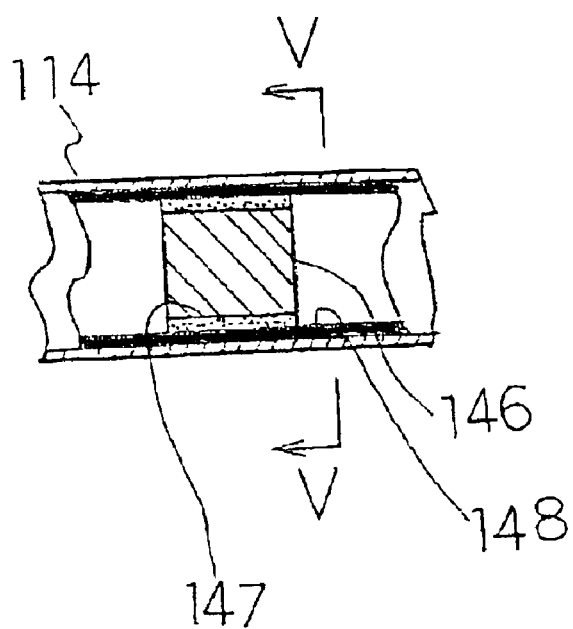
Figure 28B:
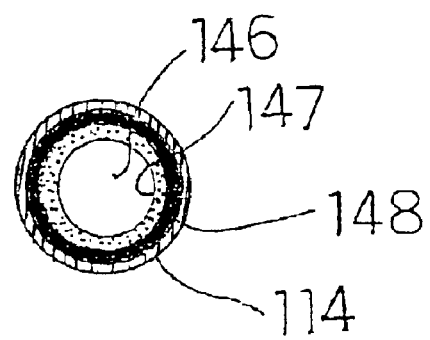
Figure 29:
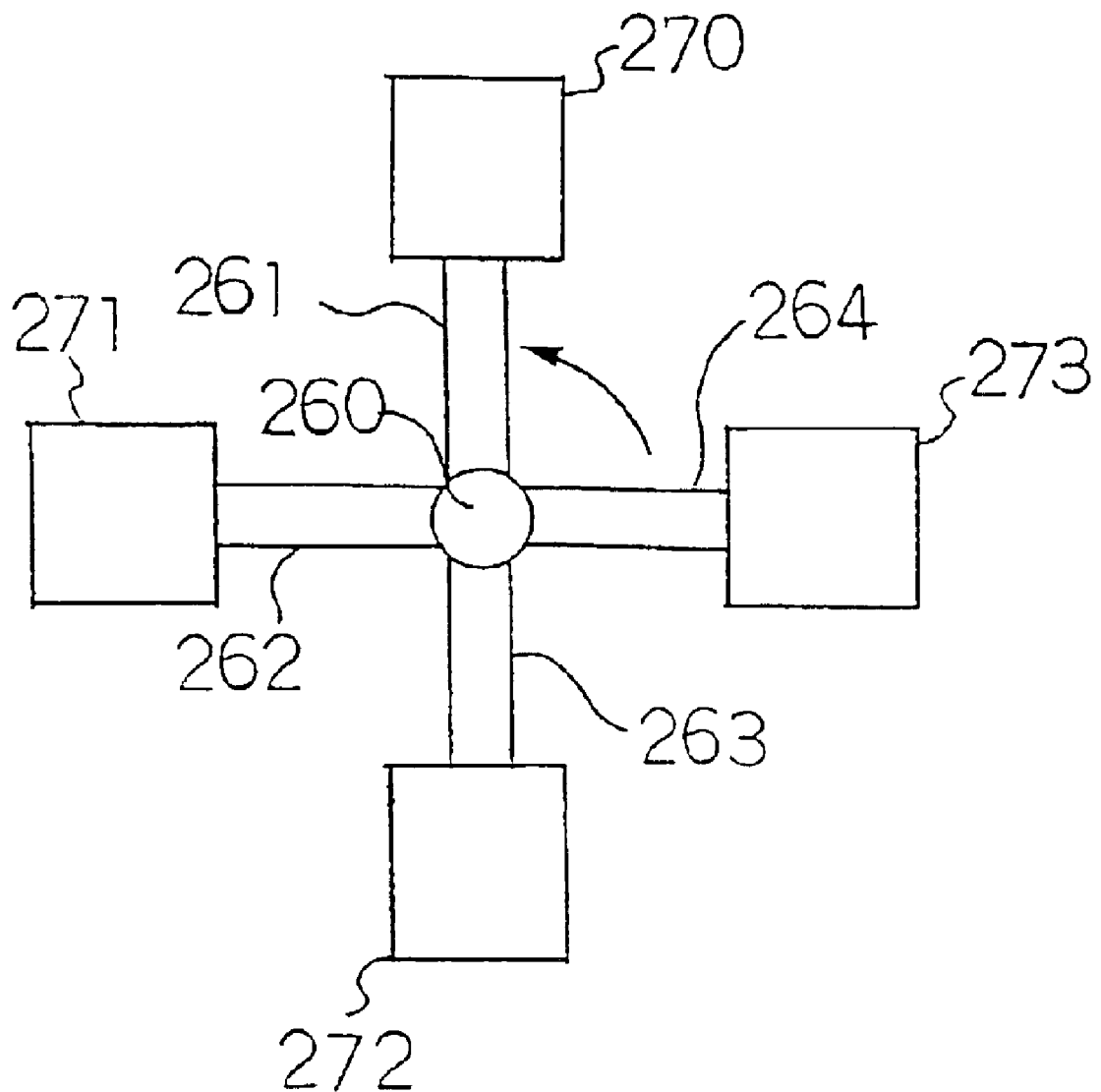
FIG. 29 is a schematic plan view showing one example of a prior art rotating apparatus used in space.

FIGS. 28(a) and (b) show an interior of the supporting structure 114 of the abovementioned fifteenth embodiment, wherein FIG. 28(a) is a longitudinal cross sectional view and FIG. 28(b) is a cross sectional view taken on line V—V of FIG. 28(a). In FIGS. 28(a) and (b), the linear motor coil 148 is arranged on the inner wall surface of the supporting structure 114 and the counterweight 146 of a columnar shape is provided therein. An insulating material 147 is applied to an outer circumferential surface of the counterweight 146 and the counterweight 146, together with the insulating material 147, is inserted into the supporting structure 114 so as to be movable frontward and backward, or rightward and leftward in FIG. 28(a), in the supporting structure. 114.

When the counterweight 146 is to be moved by the same procedures as mentioned with respect to FIG. 22, while illustration is omitted, signals from acceleration sensors 193 to 196 are received by a control unit so as to detect the vibration of each of the boxes 170 to 173. Thereby, the supporting structures 111 to 114, 115 to 118 and 180 to 183 in the directions of the X, Y and Z axes are selected corresponding to the vibrations in the directions of X, Y and Z axes and the linear motor coil 148 of the supporting structure so selected is excited. According to the exciting direction of the exciting coil, the counterweight 146, made of a magnetic material, is controlled to be moved in the direction reverse to the amplitude of the vibration and thus the vibration can be controlled.

According to the invention of the apparatus (1), the objects placed in the boxes are, for example, plants or animals and vibration-causing imbalances in the weight as well as in the acceleration during the rotation arise between each of the boxes. At both ends of the rotary shaft, the bearings are arranged and the bearings are constructed, for example, by the magnetic bearings, the elastic material-supported or spring-supported bearings, etc. that are able to absorb the vibration caused in the rotary shaft. Thus, the vibration of the rotator can be suppressed to the minimum.

According to the invention of the apparatus (2), as the objects remain placed in the boxes without need to be taken outside even in the experiments, the objects are simply caused to collide with the side plates and the mass can be easily measured in the microgravitational environment.

According to the invention of the apparatus (3), the computing unit is inputted with the signals from the pressure sensor, the displacement sensor and the acceleration sensor and measures the mass of the object by computation, as in the invention of the apparatus (2). Thus, by using the more sensors, the mass can be measured in a higher accuracy.

According to the invention of the apparatus (4), the results of the computation by the computing unit are displayed on the display unit. Hence, the mass of the object can be easily confirmed, whenever necessary, without handling the object and the function of the system of the apparatus (2) can be largely enhanced.

According to the invention of the apparatus (5) only by causing the object to collide with the side plate, the computing unit can easily compute the mass of the object based on the detected signals. Thus, the masses of various apparatus and devices or the experimental objects can be obtained.

According to the invention of the apparatus (6), in place of the push-out device of the apparatus (5), the stand having the handrail is provided and the weight of a man working in the space can be easily obtained under the microgravitational environment. The man as the object to be measured grips the handrail and, by the reaction thereof, jumps into the space in the box toward the side plate until the man collides with the side plate. Thereby, by the same function as the measurement of the mass of the object in the apparatus (5), the computing unit can compute the weight of the man based on the signals of the first and second position sensors, the displacement signals of the spring members and the signals of the acceleration sensor.

According to the invention of the apparatus (7), the mass of the object or the weight of the man computed at the computing unit is displayed on the display unit. Thus, the function of the invention of the apparatus (5) and (6) can be further enhanced.

According to the inventions of the apparatus (8) to (11) and (16), the counterweight movable vertically or the counterweight movable horizontally is provided. When vibration occurs due to differences in the weight of the object and in the acceleration during the rotation, the control unit detects the vibration by the signals from the acceleration sensors and controls the drive means to adjust the position of the counterweight so as to solve the imbalance amounts in the rotation. By this adjustment, the imbalance amounts caused in the rotating apparatus during the rotation are solved and also the vibration caused by the imbalances is controlled. Also, according to the invention of the apparatus (13), the counterweight movable vertically and the counterweight movable horizontally are combined so as to adjust the movement of the counterweight more precisely, and thereby a more effective vibration control becomes possible.

According to the invention of the apparatus (12), the movement of the counterweight is controlled not only during the rotation but also in the stationary state and the weight imbalance amounts of the entire system of the arm and box can be solved.

According to the inventions of the apparatus (14) and (15), the drive means of the counterweight can be realized by the simple mechanism using the rotatable threaded bar or the combination of the cable and pulleys and the construction of the apparatus can be simplified.

According to the inventions of the apparatus (17) to (22), in the relation between the displacement of the rotary shaft and the power given to the motor, the control unit can measure the imbalances in the weight of the boxes and the weight of the entire rotator before the start of the rotation and, based on the results of the measurement, can control the position of the counterweight so as to correct the imbalance amounts.

Also, according to the inventions of the apparatus (23) to (25), the link member or the elastic or plastic member or the combination of these members is interposed in the supporting portion between the arm and the box and the vibration can be effectively absorbed. Further, according to the inventions of the apparatus (26) to (28), the bearings of the rotary shaft can be employed from any of the elastic or plastic type, electromagnetic type, pneumatic type, spring type, damper type, motor type and fluid type and thereby the vibration can be effectively absorbed.

According to the invention of the apparatus (29), the entire rotator is supported to the casing via the springs of which elastic force is adjustable. The control unit, detecting the imbalances in the acceleration by the signals from the acceleration sensor, controls to appropriately adjust the elastic force of the corresponding spring and the vibration can be effectively absorbed by the spring of the place where the vibration occurred.

According to the invention of the apparatus (30), the imbalances in the acceleration occurring in the box are detected by the acceleration sensors and the signals thereof are inputted into the control unit. The control unit controls the vibration generator of that box so as to resolve the imbalances and the vibration caused by the imbalances can be absorbed.

According to the invention of the apparatus (31), the entire casing is supported on the outside stationary part via the vibration isolating devices. Hence, the vibration that is not completely controlled by the vibration control system provided in the casing and spreads outside of the casing can be absorbed by the elasticity of the vibration isolating devices provided on the outer periphery of the casing and transmission of the vibration outside can be prevented.

According to the invention of the apparatus (32), the boxes are contained in the containing portions of the rotator having no structure of the arms. The rotator together with the plurality of boxes are rotated by the rotary shaft, wherein the vibration control systems as mentioned in the inventions of the apparatus (8), (10), (30) and (31) are applied to the invention of the apparatus (32). Thus, an effective vibration control can be effected.

According to the invention of the apparatus (33), the vibration isolating devices effect an active vibration control of the vibration of the casing so as to effectively absorb the vibration without transmission of the vibration to the outside. Also, the vibration isolating device comprises the passive spring in the invention of the apparatus (34), the passive spring and the damper in the invention of the apparatus (35) and the passive spring and the damping characteristic material in the invention of the apparatus (36) and thereby small vibration of the casing is absorbed by the simple mechanism. Thus, the vibration control mechanism can be simplified.

According to the invention of the apparatus (37), the vibration isolating devices are fitted inclinedly to the axis of the rotary shaft and thereby the vibrations caused in the three dimensional arbitrary directions can be absorbed as a whole. Also, the vibration isolating devices are fitted along the direction same as or orthogonal to the axial direction of the rotary shaft in the invention of the apparatus (38) or along the direction inclined to, same as or orthogonal to the axial direction of the rotary shaft in the invention of the apparatus (39). Thus, the means of the invention can be appropriately selected out of (37), (38) and (39) according to the vibration patterns caused by the specification of the rotating apparatus or the state of the experiments.

According to the invention of the apparatus (40), the control unit takes the signals from the acceleration sensor fitted to each of the boxes to thereby detect one to three dimension directional vibration components of the box causing the vibration and moves the counterweight in the direction to cancel the vibration, that is, drives the drive means of the counterweight of the supporting structure on the opposite side to thereby move the counterweight in the direction to effect the vibration control. Thus, the vibration can be effectively controlled.

According to the invention of the apparatus (41), at the connection portion between the horizontal supporting structure and the box of the invention of the apparatus (40), the orthogonal horizontal supporting structure and the vertical supporting structure are provided. Hence, for each of the boxes, there are provided the counterweights movable in the one to three dimensional directions of the X, Y and Z axes and thereby the vibration caused in each of the boxes can be controlled by moving the counterweights in the direction reverse to the vibration in the X, Y and Z axes. When vibration occurs in any of the boxes, the X, Y and Z axes directional components of the vibration are detected by the control unit. The control unit selects the counterweights of the supporting structures of the X, Y and Z axes directions provided on the opposite side in the axial symmetry of the box causing the vibration and controls to move the counterweights in the direction reverse to the vibration. Thereby, the vibration can be controlled. Thus, by the invention of the apparatus (41), the vibration can be controlled more finely than in the invention of the apparatus (40).

The drive means of the counterweight is the cylinder in the invention of the apparatus (42), the gas pressure in the invention of the apparatus (43) and the linear motor in the invention of the apparatus (44). Thus, the application range of the present invention is enlarged and a drive means appropriate for the respective characteristics of the apparatus can be selected.

What is claimed is:

1. A microgravitational rotating apparatus vibration control system, wherein said microgravitational rotating apparatus comprises:
    a casing;
    a rotary shaft provided within said casing, having both ends thereof supported by bearings and rotationally driven by a motor;
    a plurality of arms extending radially having first ends fitted to a circumferential periphery of said rotary shaft;
    a rotator having a plurality of boxes fitted to other ends of said plurality of arms in which a gravitational or gravity-adding object can be placed;
    wherein vibration occurring in said rotator can be controlled by said bearings;
    a plurality of side plates in each of said plurality of boxes fitted substantially parallel to side wall inner surfaces of said boxes via spring members;
    an acceleration sensor fitted to each of said plurality of side plates;
    a distance sensor fitted to an inner surface of each of said boxes corresponding to and close to said plurality of side plates to measure a distance to the object; and
    a computing unit operable to receive acceleration signals from said acceleration sensor when the object collides with one of said side plates, displacement signals of said spring members when the object collides with the one of said side plates and position signals of said distance sensor of an initial position of the object before the object collides with the one of said side plates and a position of the object when the object collides with the one of said side plates, and operable to compute the mass of the object based on the acceleration signals, displacement signals and position signals.

2. The microgravitational rotating apparatus vibration control system of claim 1, and further comprising a display unit for displaying results of computation by said computing unit.

3. A microgravitational rotating apparatus vibration control system, wherein said microgravitational rotating apparatus comprises:
    a casing;
    a rotary shaft provided within said casing, having both ends thereof supported by bearings and rotationally driven by a motor;
    a plurality of arms extending radially having first ends fitted to a circumferential periphery of said rotary shaft; and
    a rotator having a plurality of boxes fitted to other ends of said plurality of arms in which a gravitational or gravity-adding object can be placed;
    wherein vibration occurring in said rotator can be controlled by said bearings;
    said vibration control system further comprising:
    a plurality of side plates in each of said plurality of boxes fitted substantially parallel to side wall inner surfaces of said boxes;
    each of said side plates having a pressure sensor, a displacement sensor and an acceleration sensor; and
    a computing unit operable to receive signals of each said sensor from a load of the object on one of said side plates and operable to compute the mass of the object based on the signals.

4. A microgravitational rotating apparatus vibration control system, wherein said microgravitational rotating apparatus comprises:
    a casing;
    a rotary shaft provided within said casing, having both ends thereof supported by bearings and rotationally driven by a motor;
    a plurality of arms extending radially having first ends fitted to a circumferential periphery of said rotary shaft;
    a rotator having a plurality of boxes fitted to other ends of said plurality of arms in which a gravitational or gravity-adding object can be placed;
    wherein vibration occurring in said rotator can be controlled by said bearings;
    wherein at least one of said plurality of boxes is a cabin, laboratory, container or space factory;
    wherein each box of said plurality of boxes has a side plate fitted to one side wall inner surface of said box by a spring member having a displacement sensor, an acceleration sensor fitted to said side plate, a first position sensor operable to detect the object arriving at a position of said side plate, a second position sensor is arranged at a predetermined distance from said first position sensor and operable to detect passing of the object, and a push-out device on an opposite side from said side plate in said box and operable to push out the object toward said side plate; and
    wherein a computing unit is operable to receive signals of the arrival and passing of the object from said first and second positions sensors, signals from said acceleration sensor when the object collides with said side plate and signals from said displacement sensor of said spring member when the object collides with said side plate, and operable to compute the mass of the object based on the signals from said first and second position sensors, from said acceleration sensor and said displacement sensor.

5. The microgravitational rotating apparatus vibration control system of claim 4, and further comprising a display unit for displaying results of computation by said computing unit.

6. A microgravitational rotating apparatus vibration control system, wherein said microgravitational rotating apparatus comprises:

a casing;

a rotary shaft provided within said casing, having both ends thereof supported by bearings and rotationally driven by a motor;

a plurality of arms extending radially having first ends fitted to a circumferential periphery of said rotary shaft;

a rotator having a plurality of boxes fitted to other ends of said plurality of arms in which a gravitational or gravity-adding object can be placed;

wherein vibration occurring in said rotator can be controlled by said bearings;

wherein at least one of said plurality of boxes is a cabin, laboratory, container or space factory;

wherein each box of said plurality of boxes has a side plate fitted to one side wall inner surface of said box by a spring member having a displacement sensor, an acceleration sensor fitted to said side plate, a first position sensor operable to detect a human body as the object arriving at a position of said side plate, a second position sensor is arranged at a predetermined distance from said first position sensor and operable to detect passing of the human body, and a stand having a handrail on an opposite side from said side plate in said box by which the human body can jump toward said side plate; and wherein a computing unit is operable to receive signals of the arrival and passing of the human body from said first and second positions sensors, signals from said acceleration sensor when the human body collides with said side plate and signals from said displacement sensor of said spring member when the human body collides with said side plate, and operable to compute the mass of the human body based on the signals from said first and second position sensors, said acceleration sensor and said displacement sensor.

7. The microgravitational rotating apparatus vibration control system of claim 6, and further comprising a display unit for displaying results of computation by said computing unit.

8. A microgravitational rotating apparatus vibration control system, wherein said microgravitational rotating apparatus comprises:

a casing;

a rotary shaft provided within said casing, having both ends thereof supported by bearings and rotationally driven by a motor;

a plurality of arms extending radially having first ends fitted to a circumferential periphery of said rotary shaft;

a rotator having a plurality of boxes fitted to other ends of said plurality of arms in which a gravitational or gravity-adding object can be placed;

wherein vibration occurring in said rotator can be controlled by said bearings;

wherein said vibration control system further comprises:

a plurality of acceleration sensors fitted to predetermined measuring points of said rotator;

a counterweight arranged on each of said plurality of boxes so as to be movable in a direction along an axis of said rotary shaft;

a drive means for driving said counterweight; and a control unit operable to receive signals detected by each of said acceleration sensors to detect imbalance amounts in acceleration caused during rotation between each of said plurality of boxes and operable to control said drive means to adjust a position of said counterweight to resolve the imbalance amounts and control vibration.

9. The microgravitational rotating apparatus vibration control system of claim 8, wherein said vibration control system further comprises a second counterweight and a second drive means for electrically driving said second counterweight which are both provided with each one of said plurality of arms, said second counterweight being movable parallel with the respective one of said plurality of arms at a distance from said rotary shaft.

10. The microgravitational rotating apparatus vibration control system of claim 9, wherein said plurality of acceleration sensors are fitted to said plurality of arms and said boxes and said second counterweight is provided in one or more pieces with respect to each one of said plurality of arms.

11. The microgravitational rotating apparatus vibration control system of claim 8, wherein said control unit is operable to actively control vibration by moving said counterweight in a direction such that vibration of said box does not occur in a predetermined frequency.

12. The microgravitational rotating apparatus vibration control system of claim 8, wherein said control unit is further operable to, in a stationary state, electrically move said counterweight to resolve imbalance amounts of an entire system of said arm and said box.

13. The microgravitational rotating apparatus vibration control system of claim 12, wherein said vibration control system has a necessary function of resolving rotation imbalance amounts and controlling vibration.

14. The microgravitational rotating apparatus vibration control system of claim 8, wherein said drive means drives said counterweight using a threaded bar that engages with said counterweight with a thread engagement.

15. The microgravitational rotating apparatus vibration control system of claim 8, wherein said drive means drives said counterweight using a cable and a pulley.

16. The microgravitational rotating apparatus vibration control system of claim 8, wherein said control unit is further operable to control said drive means to adjust a position of said counterweight in response to detecting vibration of each of said plurality of boxes from the signals from said acceleration sensors, comparing the vibration with a predetermined demand value and controlling the vibration so as to suppress the vibration below the demand value.

17. The microgravitational rotating apparatus vibration control system of claim 8, wherein said control unit is further operable to, in order to measure amounts of weight imbalance before start of rotation, rotate said rotator by a predetermined amount, and thereby, in a relation between displacement of said rotary shaft in an axial direction thereof or in an arbitrary direction orthogonal to said rotary shaft, determine the amounts of weight imbalance.

18. The microgravitational rotating apparatus vibration control system of claim 17, wherein said control unit is further operable to, based on the amounts of weight imbalance that are determined, electrically move an arbitrary number of at least one said counterweight before start of rotation to thereby correct the amounts of weight imbalance of an entire system of said rotator before regular rotation.

19. The microgravitational rotating apparatus vibration control system of claim 18, wherein said control unit is further operable to correct the amounts of weight imbalance a plurality of times in order to enhance accuracy of correction of the amounts of weight imbalance.

20. The microgravitational rotating apparatus vibration control system of claim 17, wherein said control unit is further operable to effect determination or correction of the amounts of weight imbalance with a calibration function.

21. The microgravitational rotating apparatus vibration control system of claim 8, wherein said control unit is further operable to, in order to measure an entire weight of said rotator including said plurality of boxes before start of rotation, rotate said rotator by a predetermined amount, and thereby, in a relation between (a) any one of displacement, acceleration, and both displacement and acceleration, and (b) power to said motor, determine the entire weight of said rotator in the microgravitational environment of space.

22. The microgravitational rotating apparatus vibration control system of claim 8, wherein said control unit is further operable to, in order to measure an entire weight of said rotator before start of rotation, give power to said motor by a predetermined amount, and thereby, in a relation between displacement of said rotary shaft in an axial direction thereof or in an arbitrary direction orthogonal to said rotary shaft, and the power given to said motor, determine the entire weight of said rotator in the microgravitational environment of space.

23. The microgravitational rotating apparatus vibration control system of claim 8, wherein a link member that enables movement of 1 to 3 freedoms is interposed between said box and said arm so as to enable vibration control in a direction such that said counterweight, effecting an active vibration control, is movable.

24. The microgravitational rotating apparatus vibration control system of claim 8, wherein a member that enables movement of 1 to 3 freedoms is interposed between said box and said arm so as to enable vibration control in a direction such that said counterweight, effecting an active vibration control, is movable.

25. The microgravitational rotating apparatus vibration control system of claim 8, wherein a link member that enables movement of 1 to 3 freedoms is interposed between said box and said arm and a member that enables movement of 1 to 3 freedoms is interposed between said box and said arm, said link member and said member being combined to support a portion between said box and said arm to enable vibration control by said counterweight.

26. The microgravitational rotating apparatus vibration control system of claim 8, wherein said bearings are any of elastically supported bearings, plastically supported bearings, magnetic bearings, air cushion bearings, spring or damper bearings, motor bearings and fluid bearings.

27. The microgravitational rotating apparatus vibration control system of claim 26, wherein said bearings are magnetic bearings capable of changing magnetic force so as to enable active vibration control of said rotator.

28. The microgravitational rotating apparatus vibration control system of claim 26, wherein said bearings are damper bearings which are any of hydraulic, fluid, motor and pneumatic bearings that actively change damping force to enable vibration control.

29. The microgravitational rotating apparatus vibration control system of claim 8, wherein:
said rotator, including said rotary shaft and said plurality of arms and said plurality of boxes, is rotatably supported by said casing by a plurality of springs having an adjustable elastic force; and
said control unit is operable to control vibration of said rotator by adjusting the elastic force said plurality of springs based on signals from said acceleration sensors.

30. The microgravitational rotating apparatus vibration control system of claim 8, wherein said casing is supported at an outer periphery thereof by an outside stationary part by a plurality of vibration isolating devices that have elastic force.

31. The microgravitational rotating apparatus vibration control system of claim 30, wherein each of said plurality of vibration isolating devices receives vibration transmitted to said casing and is operable to effect active vibration control by changing its elastic coefficient, damping factor, or both said elastic coefficient and damping factor.

32. The microgravitational rotating apparatus vibration control system of claim 30, wherein each of said plurality of vibration isolating devices comprises only a passive spring as structure to control vibration.

33. The microgravitational rotating apparatus vibration control system of claim 30, wherein each of said plurality of vibration isolating devices comprises a passive spring and a damper is structure to control vibration.

34. The microgravitational rotating apparatus vibration control system of claim 30, wherein each of said plurality of vibration isolating devices is constructed of a passive spring and a material having a damping characteristic.

35. The microgravitational rotating apparatus vibration control system of claim 30, wherein said plurality of vibration isolating devices are fitted between an outer periphery of said casing and said outside stationary part such that directions of action of elastic forces of all of said plurality of vibration isolating devices are inclined to an axial direction of said rotary shaft.

36. The microgravitational rotating apparatus vibration control system of claim 30, wherein said plurality of vibration isolating devices are fitted between an outer periphery of said casing and said outside stationary part such that directions of action of elastic forces of all of said plurality of vibration isolating devices are either the same as or orthogonal to an axial direction of said rotary shaft.

37. The microgravitational rotating apparatus vibration control system of claim 30, wherein said plurality of vibration isolating devices are fitted between an outer periphery of said casing and said outside stationary part such that directions of action of elastic forces of said plurality of vibration isolating devices are a combination of directions that are inclined to, the same as, and orthogonal to, an axial direction of said rotary shaft.

38. A microgravitational rotating apparatus vibration control system, wherein said microgravitational rotating apparatus comprises:
a casing;
a rotary shaft provided within said casing, having both ends thereof supported by bearings and rotationally driven by a motor;
a plurality of arms extending radially having first ends fitted to a circumferential periphery of said rotary shaft;
a rotator having a plurality of boxes fitted to other ends of said plurality of arms in which a gravitational or gravity-adding object can be placed;
wherein vibration occurring in said rotator can be controlled by said bearings;
wherein said vibration control system comprises:
a plurality of acceleration sensors fitted to measuring points of said rotator;

a vibration generator fitted to a position on each of said plurality of boxes; and a control unit operable to receive signals detected by said plurality of acceleration sensors, detect imbalance amounts in acceleration caused between each of said plurality of boxes during rotation, and control said vibration generator so as to enable vibration control by resolving the imbalance amounts.

39. A microgravitational rotating apparatus vibration control system, wherein said microgravitational rotating apparatus comprises:

a casing;

a rotary shaft provided within said casing, having both ends thereof supported by bearings and rotationally driven by a motor;

a rotator that rotates together with said rotary shaft and has a plurality of boxes in which a gravitational or gravity-adding object can be placed;

wherein vibration occurring in said rotator can be controlled by said bearings;

wherein said vibration control system further comprises:

a plurality of acceleration sensors fitted to predetermined measuring points of said rotator;

a counterweight arranged on each of said plurality of boxes so as to be movable in a direction along an axis of said rotary shaft;

a drive means for driving said counterweight; and a control unit operable to receive signals detected by each of said acceleration sensors to detect imbalance amounts in acceleration caused during rotation between each of said plurality of boxes and operable to control said drive means to adjust a position of said counterweight to resolve the imbalance amounts and control vibration.

40. A microgravitational rotating apparatus vibration control system, wherein said microgravitational rotating apparatus comprises:

a casing;

a rotary shaft provided within said casing, having both ends thereof supported by bearings and rotationally driven by a motor;

a plurality of arms extending radially having first ends fitted to a circumferential periphery of said rotary shaft;

a rotator having a plurality of boxes fitted to other ends of said plurality of arms in which a gravitational or gravity-adding object can be placed;

wherein vibration occurring in said rotator can be controlled by said bearings;

wherein said plural ity of arms comprise a plurality of hol low shaped supporting structures; and wherein said vibration control system further comprises:

an acceleration sensor, operable to detect accelerations in 1 to 3 dimensional directions, fitted to each of said plurality of boxes;

a counterweight movable in a longitudinal direction in each of said plurality of supporting structures;

a drive means for driving said counterweight in each of said plurality of supporting structures; and a control unit operable to receive signals detected by each said acceleration sensor to detect vibration of said plurality of boxes, select a said counterweight of one of said supporting structures corresponding to one of said plurality of boxes that is causing vibration, and control said drive means corresponding to the said counterweight so as to move the said counterweight in a direction reverse to the vibration so as to reduce the vibration.

41. The microgravitational rotating apparatus vibration control system of claim 40, wherein:

a horizontal direction is defined as a direction along a rotating plane of said plurality of supporting structures, an orthogonal direction is defined as a direction tangential to a rotating circle of said plurality of supporting structures and a vertical direction is defined as a direction vertical to said rotating plane of said plurality of supporting structures;

an orthogonal horizontal supporting structure, extending in the orthogonal and horizontal direction, and a vertical supporting structure, extending in the vertical direction, are provided between each of said plurality of supporting structures and each of said plurality of boxes; and a further counterweight is movable in a longitudinal direction of each said orthogonal horizontal supporting structure and each said vertical supporting structure.

42. The microgravitational rotating apparatus vibration control system of claim 40, wherein said drive means comprises a linearly driving cylinder.

43. The microgravitational rotating apparatus vibration control system of claim 40, wherein said drive means comprises a means to move said counterweight forward and backward by gas pressure.

44. The microgravitational rotating apparatus vibration control system of claim 40, wherein said drive means comprises a linear motor coil on an inner wall surface of each of said plurality of supporting structures so that said counterweight, being made of a magnetic material, can be moved.

* * * * *